(12) United States Patent
Holme et al.

(10) Patent No.: US 12,240,143 B2
(45) Date of Patent: Mar. 4, 2025

(54) RAPID CERAMIC PROCESSING TECHNIQUES AND EQUIPMENT

(71) Applicant: QUANTUMSCAPE BATTERY, INC., San Jose, CA (US)

(72) Inventors: Timothy Holme, San Jose, CA (US); Martin M. Winterkorn, San Jose, CA (US); John Olenick, San Jose, CA (US); David Berkstresser, San Jose, CA (US); Matthew Sheffield, San Jos, CA (US); Yamini Mohan, San Jose, CA (US); Yi Zhou, San Jose, CA (US); Lucas Broganer, San Jose, CA (US)

(73) Assignee: QuantumScape Battery, Inc., San Jose, CA (US)

( * ) Notice: Subject to any disclaimer, the term of this patent is extended or adjusted under 35 U.S.C. 154(b) by 0 days.

(21) Appl. No.: 18/460,360

(22) Filed: Sep. 1, 2023

(65) Prior Publication Data
US 2024/0116826 A1 Apr. 11, 2024

Related U.S. Application Data

(63) Continuation of application No. PCT/US2022/019641, filed on Mar. 9, 2022.
(Continued)

(51) Int. Cl.
*C04B 35/486* (2006.01)
*B28B 11/24* (2006.01)
(Continued)

(52) U.S. Cl.
CPC .......... *B28B 11/243* (2013.01); *C04B 35/486* (2013.01); *C04B 35/6261* (2013.01);
(Continued)

(58) Field of Classification Search
CPC ........ C04B 2235/764; C04B 2237/706; C04B 2237/40–408
See application file for complete search history.

(56) References Cited

U.S. PATENT DOCUMENTS 2,900,254 A 8/1959 Raiklen
3,330,654 A 7/1967 Sweet
(Continued)

FOREIGN PATENT DOCUMENTS

CN 102554249 A 7/2012
CN 110 869 456 A 3/2020
(Continued)

OTHER PUBLICATIONS

International search report and written opinion of PCT/US2022/019641 dated Jul. 7, 2022; 14 pages.
(Continued)

*Primary Examiner* — Erin Snelting
(74) *Attorney, Agent, or Firm* — Squire Patton Boggs (US) LLP

(57) ABSTRACT

Provided herein are rapid, high quality film sintering processes that include high-throughput continuous sintering of lithium-lanthanum zirconium oxide (lithium-stuffed garnet). The instant disclosure sets forth equipment and processes for making high quality, rapidly-processed ceramic electrolyte films. These processes include high-throughput continuous sintering of lithium-lanthanum zirconium oxide for use as electrolyte films. In certain processes, the film is not in contact with any surface as it sinters (i.e., during the sintering phase).

13 Claims, 22 Drawing Sheets

Related U.S. Application Data

(60) Provisional application No. 63/233,684, filed on Aug. 16, 2021, provisional application No. 63/158,861, filed on Mar. 9, 2021.

(51) Int. Cl.

| | | |
|---|---|---|
| *C04B 35/626* | (2006.01) | |
| *C04B 35/634* | (2006.01) | |
| *C04B 35/636* | (2006.01) | |
| *C04B 35/638* | (2006.01) | |
| *C04B 35/64* | (2006.01) | |
| *C04B 37/02* | (2006.01) | |
| *F27B 9/02* | (2006.01) | |
| *F27B 9/04* | (2006.01) | |
| *F27B 9/28* | (2006.01) | |

(52) U.S. Cl.
CPC .... *C04B 35/6264* (2013.01); *C04B 35/62655* (2013.01); *C04B 35/6342* (2013.01); *C04B 35/63424* (2013.01); *C04B 35/63488* (2013.01); *C04B 35/6365* (2013.01); *C04B 35/638* (2013.01); *C04B 35/64* (2013.01); *C04B 37/021* (2013.01); *F27B 9/028* (2013.01); *F27B 9/045* (2013.01); *F27B 9/28* (2013.01); *C04B 2235/3248* (2013.01); *C04B 2235/60* (2013.01); *C04B 2235/6025* (2013.01); *C04B 2235/6567* (2013.01); *C04B 2235/6584* (2013.01); *C04B 2235/764* (2013.01); *C04B 2237/348* (2013.01); *C04B 2237/405* (2013.01); *C04B 2237/706* (2013.01)

(56) References Cited

U.S. PATENT DOCUMENTS

| | | | |
|---|---|---|---|
| 3,704,872 | A | 12/1972 | Klein |
| 5,089,455 | A | 2/1992 | Ketcham et al. |
| 5,567,240 | A | 10/1996 | Kogame et al. |
| 5,686,394 | A | 11/1997 | Sibata et al. |
| 8,696,350 | B2 | 4/2014 | Ohara |
| 9,631,867 | B2 | 4/2017 | Borrel |
| 10,026,990 | B2 | 7/2018 | Badding et al. |
| 10,155,667 | B2 | 12/2018 | Badding et al. |
| 10,396,396 | B2 | 8/2019 | Badding et al. |
| 10,486,332 | B2 | 11/2019 | Badding et al. |
| 10,563,918 | B2 | 2/2020 | Iyer et al. |
| 10,581,115 | B2 | 3/2020 | Badding et al. |
| 10,766,165 | B2 | 9/2020 | Badding et al. |
| 10,840,544 | B2 | 11/2020 | Holme et al. |
| 10,875,212 | B2 | 12/2020 | Badding et al. |
| 10,967,539 | B2 | 4/2021 | Badding et al. |
| 11,014,822 | B2 | 5/2021 | Badding et al. |
| 11,111,155 | B1 | 9/2021 | Badding et al. |
| 11,148,321 | B2 | 10/2021 | Badding et al. |
| 11,351,697 | B2 | 6/2022 | Badding et al. |
| 11,411,245 | B2 | 8/2022 | Badding et al. |
| 11,629,915 | B2 | 4/2023 | Badding et al. |
| 11,735,707 | B2 | 8/2023 | Jamadar et al. |
| 11,768,032 | B2 | 9/2023 | Badding et al. |
| 11,953,264 | B2 | 4/2024 | Badding et al. |
| 2004/0206470 | A1 | 10/2004 | Bayazitoglu |
| 2014/0134438 | A1 | 5/2014 | Gadkaree et al. |
| 2015/0099188 | A1 | 4/2015 | Holme et al. |
| 2017/0210634 | A1 | 7/2017 | Badding et al. |
| 2018/0104848 | A1 | 4/2018 | Badding et al. |
| 2019/0077674 | A1 | 3/2019 | Badding et al. |
| 2019/0103630 | A1 | 4/2019 | Choi |
| 2019/0207252 | A1* | 7/2019 | Badding ........... H01M 10/0562 |
| 2019/0280331 | A1 | 9/2019 | Holme |
| 2020/0112050 | A1 | 4/2020 | Hu et al. |
| 2020/0144660 | A1 | 5/2020 | Schneider et al. |
| 2021/0143389 | A1 | 5/2021 | Sceats et al. |
| 2021/0344040 | A1 | 11/2021 | Donnelly et al. |
| 2022/0085425 | A1 | 3/2022 | Jamadar et al. |
| 2022/0166062 | A1 | 5/2022 | Kim et al. |
| 2022/0209288 | A1 | 6/2022 | Badding et al. |
| 2022/0209289 | A1 | 6/2022 | Badding et al. |
| 2022/0278364 | A1 | 9/2022 | Badding et al. |
| 2023/0307701 | A1 | 9/2023 | Badding et al. |

FOREIGN PATENT DOCUMENTS

| | | | |
|---|---|---|---|
| EP | 0 596 822 | A1 | 5/1994 |
| EP | 2 037 527 | A1 | 3/2009 |
| EP | 3511137 | A1 | 7/2019 |
| EP | 3 408 246 | B1 | 2/2020 |
| JP | 2001-031476 | A | 2/2001 |
| JP | 2003-328006 | A | 11/2003 |
| JP | 2009-203898 | | 9/2009 |
| JP | 2010-176941 | A | 8/2010 |
| WO | WO 2005/085138 | A1 | 9/2005 |
| WO | WO 2010/051345 | A2 | 5/2010 |
| WO | WO 2014/036090 | | 3/2014 |
| WO | WO 2014/103662 | A1 | 7/2014 |
| WO | WO 2017/003980 | A1 | 1/2017 |
| WO | WO 2018/118964 | A1 | 6/2018 |
| WO | WO 2018/236394 | A1 | 12/2018 |
| WO | WO 2020/174961 | A1 | 9/2020 |
| WO | WO 2020/236767 | A1 | 11/2020 |
| WO | WO 2022/050258 | A1 | 3/2022 |
| WO | WO 2022/192464 | A1 | 9/2022 |
| WO | WO 2023/154571 | A1 | 8/2023 |

OTHER PUBLICATIONS

International search report and written opinion of PCT/US2023/013048 dated Apr. 6, 2023; 18 pages.

Geng, et al., "Effect of sintering atmosphere on ionic conduction and structure of $Li_{0.5}La_{0.5}TiO_3$ solid electrolytes", Materials Science and Engineering B, vol. 164, 2009, pp. 91-95, ISSN 0921-5107, https://doi.org/10.1016/j.mseb.2009.07.011.

Geng, H., et al., "Effect of sintering temperature on microstructure and transport properties of $Li_{3x}La_{2/3-x}TiO_3$ with different lithium contents", Electrochimica Acta, vol. 56, issue 9, 2011, pp. 3406-3414, ISSN 0013-4686, https://doi.org/10.1016/j.electacta.2010.06.031.

Hu eat al. "Highly conductive paper for energy-storage devices", PNAS, vol. 106, No. 51, Dec. 22, 2009, pp. 21490-21494; www.pnas.org/cgi/doi/10.1073/pnas.0908858106.

Lu et al., "Electrochemical performance of $LiCoO_2$ cathodes by surface modification using lanthanum aluminum garnet", Journal of Power Sources 184 (2008) 392-401; doi:10.1016/j.jpowsour.2008.04.087.

TA Instruments: "DILATOMETRY", Dec. 30, 2013, pp. 1-32, XP093035804; Retrieved from the Internet: URL:https://tainstruments.com.cn/wp-content/uploads/DIL_805.pdf [retrieved on Mar. 29, 2023].

Waetzig, et al., "Synthesis and sintering of $Li_{1.3}Al_{0.3}Ti_{1.7}(PO_4)_3$ (LATP) electrolyte for ceramics with improved Li+ conductivity", Journal of Alloys and Compounds, vol. 818, 2020, 153237, ISSN 0925-8388, https://doi.org/10.1016/j.jallcom.2019.153237.

Wang et al., "A general method to synthesize and sinter bulk ceramics in seconds", Science 368, May 1, 2020, pp. 521-526.

Yan, G. et al., "Influence of sintering temperature on conductivity and mechanical behavior of the solid electrolyte LATP", Ceramics International, vol. 45, Issue 12, 2019, pp. 14697-14703, ISSN 0272-8842, https://doi.org/10.1016/j.ceramint.2019.04.191.

Interanational search report and written opinion of PCT/US2023/074226 mailed Feb. 7, 2024; 11 pages.

International search report and written opinion of PCT/US2024/015067 dated Jul. 12, 2024; 13 pages.

* cited by examiner

RAPID CERAMIC PROCESSING TECHNIQUES AND EQUIPMENT

CROSS-REFERENCE TO RELATED APPLICATIONS

This application is a Continuation of International PCT Patent Application No. PCT/US2022/019641, filed Mar. 9, 2022, and titled RAPID CERAMIC PROCESSING TECHNIQUES AND EQUIPMENT, which claims priority to, and the benefit of, U.S. Provisional Patent Application No. 63/158,861, filed Mar. 9, 2021, and titled RAPID CERAMIC PROCESSING TECHNIQUES AND EQUIPMENT; and U.S. Provisional Patent Application No. 63/233,684, filed Aug. 16, 2021, and titled RAPID CERAMIC PROCESSING TECHNIQUES AND EQUIPMENT, both applications of which are herein incorporated by reference in their entirety for all purposes.

FIELD

The present disclosure concerns processes for calcining, debindering, and/or sintering ceramics such as, but not limited to, lithium aluminum titanium phosphate, lithium-stuffed garnet oxides, lithium lanthanum titanate, and lithium aluminum germanium phosphate. In some examples, these ceramics are deposited as a layer on top of a metal layer. These two layers make a bilayer.

BACKGROUND

Certain methods of sintering lithium-stuffed garnet (lithium lanthanum zirconia oxide; LLZO), such as batch sintering of LLZO, has been described, in, for example, U.S. Pat. No. 10,563,918 B2 or 10,840,544 B2. High-throughput continuous sintering of certain ceramics is disclosed in U.S. Pat. No. 10,766,165 B2; and also International PCT Patent Application Publication No. WO 2017/003980 A1. Containerless sintering of certain ceramics is disclosed in US Patent Application No. US 2004/0206470 A1; and also International PCT Patent Application Publication No. WO 2014/103662 A1. Contactless sintering of certain ceramics is disclosed in US 2019/0077674 A1. Sintering of lithium aluminum titanium phosphate (LATP) and lithium lanthanum titanium oxide (LLTO) is disclosed in, for example, Yan, G. et al., *Influence of sintering temperature on conductivity and mechanical behavior of the solid electrolyte LATP, Ceramics International*, Volume 45, Issue 12, 2019, Pages 14697-14703, ISSN 0272-8842, https://doi.org/10.1016/j.ceramint.2019.04.191: Geng, H., et al., *Effect of sintering temperature on microstructure and transport properties of $Li_{3x}La_{2/3-x}TiO_3$ with different lithium contents, Electrochimica Acta*, Volume 56, Issue 9, 2011, Pages 3406-3414, ISSN 0013-4686, https://doi.org/10.1016/j.electacta.2010.06.031; Waetzig, et al., *Synthesis and sintering of $Li_{1.3}Al_{0.3}Ti_{1.7}(PO_4)_3$ (LATP) electrolyte for ceramics with improved $Li^+$ conductivity, Journal of Alloys and Compounds*, Volume 818, 2020, 153237, ISSN 0925-8388, https://doi.org/10.1016/j.jallcom.2019.153237; and Geng, et al., *Effect of sintering atmosphere on ionic conduction and structure of $Li_{0.5}La_{0.5}TiO_3$ solid electrolytes, Materials Science and Engineering*: B, Volume 164, Issue 2, 2009, Pages 91-95, ISSN 0921-5107, https://doi.org/10.1016/j.mseb.2009.07.011.

Despite this background, there have been no adequate public disclosures of methods of sintering lithium-stuffed garnet in a thin film, or bilayer, format and using high-throughput continuous sintering methods such as roll-to-roll methods. Accordingly, there exists a need in the relevant field to which the instant disclosure pertains relating to high-throughput continuous sintering methods for making thin film lithium-stuffed garnet.

SUMMARY

In an embodiment, set forth herein is a continuous manufacturing line (CML) including a front roller; an end roller; at least one sealed furnace, between the front roller and the end roller, wherein the at least one furnace comprises (a) a binder burn-out section; (b) a bisque section; and (c) a sintering section; and further wherein the CML includes at least one atmospheric controller which controls at least one condition in the furnace selected from the group consisting of gas flow rate, flow direction, gas composition, pressure, and a combination thereof.

In another embodiment, set forth herein is a continuous manufacturing line (CML) including a front roller; an end roller; and at least one sealed furnace, between the front roller and the end roller, wherein the at least one sealed furnace comprises (a) a binder burn-out section; (b) a bisque section; and (c) a sintering section; and further wherein the CML includes at least one atmospheric controller which controls at least one condition in the furnace selected from the group consisting of gas flow rate, flow direction, gas composition, pressure, and a combination thereof.

In yet another embodiment, set forth herein is a continuous manufacturing line (CML) including a front roller onto which is wound a bilayer, wherein the bilayer comprises a metal layer and a green body layer: an end roller; at least one furnace between the front roller and the end roller; and at least one atmospheric controller which controls at least one condition in the furnace selected from the group consisting of gas flow rate, flow direction, gas composition, pressure, and a combination thereof.

In still another embodiment, set forth herein is a process of using a continuous manufacturing line, comprising the following operations: (a) providing, or having provided, a CML as disclosed herein; (b) sintering a green body while moving the green body through the at least one furnace to produce a sintered body, and (c) winding the sintered body onto an end roller.

In some other embodiments, set forth herein is a sintered article prepared by a process set forth herein.

In still some other embodiments, set forth herein is a rechargeable battery prepared by a process set forth herein.

BRIEF DESCRIPTIONS OF THE DRAWINGS

DETAILED DESCRIPTION

Figure 1:
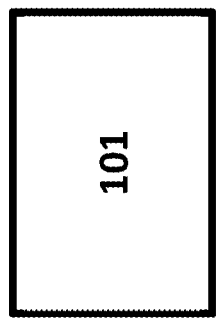
FIG. 1 shows an example of a continuous manufacturing line.
Figure 1:
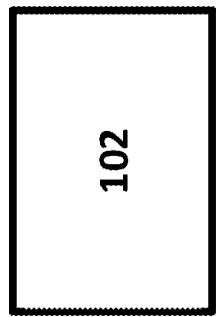
Figure 1:
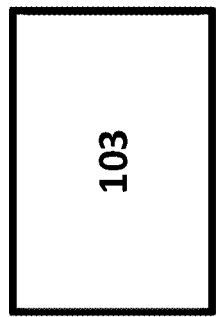

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the instant disclosure.

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

While shown in a horizontal format, in some examples, the continuous manufacturing lines in the figures herein could be assembled in a vertical format with green tapes or bilayers moving in a parallel or antiparallel direction relative to the immediate downward pull of gravity on the surface of the Earth. For example, a vertical format might have green tapes or bilayers moving up or down and normal (at 90°; i.e., a right angle) to the floor in which the process was occurring. Further, there may be angles between various ovens such that the green tape bends away from a straight line while being processed. The figures herein are presented as representative, non-limiting examples, of the instant disclosure. Other configurations and orientations of ovens and sintering lines are contemplated as embraced by the instant disclosure. In some configurations, the green tape moves parallel to gravity. For example, the green tape may hang like a curtain under the weight applied by gravitational forces. In some configurations, the tape moves perpendicular to gravity: for example, the tape may move in a direction parallel to the floor.

As used herein, a green film moving through a CML may be described in x-, y-, and z-dimensions. The x- and y-directions of the green film describe the length and width of the green film, whereas the z-direction describes the thickness of the green film. When a green film is moved through the CML, or in the machine direction (MD), the film is described as moving in the x-dimension, or the web dimension. The cross-web dimension (or cross direction (CD)), describes the y-dimension, in the same plane as the web. The z-dimension is perpendicular to the web and describes the thickness of the web.

Set forth herein is equipment and processes useful for achieving high quality, rapidly processed ceramic electrolyte films. Set forth herein are high-throughput continuous processes for sintering thin film ceramics. The ceramics may include, but are not limited to, lithium aluminum titanium phosphate (LATP), lithium-stuffed garnet oxides (e.g., $Li_7La_3Zr_2O_{12}$ and $Li_7La_3Zr_2O_{12}Al_2O_3$; aka LLZO), lithium lanthanum titanate, and lithium aluminum germanium phosphate (LAGP). The processes include, in certain examples, sintering steps in which the sintering film (i.e., a green film or green body on a bilayer which is undergoing the process of becoming a sintered film or sintered bilayer) is not in contact with any surface as it sinters. In some examples, when a bilayer is used, the metal layer may contact surfaces but the green body will not contact surfaces of the CML during its passage through the furnace or furnaces. By sintering without contacting other surfaces during sintering, the sintered ceramic films prepared by the instant process have unexpectedly advantageous properties such as low flatness. For lithium-stuffed garnet, the CML has the unexpectedly advantageous property of permitting the retention of the stoichiometric amount of lithium in a given LLZO formula and advantageous LLZO microstructure (e.g., high density, small grain size, and combinations thereof). In some examples, by not contacting other surfaces, the materials prepared lack surface flaws. In some examples, by not contacting the green body to surfaces, the bilayers prepared herein lack surface flaws on the ceramic side of the bilayer. In some examples, by not contacting other surfaces, the materials are prepared without problems such as sticking to a substrate. Additionally, these sintered LLZO are prepared via a novel rapid sintering process. The process is faster per unit volume of product than all known processes for making sintered films of LLZO.

A. DEFINITIONS

As used herein, the term "about," when qualifying a number, e.g., about 15% w/w; refers to the number qualified and optionally the numbers included in a range about that qualified number that includes ±10% of the number. For example, about 15% w/w includes 15% w/w as well as 13.5% w/w; 14% w/w, 14.5% w/w, 15.5% w/w, 16% w/w; or 16.5% w/w. For example, "about 75° C.," includes 75° C. as well 68° C., 69° C., 70° C., 71° C., 72° C., 73° C., 74° C., 75° C., 76° C., 77° C., 78° C., 79° C., 80° C., 81° C., 82° C., or 83° C.

As used herein, "selected from the group consisting of" refers to a single member from the group, more than one member from the group, or a combination of members from the group. A member selected from the group consisting of A, B, and C includes, for example, A only, B only, or C only, as well as A and B, A and C, B and C, as well as A, B, and C.

As used herein, "roller," refers to a revolving cylinder or other shape over or on which something is moved or which is used to convey, move, press, shape, spread, or smooth something. A roller is not necessary a perfect mathematical cylinder. A roller can be any shape onto which a tape or film could move across or bend around; or a shape onto which a tape or film could be wound up. In some examples, a roller has an outer diameter equal to, or greater than, 6 cm. In some examples, a roller has a winding tension equal to, or greater than, 20 g/cm.

As used herein, a green body is a material which is deposited from a slurry and which includes ceramics, or ceramic precursors, and at least one member selected from a solvent, a binder, a dispersant, a plasticizer, a surfactant, or a combination thereof. A green body is considered green before it is heated to either, or both, remove organic material such as the solvent, binder, dispersant, plasticizer, surfactant, or a combination thereof; or sinter the ceramic component of the green body. A green body is made by depositing a slurry onto a substrate and optionally allowing the deposited slurry to dry.

A bilayer herein includes a green body deposited onto a metal layer. In some examples, the green body is continuous and in other examples the green body is deposited in a patch coating format. After sintering, a bilayer may have a ceramic layer thickness of 10-40 μm and the metal layer thickness is 2-20 μm thick. The bilayer may have a ceramic layer thickness of 20-30 μm and the metal layer thickness is 3-10 μm thick.

As used herein, the phrase "green film" or "green tape" refers to an unsintered tape or film that includes lithium-stuffed garnet, precursors to lithium-stuffed garnet, or a combination thereof and at least one of a binder, plasticizer, carbon, dispersant, solvent, or combinations thereof. As used herein, "green film tape" refers to a roll, continuous layer, or cut portion thereof of casted tape, either dry or not dry, of green film. A green body is used interchangeably with green film or green tape. A green tape may also include the patches of green bodies which are deposited on a metal layer (i.e., patch coating of a metal layer).

As used herein, "front roller," refers to a roller positioned at the beginning of the CML and which unwinds up, or unrolls up, unsintered films.

As used herein, "end roller," refers to a roller positioned at the end of the CML and which winds up, or rolls up, sintered films.

As used herein, "sintered article receiver," refers to any device, including but not limited to an end roller or a machine which cuts and stacks sintered films. As used herein, an oven or a furnace is a partially or completely enclosed compartment in which material may be heated to a temperature above room temperature. For example, an oven may be heated to up to 1,200° C. A binder burn out oven is typically heated to less than 750° C. A bisque oven is typically heated to 600-900° C. A sintering oven is typically heated to 900° C. to 1,450° C. In some examples, at least one oven is enclosed in an atmospheric enclosure. In other examples, the CML is enclosed in an atmospheric enclosure. Herein oven and furnace are used interchangeably.

As used herein, "atmospheric control," refers to a system that controls the moisture content, oxygen content, gas flow rate, gas temperature, gas content(s), gas concentration(s), total pressure, vacuum, and combinations thereof within an enclosed or confined space. Atmospheric control can be dynamic in the sense that the system responds to sensed conditions and modifies the atmosphere so as to modify the atmosphere to more closely adhered to certain predetermined conditions. Atmosphere in this instance refers to the gaseous environment immediately in contact with a green tape that is being heated, calcined, sintered, or cooled; or the gaseous environment immediately in contact with a sintered tape that is being heated, sintered, annealed, or cooled. In some examples described herein, atmospheric control includes controlling the flow rate of an inlet gas comprising any of oxygen, argon, nitrogen, helium and/or hydrogen. In some examples, described herein, atmospheric control includes controlling the amount of water, oxygen, and lithium which is present in the gas state and in immediate contact with a green tape that is being heated, calcined, sintered, or cooled; or in immediate contact with a sintered tape that is being heated, sintered, annealed, or cooled. Atmospheric control may use various gas curtains, gas densities, gas flow rates, gas flow directions, or pulses of gases in, around, and near ovens, furnaces, and any inlets or outlets as well as any apertures through which material such as a green tape or sintered article may pass into or out of an oven or furnace. Atmospheric control may refer to a system wherein nitrogen gas, argon gas, forming gas, dry air, or humidified air is used within an enclosed or confined space. Atmospheric control may refer to a system wherein partial vacuum may be applied to the system, such as when the pressure is less than atmospheric pressure.

As used herein, a "gas curtain," refers to gas flow rates at certain entrances or exits (e.g., green tape inlets and sintered film outlets) of an oven wherein the gas flow rate is determined. For example, the gas flow rate may be between 1-50 Liters/minute at standard pressure and temperature. For example, the gas flow rate may be between greater than 50 Liters/minute at standard pressure and temperature. Gas curtains may have pressure sensors at an outlet. The gas curtain flows across the entrance or exit of an oven to control the flow of gas within the oven. A gas curtain may help to maintain a certain atmosphere inside the oven by preventing, partially or completely, gas from exiting or entering the oven.

As used herein the phrase "dry air," refers to air with a reduced amount of humidity. Dry air may be supplied in a clean room. Dry air is characterized as having a dew point less than −20° C., less than −30° C., less than −40° C., less than −50° C., less than −60° C., or less than −70° C.

As used herein the phrase "solid separator" refers to a Li ion-conducting material that is substantially insulating to electrons (e.g., the lithium ion conductivity is at least $10^3$ times, and often $10^6$ times, greater than the electron conductivity), and which acts as a physical barrier or spacer between the positive and negative electrodes in an electrochemical cell.

As used herein the phrase "annealing." refers heating a material, e.g., from 100° C. to 1400° C., or e.g., 100° C., 150° C., 200° C., 250° C., 300° C., 350° C., 400° C., 450° C., 500° C., 550° C., 600° C., 650° C., 700° C., 750° C., 800° C., 850° C., 900° C., 950° C., 1000° C., 1050° C., 1100° C., 1150° C., 1200° C., 1250° C., 1300° C., 1350° C., or 1450° C. in a controlled atmosphere, e.g., dry air or argon.

Some example annealing methods are found in U.S. Pat. No. 9,966,630 B2, which is incorporated by reference herein in its entirety for all purposes.

As used herein, area-specific resistance (ASR) is measured by electrochemical cycling using an Arbin or Biologic instrument unless otherwise specified to the contrary. The ASR is calculated by measuring a voltage drop ΔV after 30-180 s in response to a current interrupt measurement ASR=ΔV/J, where J is the current density in $A/cm^2$.

As used herein, ionic conductivity is measured by electrical impedance spectroscopy methods known in the art.

As used herein, the phrase "ambient conditions," refers to room temperature and a natural atmosphere such as the atmosphere of planet Earth that includes approximately 78% $N_2$ & 21% $O_2$; and/or with moisture also present. Ambient conditions include standard temperature and pressure, with a relative humidity of at least 1%.

As used herein, the term "electrolyte" refers to an ionically conductive and electrically insulating material. Electrolytes are useful for electrically insulating the positive and negative electrodes of a rechargeable battery while allowing for the conduction of ions, e.g., $Li^+$, through the electrolyte As used herein, the phrase "film" or "thin film" refers to a thin membrane of less than 0.5 mm in thickness and greater than 10 nm in thickness. A thin film is also greater than 5 mm in a lateral dimension. A "film" or "thin-film" may be produced by a continuous process such as tape-casting, spray-coating, or slip casting. In some examples, the production may include batch process. In some examples, the production may include screen-printing.

As used herein, the phrase "film thickness" refers to the distance, or median measured distance, between the top and bottom faces of a film. As used herein, the top and bottom faces refer to the sides of the film having the largest surface area. As used herein, thickness is measured by cross-sectional scanning electron microscopy.

As used herein, the term "pellet" refers to a small unit of bulky material compressed into any of several shapes and sizes, e.g., cylindrical, rectangular, or spherical. The compressed material is disc-shaped and may be 0.5-20 cm in diameter and 0.5 mm to 2 cm in height. Typically, the compressed material is disc-shaped and 10 mm in diameter and 1 mm in height. Pellets may also include additional agents to help bind the material compressed into the pellet. In some examples, these additional agents are referred to as binding agents and may include, but are not limited to, polymers such as poly(ethylene) oxide. In some examples, polyvinyl butyral is used as a binding agent. Pellets are typically made by pressing a collection of powder materials in a press. This pressing makes the powder materials adhere to each other and increases the density of the collection of powder material when compared to the density of the collection of powder material before pressing. In some instances, the powder material is heated and/or an electrical current is passed through the powder material during the pressing.

As used herein, the term "pressed pellet" refers to a pellet having been submitted to a pressure (e.g., 5000 PSI) to further compress the pellet.

As used herein, "binder" refers to a polymer with the capability to increase the adhesion and/or cohesion of material, such as the solids in a green tape. Suitable binders may include, but are not limited to, PVDF, PVDF-HFP, SBR, and ethylene alpha-olefin copolymer. A "binder" refers to a material that assists in the adhesion of another material. For example, as used herein, polyvinyl butyral is a binder because it is useful for adhering garnet materials. Other binders may include polycarbonates. Other binders may include poly acrylates and poly methacrylates. These examples of binders are not limiting as to the entire scope of binders contemplated here but merely serve as examples. Binders useful in the present disclosure include, but are not limited to, polypropylene (PP), polyethylene, atactic polypropylene (aPP), isotactic polypropylene (iPP), ethylene propylene rubber (EPR), ethylene pentene copolymer (EPC), polyisobutylene (PIB), styrene butadiene rubber (SBR), polyolefins, polyethylene-co-poly-1-octene (PE-co-PO), polyethylene-co-poly(methylene cyclopentane) (PE-co-PMCP), poly(methyl methacrylate) (and other acrylics), acrylic, polyvinylacetacetal resin, ethyl methacrylate, polyvinyl butyral resin, PVB, polyvinyl acetal resin, stereoblock polypropylenes, polypropylene polymethylpentene copolymer, polyethylene oxide (PEO), PEO block copolymers, silicone, and the like. In some examples, including any of the foregoing, the binder is a polymer is selected from the group consisting of polyacrylonitrile (PAN), polypropylene, polyethylene, polyethylene oxide (PEO), poly methyl methacry late (PMMA), polyvinyl chloride (PVC), polyvinyl pyrrolidone (PVP), polyethylene oxide poly(allyl glycidyl ether) PEO-AGE, polyethylene oxide 2-methoxy ethoxy ethyl glycidyl ether (PEO-MEEGE), polyethylene oxide 2-methoxyethoxyethyl glycidyl poly (allyl glycidyl ether) (PEO-MEEGE-AGE), polysiloxane, polyvinylidene fluoride (PVDF), polyvinylidene fluoride hexafluoropropylene (PVDF-HFP), ethylene propylene (EPR), nitrile rubber (NPR), styrene-butadiene-rubber (SBR), polybutadiene polymer, polybutadiene rubber (PB), polyisobutadiene rubber (PIB), polyolefin, alpha-polyolefin, ethylene alphapolyolefin, polyisoprene rubber (PI), polychloroprene rubber (CR), acrylonitrile-butadiene rubber (NBR), and polyethyl acrylate (PEA).

Solvents used herein may be selected from alcohols, such as methanol, ethanol, isopropanol, butanol, pentanol, hexanol, and other classes of organic solvents such as ethers and aromatic solvents, including, but not limited to, dibutyl ether, diethyl ether, diisopropyl ether, dimethoxy ethane, diethoxy ethane, tetrahydrofuran, toluene, xylene, toluene, ethanol, acetone, N-methyl-2-pyrrolidone (NMP) diacetone alcohol, ethyl acetate, acetonitrile, hexane, nonane, dodecane, and methyl ethyl ketone (MEK).

In certain examples, the dispersant used is selected from fish oil, Mehaden Blown Fish Oil, mineral oils, phosphate esters. Rhodaline™, Rhodoline 4160, phospholan-131™, BYK™ 22124, BYK-22146™, Hypermer KD1™, Hypermer KD6™ and Hypermer KD7™.

As used herein the phrase "casting a film," refers to the process of delivering or transferring a liquid or a slurry into a mold, or onto a substrate, such that the liquid or the slurry forms, or is formed into, a film. Casting may be done via doctor blade, meyer rod, comma coater, gravure coater, microgravure, reverse comma coater, slot die, slip and/or tape casting, and other methods.

As used herein, the phrase "high-throughput continuous" refers to roll-to-roll processes as well as roll-to-sheet processes. Some roll-to-sheet processes have a roller at the start of the process but, at the end, the sintered film is cut at the outlet rather than rolled up as a finished product.

As used herein, the phrase "lithium-stuffed garnet" refers to oxides that are characterized by a crystal structure related to a garnet crystal structure. Lithium-stuffed garnets include compounds having the formula $Li_A La_B Zr_C O_F$, $Li_4 L$-

$a_BM'_CM''_DTa_EO_F$, or $Li_ALa_BM'_CM''_DNb_EO_F$, wherein $4<A<8.5$, $1.5<B<4$, $0<C\leq 2$, $0<D<2$; $0<E<2.5$, $10<F<13$, and M' and M'' are each, independently in each instance selected from Al, Mo, W, Nb, Ga, Sb, Ca, Ba, Sr, Ce, Hf, Rb, and Ta; or $Li_aLa_bZr_cAl_dMe''_eO_f$, wherein $5<a<7.7$; $2<b<4$; $0<c\leq 2.5$; $(<d<2$; $0<e<2$, $10<f<13$ and Me'' is a metal selected from Nb, V, W, Mo, Ta, Ga, and Sb. Garnets, as used herein, also include those garnets described above that are doped with Al or $Al_2O_3$. Also, garnets as used herein include, but are not limited to, $Li_4La_BZr_CO_F+yAl_2O_3$, wherein x may be from 5.8 to 7.0, and y may be 0, 1, 0.2, 0.3, 0.4, 0.5, 0.6, 0.7, 0.8, 0.9, or 1.0; and wherein $4<A<8.5$, $1.5<B<4$, $0<C\leq 2$, $0<D<2$; $10<F<13$. Also, garnets as used herein include, but are not limited to, $Li_xLa_3Zr_2O_{12}+yAl_2O_3$, wherein x may be from 5.8 to 7.0, and y may be 0, 1, 0.2, 0.3, 0.4, 0.5, 0.6, 0.7, 0.8, 0.9, or 1.0. As used herein, garnet does not include YAG-garnets (i.e., yttrium aluminum garnets, or, e.g., $Y_3Al_5O_{12}$). As used herein, garnet does not include silicate-based garnets such as pyrope, almandine, spessartine, grossular, hessonite, or cinnamon-stone, tsavorite, uvarovite and andradite and the solid solutions pyrope-almandine-spessarite and uvarovite-grossular-andradite. Garnets herein do not include nesosilicates having the general formula $X_3Y_2(SiO_4)_3$ wherein X is Ca, Mg, Fe, and, or, Mn; and Y is Al, Fe, and, or, Cr.

As used herein, the phrase "garnet precursor chemicals" or "chemical precursor to a Garnet-type electrolyte" refers to chemicals which react to form a lithium stuffed garnet material described herein. These chemical precursors include, but are not limited to lithium hydroxide (e.g., LiOH), lithium oxide (e.g., $Li_2O$), lithium carbonate (e.g., $Li_2CO_3$), zirconium oxide (e.g., $ZrO_2$), lanthanum oxide (e.g., $La_2O_3$), aluminum oxide (e.g., $Al_2O_3$), aluminum (e.g., Al), aluminum nitrate (e.g., $AlNO_3$), aluminum nitrate nonahydrate, niobium oxide (e.g., $Nb_2O_5$), tantalum oxide (e.g., $Ta_2O_5$).

As used herein, the phrase "$d_{50}$ diameter" refers to the median size, in a distribution of sizes, measured by microscopy techniques or other particle size analysis techniques, such as, but not limited to, scanning electron microscopy or dynamic light scattering. $D_{50}$ may be characterized as a "number $D_{50}$" or "volume $D_{50}$", where a "number $D_{50}$" is a diameter at which 50% of the particles have a smaller diameter, and a "volume $D_{50}$" is a diameter at which 50% of the volume of the smallest particles have a smaller diameter. Unless specified otherwise, a $D_{50}$ herein is a volume $D_{50}$, i.e. $D_{50}$ includes the characteristic dimension at which 50% of the volume of particles are smaller than the recited size.

As used herein, the phrase "$d_{90}$ diameter" refers to a size, in a distribution of sizes, measured by microscopy techniques or other particle size analysis techniques, such as, but not limited to, scanning electron microscopy or dynamic light scattering. $D_{90}$ includes the characteristic dimension at which 90% of the volume of particles are smaller than the recited size.

As used herein, "flatness" of a surface refers to the greatest normal distance between the lowest point on a surface and a plane containing the three highest points on the surface, or alternately, the greatest normal distance between the highest point on a surface and a plane containing the three lowest points on the surface. It may be measured with an atomic force microscope (AFM), a high precision optical microscope, or laser interferometry height mapping of a surface.

B. CONTINUOUS MANUFACTURING LINE (CML) APPARATUS OR DEVICE

In some embodiments, set forth herein is a continuous manufacturing line (CML) comprising: a front roller; an end roller; at least one sealed furnace, between the front roller and the end roller, wherein the at least one furnace comprises (a) a binder burn-out section; (b) a bisque section; and (c) a sintering section; and at least one atmospheric controller which controls at least one condition in the furnace selected from the group consisting of gas flow rate, flow direction, gas composition, pressure, and a combination thereof. In some examples, the at least one atmospheric controller controls gas flow rate in the at least one furnace. In some examples, the at least one atmospheric controller controls flow direction in the at least one furnace. In some examples, the at least one atmospheric controller controls gas composition in the at least one furnace. In some examples, the at least one atmospheric controller controls pressure in the at least one furnace. In some examples, the at least one atmospheric controller controls a combination of gas flow rate, flow direction, gas composition, and pressure in the at least one furnace.

A batch process of manufacturing ceramic films may be a process wherein the films come out in groups, or batches, and not in a continuous fashion. Discrete amounts of films, or products, may come from a batch process. Batch processes of ceramic film production may include the use of setters or setter stacks. In contrast, a continuous process may produce a certain amount of products, or films, without any break in time during the process. There are many advantages to continuous processes, such as savings in time and cost.

In some examples, including any of the foregoing, the CML includes a bilayer wound onto the front roller, wherein the bilayer comprises a metal layer and a green body layer. In certain examples, the green body is a continuous layer deposited on the metal layer. In certain other examples, the green body is a patched or discontinuous layer deposited on the metal layer. In some examples, the CML includes a roll of metal on the front roller, and the bilayer is made while the metal is unrolled from the front roller and a green body is cast onto the metal layer. And then, in some examples, the bilayer passes on to the binder burn-out section as it moves through the CML after being formed as noted herein.

In some embodiments, set forth herein is a continuous manufacturing line (CML) comprising: a front roller onto which is wound a bilayer, wherein the bilayer comprises a metal layer and a green body layer: an end roller; at least one furnace between the front roller and the end roller; and at least one atmospheric controller which controls at least one condition in the furnace selected from the group consisting of gas flow rate, flow direction, gas composition, pressure, and a combination thereof.

In some examples, including any of the foregoing, the green body layer comprising unsintered lithium-stuffed garnet.

In some examples, including any of the foregoing, the green body layer comprising the chemical precursors to lithium-stuffed garnet.

In some examples, including any of the foregoing, the at least one furnace comprises (a) a binder burn-out section; (b) a bisque section; and (c) a sintering section.

In some examples, including any of the foregoing, the at least one furnace comprises a single furnace with a cooling section, a binder burn-out section; a bisque section; and a sintering section, and then another cooling section. In some examples, additional cooling sections are present between the binder burn-out section and bisque section or between the bisque section and the sintering section.

In some examples, including any of the foregoing, the sintering section is not directly exposed to Earth's atmosphere. This means that the sintering section has a unique atmosphere in contact with the part of the sintering film or bilayer which is inside the sintering section, and this unique atmosphere is not Earth's atmosphere (e.g., 78% $N_2$, 21% $O_2$). Instead, in the sintering section, the gas which contacts the sintering film or bilayer is an inert or a reducing gas such as Ar, $N_2$, $H_2$, or a combination thereof. This may be accomplished by sealing (partially or completely sealing) the sintering section in a way to isolate it from the Earth's atmosphere. This may be accomplished by flowing gas into, or out of, the sintering section in a way to isolate it from the Earth's atmosphere. This may be accomplished by placing the sintering section in a room which is filled with an inert or reducing gas.

In some examples, including any of the foregoing, the at least one furnace is not directly exposed to Earth's atmosphere. This means that the at least one furnace has a unique atmosphere in contact with the part of the sintering film or bilayer which is inside the at least one furnace, and this unique atmosphere is not Earth's atmosphere (e.g., 78% $N_2$, 21% $O_2$). Instead, in the at least one furnace, the gas which contacts the sintering film or bilayer is an inert or a reducing gas such as Ar, $N_2$, $H_2$, or a combination thereof. This may be accomplished by sealing the at least one furnace in a way to isolate it from the Earth's atmosphere. This may be accomplished by flowing gas into, or out of, the at least one furnace in a way to isolate it from the Earth's atmosphere. This may be accomplished by placing the at least one furnace in a room which is filled with an inert or reducing gas.

In some examples, including any of the foregoing, the at least one furnace is sealed such that the at least one atmospheric controller controls the flow of gas into and out of the at least one furnace.

In some examples, including any of the foregoing, the flow rate in the binder burn-out section is higher than the flow rate in the bisque section, higher than the flow rate in the sintering section, or higher than both the flow rate in the bisque section and higher than the flow rate in the sintering section.

In some examples, including any of the foregoing, the atmospheric controller maintains a consistent atmospheric condition inside the at least one furnace.

In some examples, including any of the foregoing, the atmospheric controller maintains a consistent atmospheric condition inside the binder burn-out section.

In some examples, including any of the foregoing, the atmospheric controller maintains a consistent atmospheric condition inside the bisque section.

In some examples, including any of the foregoing, the atmospheric controller maintains a consistent atmospheric condition inside the sintering section.

In some examples, including any of the foregoing, the CML includes at least one gas curtain coupled to the at least one furnace.

In some examples, including any of the foregoing, the CML includes a gas curtain at the inlet to the at least one furnace. In some examples, the gas curtain is used to reduce the flow of gas into or out of the furnace by creating a kinetic barrier for gas moving transverse to the flow gas in the gas curtain.

In some examples, including any of the foregoing, the CML includes a gas curtain at the outlet to the at least one furnace. In some examples, the gas curtain is used to reduce the flow of gas into or out of the furnace by creating a kinetic barrier for gas moving transverse to the flow gas in the gas curtain.

In some examples, including any of the foregoing, the CML includes a pressurized gas line between the bisque section and the sintering section which pumps gas into the bisque section and into the sintering section. In some examples, gas flows into the at least one furnace between the bisque section and the sintering section and directs gas into the bisque section and the sintering section. In some examples, this flow of gas is assisted with vacuum pumps coupled to the sintering section. In some examples, this flow of gas is assisted with vacuum pumps coupled to the bisque section.

If an atmosphere controller did not control the atmosphere in the at least one furnace, then the ceramic surface of the bilayer will not comprise a defect free layer of lithium-stuffed garnet. For example, the ceramic surface of the bilayer may have a layer of $Li_2CO_3$ on it. This is one benefit to using the atmospheric controller as set forth herein.

In some examples, including any of the foregoing, the CML includes exhaust ports in the binder burn-out section, in the bisque section, in the sintering section, or a combination thereof. In some examples, the CML is configured to evacuate as much air as possible from the binder burn-out section so that the volatile materials and combustion residues which may be present in the binder burn-out section are quickly removed from the at least one furnace and not deposited onto the bilayer.

In some examples, including any of the foregoing, the at least one furnace is enclosed in a sealed container.

In some examples, including any of the foregoing, the CML is enclosed in sealed room.

In some examples, including any of the foregoing, the binder burn-out section is enclosed in a sealed container.

In some examples, including any of the foregoing, the bisque section is enclosed in a sealed container.

In some examples, including any of the foregoing, the sintering section is enclosed in a sealed container.

In some examples, including any of the foregoing, the sealed container comprises an atmosphere of Ar, $N_2$, $H_2O$, $H_2$, or a combination thereof.

In some examples, including any of the foregoing, the atmospheric controller maintains a reducing atmosphere in the bisque section.

In some examples, including any of the foregoing, the atmospheric controller maintains an atmosphere in the bisque section comprising argon (Ar) gas; nitrogen ($N_2$) gas; hydrogen ($H_2$) gas; or a mixture thereof.

In some examples, including any of the foregoing, the atmospheric controller maintains a reducing atmosphere in the sintering section.

In some examples, including any of the foregoing, the atmospheric controller maintains an atmosphere in the sintering section comprising argon (Ar) gas; nitrogen ($N_2$) gas; hydrogen ($H_2$) gas; or a mixture thereof.

In some examples, including any of the foregoing, the atmospheric controller maintains an atmosphere comprising less than 500 ppm $O_2$ in the bisque section, the sintering section, or both the bisque section and the sintering section.

In some examples, including any of the foregoing, the atmospheric controller maintains an atmosphere comprising less than 400 ppm $O_2$ in the bisque section, the sintering section, or both the bisque section and the sintering section.

In some examples, including any of the foregoing, the atmospheric controller maintains an atmosphere comprising less than 300 ppm $O_2$ in the bisque section, the sintering section, or both the bisque section and the sintering section.

In some examples, including any of the foregoing, the atmospheric controller maintains an atmosphere comprising less than 200 ppm $O_2$ in the bisque section, the sintering section, or both the bisque section and the sintering section.

In some examples, including any of the foregoing, the atmospheric controller maintains an atmosphere comprising less than 100 ppm $O_2$ in the bisque section, the sintering section, or both the bisque section and the sintering section.

In some examples, including any of the foregoing, the atmospheric controller maintains an atmosphere comprising less than 10 ppm $O_2$ in the bisque section, the sintering section, or both the bisque section and the sintering section.

In some examples, including any of the foregoing, the atmospheric controller maintains an atmosphere in the binder burn-out section comprising $H_2O$ at less than 5% v/v.

In some examples, including any of the foregoing, the $H_2$ gas is present at about 1, 2, 3, 4, or 5% v/v.

In some examples, including any of the foregoing, the $H_2$ gas is present at about 2.9% v/v.

In some examples, including any of the foregoing, the $H_2$ gas is present at about 5% v/v.

In some examples, including any of the foregoing, the at least one furnace, or a part thereof, is under vacuum at a pressure less than 1 atmosphere (atm).

In some examples, including any of the foregoing, the at least one furnace, or a part thereof, is under vacuum at a pressure less than 100 Torr.

In some uses here, the at least one furnace is pumped to a low vacuum to evacuate air inside the at least one furnace and then the at least one furnace is back-filled with an inert or reducing gas. For example, the at least one furnace may be back-filled with $N_2$. For example, the at least one furnace may be back-filled with $Ar/H_2$. For example, the at least one furnace may be back-filled with Ar.

In some examples, including any of the foregoing, the atmosphere in the binder burn-out section is different from the atmosphere in the bisque section.

In some examples, including any of the foregoing, the atmosphere in the binder burn-out section is different from the atmosphere in the sintering section.

In some examples, including any of the foregoing, the atmosphere in the bisque section is different from the atmosphere in the sintering section.

In some examples, including any of the foregoing, the amount of $O_2$ in the binder burn-out section is less than 0.2% by volume.

In some examples, including any of the foregoing, the amount of $CO_2$ in the binder burn-out section is less than 0.2% by volume.

In some examples, including any of the foregoing, the amount of carbon from $CO_2$ in the sintering section is less than 100 parts-per-million (ppm).

In some examples, including any of the foregoing, the amount of carbon from $CO_2$ in the sintering section is about 50 ppm to 100 ppm.

In some examples, including any of the foregoing, the bilayer shrinks primarily in the z-direction when moving through the sintering section. Herein, the z-direction is the direct perpendicular to the bilayer surface. Herein, the x-direction is the direction which the bilayer moves through the CML. The y-direction is perpendicular to the x-direction and in the same plane as the bilayer. The z-direction is perpendicular to both the x- and y-directions.

In some examples, including any of the foregoing, the CML is configured to heat the bilayer at a rate higher than 2.5° C./min.

In some examples, including any of the foregoing, the CML is configured to heat the bilayer at a rate higher than 5° C./min, 10° C./min, 15° C./min, 20° C./min, 25° C./min, 30° C./min, 35° C./min, 40° C./min, 45° C./min, 50° C./min, 55° C./min, 60° C./min, 65° C./min, 70° C./min, 75° C./min, 80° C./min, 85° C./min, 90° C./min, 100° C./min, 200° C./min, or 300° C./min.

In some examples, including any of the foregoing, the CML is configured to heat the bilayer at a rate of about 5° C./min to about 50° C./min. If the bilayer is heated too slowly, the material may not densify properly. To slow of a heating ramp allows the ceramic particles in the bilayer to neck too soon.

In some examples, including any of the foregoing, the CML includes infrared heaters which are used to heat the bilayer.

In some examples, including any of the foregoing, the CML includes inductive carbon plate heaters. In certain examples, the carbon plates do not tough the green body. In certain examples, the carbon plates do not touch the bilayer.

In some examples, including any of the foregoing, the CML uses carbon plate/heating by induction to heat the bilayer.

In some examples, including any of the foregoing, the CML includes lamp based heating to heat the bilayer In some examples, including any of the foregoing, the CML includes oven-based heating.

Depending on the embodiment, heating elements used herein may be carbon plates or carbon paper. In some examples, the carbon plates or carbon paper comprise conductive carbon. Depending on the embodiment, heating elements may be molybdenum plates or molybdenum paper. In some examples, the molybdenum plates or molybdenum paper may comprise conductive molybdenum. Current may be applied to heat the conductive carbon plates or conductive carbon paper elements at appropriate rates to temperatures to facilitate sintering within the temperature ranges described herein.

In an embodiment, the heating elements may be from 1 to 200 millimeters from the material being sintered. In an embodiment, the heating elements may be from 1 to 190 millimeters from the material being sintered. In an embodiment, the heating elements may be from 1 to 180 millimeters from the material being sintered. In an embodiment, the heating elements may be from 1 to 170 millimeters from the material being sintered. In an embodiment, the heating elements may be from 1 to 160 millimeters from the material being sintered. In an embodiment, the heating elements may be from 1 to 150 millimeters from the material being sintered. In an embodiment, the heating elements may be from 1 to 140) millimeters from the material being sintered. In an embodiment, the heating elements may be from 1 to 130 millimeters from the material being sintered. In an embodiment, the heating elements may be from 1 to 120 millimeters from the material being sintered. In an embodiment, the heating elements may be from 1 to 110 millimeters from the material being sintered. In an embodiment, the heating elements may be from 1 to 100 millimeters from the material being sintered. In an embodiment, the heating elements may be from 1 to 90 millimeters from the material being sintered. In an embodiment, the heating elements may be from 1 to 80 millimeters from the material being sintered. In an embodiment, the heating elements may be from 1 to 70 millimeters from the material being sintered. In an embodiment, the heating elements may be from 1 to 60 millimeters from the material being sintered. In an embodiment, the heating elements may be from 1 to 50 millimeters from the material being sintered. In an embodiment, the heating elements may be from 1 to 40 millimeters from the material being sintered. In an embodiment, the heating elements may be from 1 to 30 millimeters from the material being sintered. In an embodiment, the heating elements may be from 1 to 20 millimeters from the material being sintered. In an embodiment, the heating elements may be from 1 to 10 millimeters from the material being sintered.

In an embodiment, the heating heating temperature may range from 900° C. to 2000° C. In an embodiment, the heating temperature may range from 900° C. to 1900° C. In an embodiment, the heating temperature may range from 900° C. to 1800° C. In an embodiment, the heating temperature may range from 900° C. to 1800° C. In an embodiment, the heating temperature may range from 900° C. to 1700° C. In an embodiment, the heating temperature may range from 900° C. to 1600° C. In an embodiment, the heating temperature may range from 900° C. to 1500° C. In an embodiment, the heating temperature may range from 900° C. to 1400° C. In an embodiment, the heating temperature may range from 900° C. to 1300° C. In an embodiment, the heating temperature may range from 900° C. to 1200° C.

In an embodiment, the heating time period may range from 5 seconds to 30 minutes. In an embodiment, the heating time period may range from 5 seconds to 25 minutes. In an embodiment, the heating time period may range from 5 seconds to 20 minutes. In an embodiment, the heating time period may range from 5 seconds to 15 minutes. In an embodiment, the heating time period may range from 5 seconds to 10 minutes. In an embodiment, the heating time period may range from 5 seconds to 5 minutes. In an embodiment, the heating time period may range from 5 seconds to 4 minutes. In an embodiment, the heating time period may range from 5 seconds to 3 minutes. In an embodiment, the heating time period may range from 5 seconds to 4 minutes. In an embodiment, the heating time period may range from 5 seconds to 1 minute.

In some examples, the heating elements may have the same area as the material being heated. In some examples, the heating elements may be longer than, and as wide as the material being heated. In some examples, the heating elements may be the same length as, and be wider than the material being heated. In some examples, the heating elements may be shorter than the material being heated. In embodiments in which there is a single heating element, that heating element may have any of the just-described areal relationships to material being heated.

In some examples, including any of the foregoing, the CML has a cool down zone after the sintering section. For example, in a 60 inch furnace, there may be a 20 inch hot zone and two 20 inch cooling zones before and after the hot zone.

In some example, the at least one furnace has a 1 mm gap above the green body. In some example, the at least one furnace has a 2 mm gap above the green body. In some example, the at least one furnace has a 3 mm gap above the green body. In some example, the at least one furnace has a 4 mm gap above the green body. In some example, the at least one furnace has a 5 mm gap above the green body. This gap prevents lithium from escaping from the green body.

Figure 15:
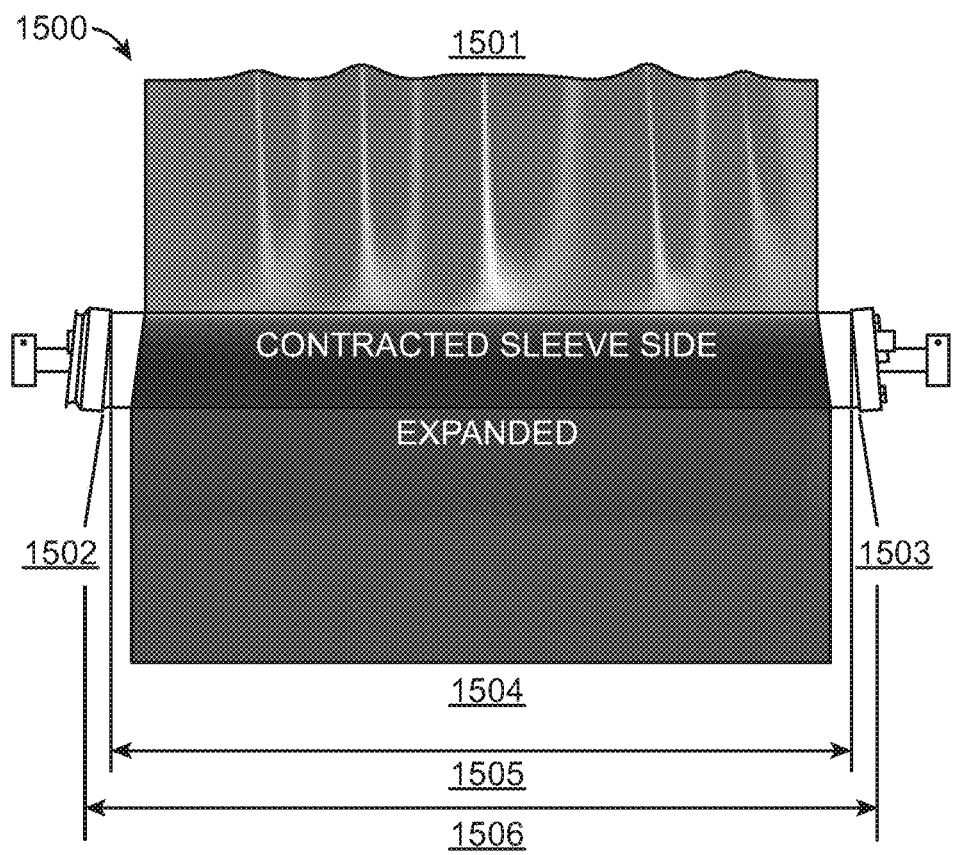
FIG. 15 shows a spread roller component of a continuous manufacturing line.

In some examples, including any of the foregoing, the CML is configured to reduce or eliminate cross-web wrinkling (for example as shown in FIG. 15) by applying the appropriate amount of tension.

In some examples, including any of the foregoing, the CML is configured to reduce or eliminate cross-web wrinkling (for example as shown in FIG. 15) by using rollers at the entry or exit points of the at least one furnace. Slip rollers, driving rollers, under-driving rollers, or other rollers may be used.

In some examples, including any of the foregoing, the CML is configured so that the residence time in the sintering section is two minutes or less.

In some examples, including any of the foregoing, the CML is configured so that the residence time in the sintering section is one minute and thirty seconds or less.

In some examples, including any of the foregoing, the CML is configured so that the residence time in the sintering section is one minute or less.

In some examples, including any of the foregoing, the CML is configured so that the residence time in the sintering section is about thirty seconds or less.

In some examples, including any of the foregoing, the CML is configured so that the residence time in the sintering section is about thirty seconds.

In some examples, including any of the foregoing, the CML is configured so that the residence time in binder burn-out section is about ten times the residence time in the sintering section.

In some examples, including any of the foregoing, the CML includes at least one tension regulator.

In some examples, including any of the foregoing, the tension of the bilayer after the front roller is 270 g.

In some examples, including any of the foregoing, the tension of the bilayer before the end roller is 500 g.

In some examples, including any of the foregoing, the width of the bilayer is 8 cm.

In some examples, including any of the foregoing, the tension of the bilayer is about 34 g/cm.

In some examples, including any of the foregoing, the tension of the bilayer is about 35 N/10 μm.

In some examples, including any of the foregoing, the tension of the bilayer is less than 50% of its yield strength In some examples, including any of the foregoing, the tension of the bilayer is less than 50% of the yield strength of the metal layer.

In some examples, including any of the foregoing, the tension of the bilayer is about 25% to 50% of its yield strength In some examples, including any of the foregoing, the tension of the bilayer is about 25% to 50% of the yield strength of the metal layer.

In some examples, including any of the foregoing, the green body is a green tape.

In some examples, including any of the foregoing, the green body is a patched green tape. Patch coating means that the green body is not continuously deposited on the metal layer. Patch coating means that the green body is deposited in spaced intervals on the metal layer. The metal layer may be scored or partially cut between patches. The metal between patches may be used as the tabs in a battery cell. See, for example, FIG. 16 which shows patch coating.

Figure 16:
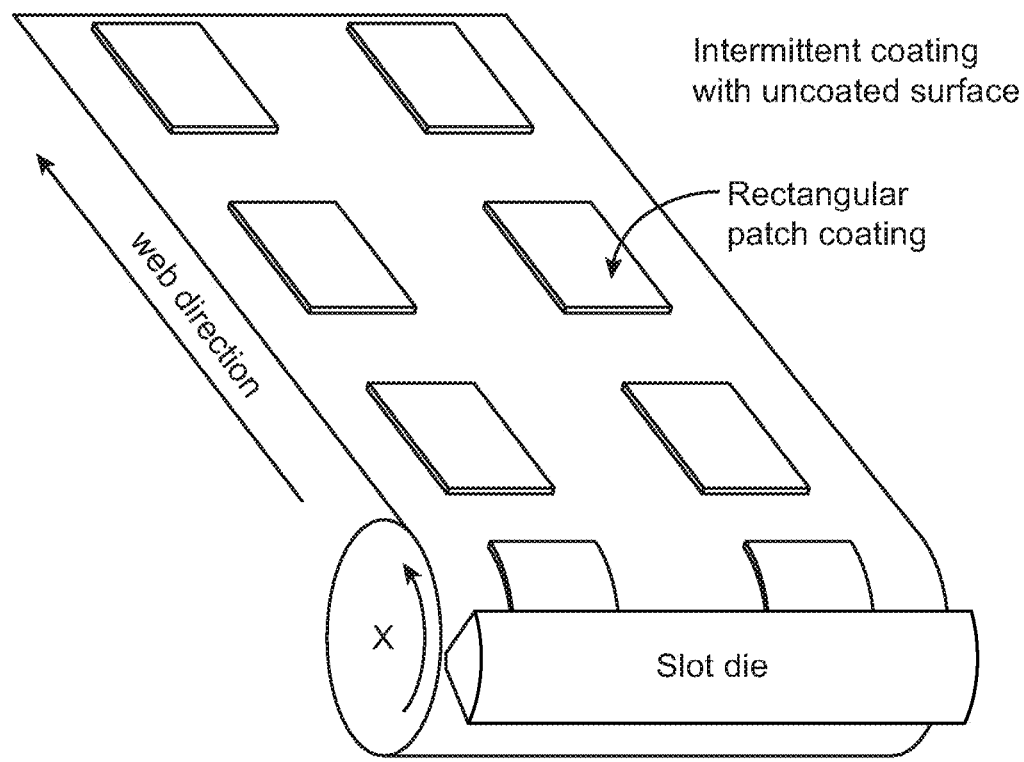
FIG. 16 shows a bilayer with green bodies deposited in a patch coating fashion (i.e., a patch coated tape).

In FIG. 16, a metal layer is unrolled underneath a slot die. The slot die coats rectangular patch coatings onto the metal layer, which results in intermittent coating with uncoated metal layer surface between the rectangular patch coatings. The arrow and label "web direction" shows the direction which the metal layer is unrolled and passes under the slot die. When patch coating is used, the front roller in the CML may only have a wound up roll of a metal foil and the bilayer will be constructed as the metal foil unwinds from the front roller and passes under the slot die and before entering the binder burn-out section. In some other embodiments, the front roller will have a wound up roll of the bilayer in which the bilayer has a metal foil with a patch coating thereupon and together the metal foil and patch coating are wound up on the front roller.

Figure 17:
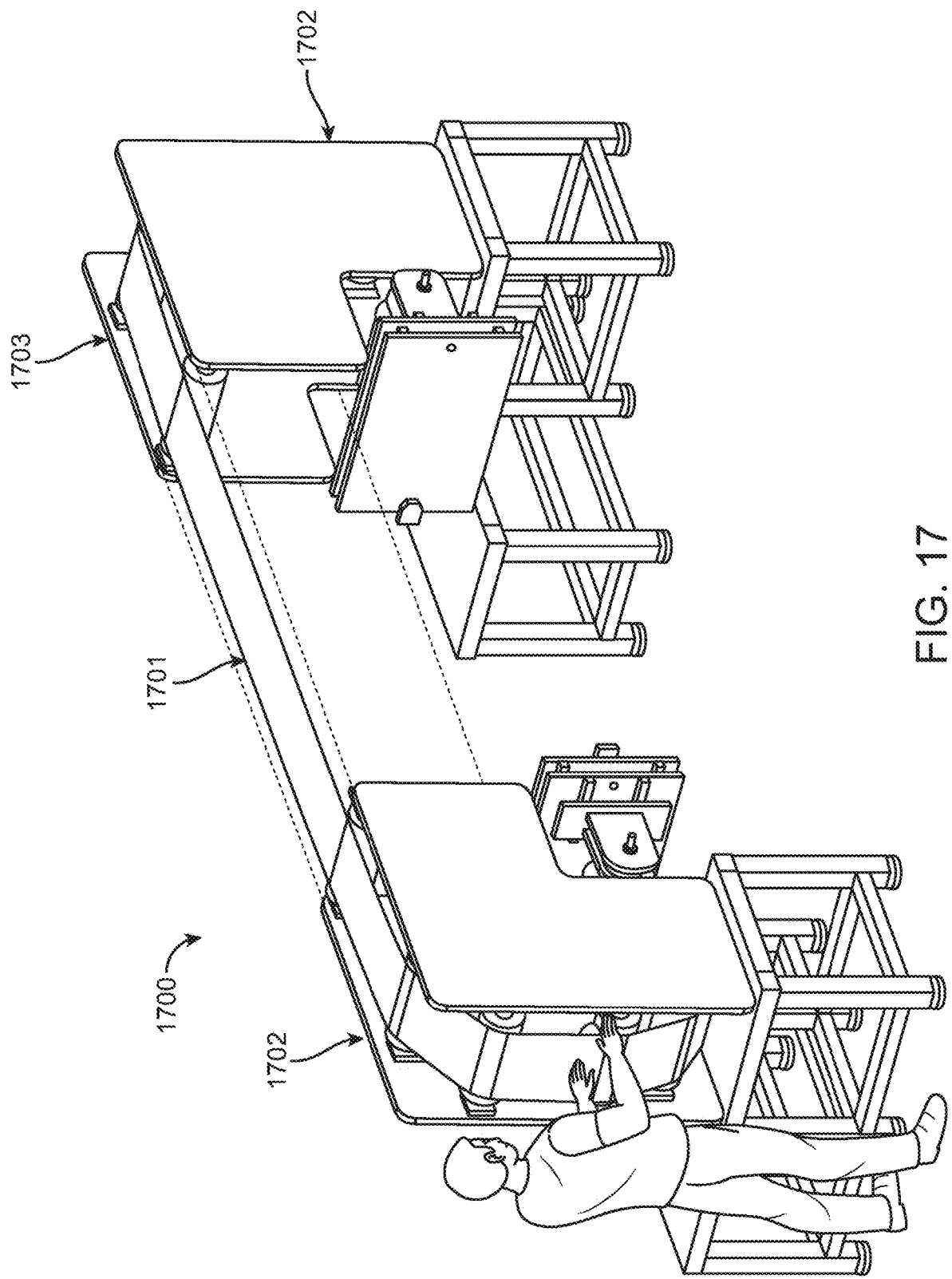
FIG. 17 shows a tape in a horizontal processing orientation.

In some examples, including any of the foregoing, the bilayer is oriented for horizontal processing as it moves through the CML. Horizontal processing means that the bilayer moves through the CML so that its metal layer moves parallel to the ground and is under the green body layer. See FIG. 17 which shows an example apparatus 1700 in the orientation used for horizontal processing. In FIG. 17, tape, 1701 is moving horizontally on the top portion of the CML, 1702, from position 1702 to position 1703. Before position 1702 and after position 1703 the tape turns and moves vertically.

Figure 18:
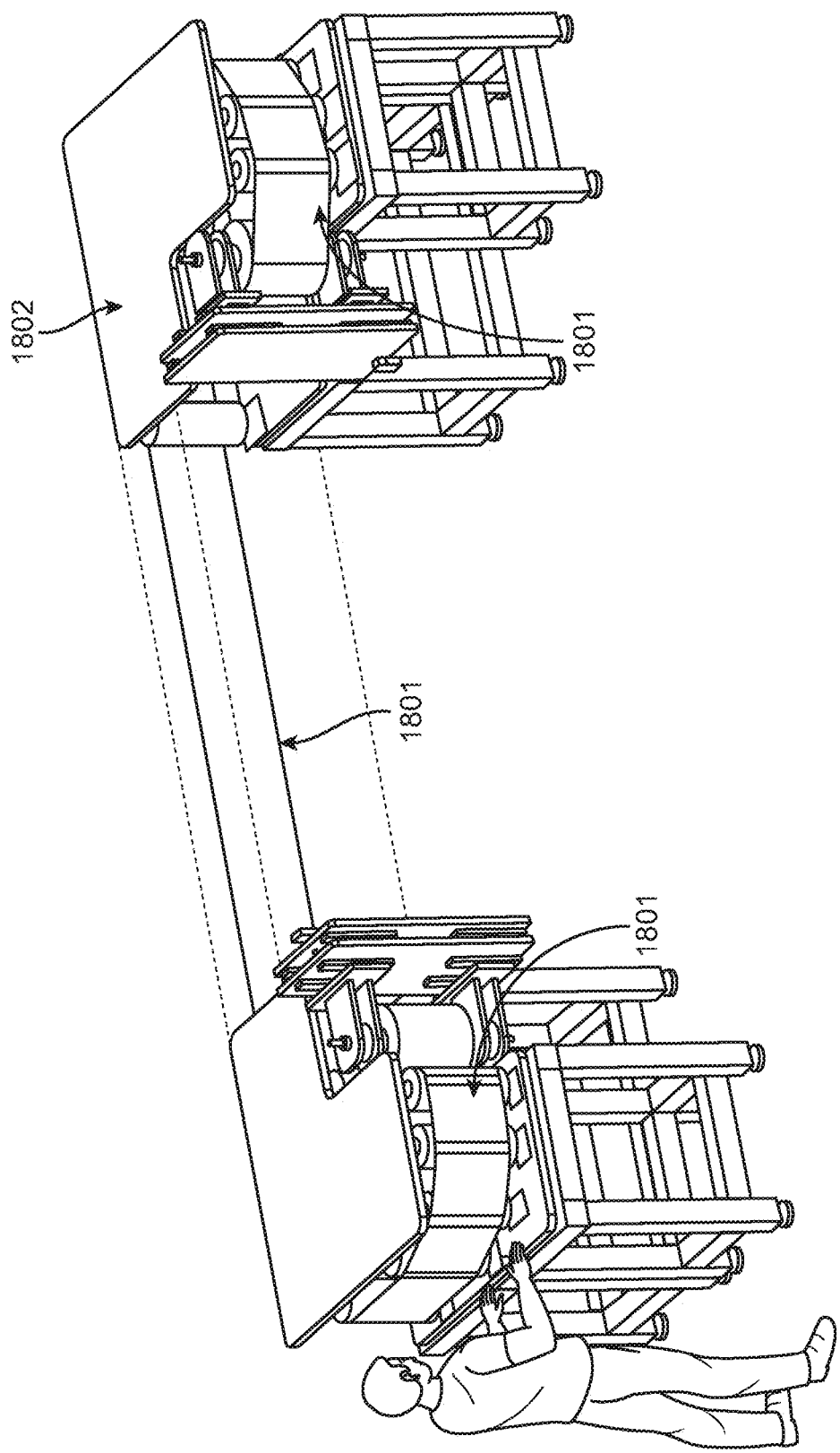
FIG. 18 shows a tape in a curtain processing orientation.

In some examples, including any of the foregoing, the bilayer is oriented for curtain processing as it moves through the CML. Curtain processing means that the bilayer is turned on its edge so that both the metal layer and green body layer move parallel to the ground but the metal layer is not under the green body layer: rather the metal layer and green body layer are side-by-side. Curtain processing may be beneficial to prevent debris from falling on the top surface of the green body. Curtain processing may be beneficial to prevent sagging of the bilayer. See FIG. 18 which shows an example of the orientation used for curtain processing. In FIG. 18, tape, 1801 is moving in the curtain processing orientation through the CML, 1802.

Figure 19:
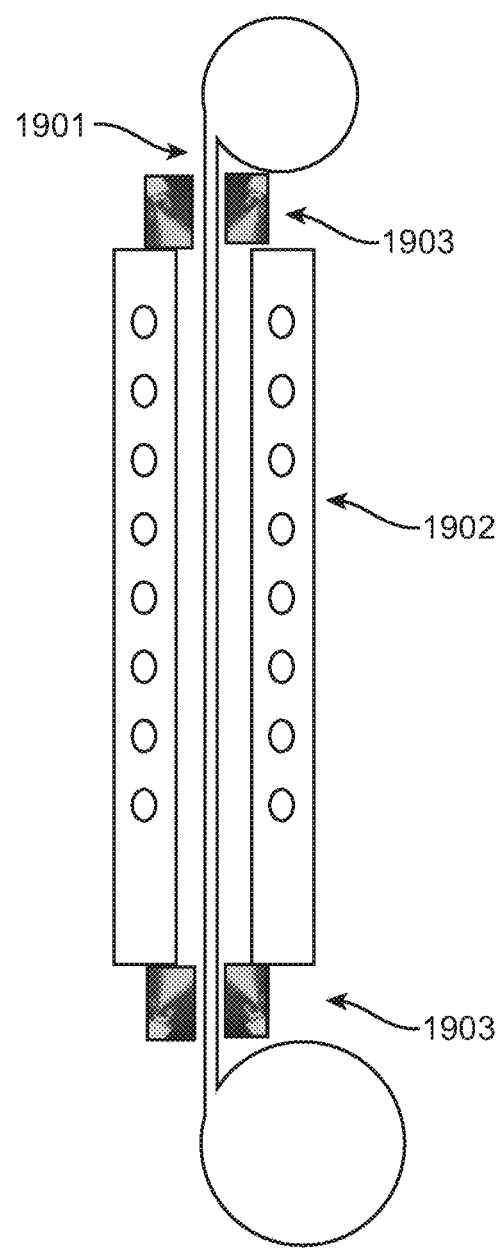
FIG. 19 shows a tape in a vertical processing orientation.

In some examples, including any of the foregoing, the bilayer is oriented for vertical processing as it moves through the CML. Vertical processing means that the bilayer moves parallel or antiparallel to the force of gravity on planet Earth. See FIG. 19 which shows an example of the orientation used for vertical processing. In FIG. 19, tape 1901 is moving in the vertical processing orientation through the CML 1902. Also shown in FIG. 19, are nitrogen gas lines, 1903, for use as a curtain or as an air knife.

In some examples, including any of the foregoing, the CML includes a middle roller after the binder burn-out section onto which a bilayer is wound as it moves through the CML.

In some examples, including any of the foregoing, the bilayer on the middle roller does not include a binder in the green body.

In some examples, including any of the foregoing, the at least one furnace has a green tape inlet.

In some examples, including any of the foregoing, the metal layer of the bilayer comprises a metal selected from the group consisting of nickel (Ni), iron (Fe), copper (Cu), platinum (Pt), gold (Au), silver), an alloy thereof, or a combination thereof.

In some examples, including any of the foregoing, the metal layer of the bilayer is an alloy of Fe and Ni.

In some examples, including any of the foregoing, the metal layer of the bilayer is an alloy of Fe and Ni, and the amount of Fe is 1% to 25% (w/w) with the remainder being Ni.

In some examples, including any of the foregoing, the thickness of the metal layer of the bilayer is 1 µm to 20 µm.

In some examples, including any of the foregoing, the thickness of the metal layer of the bilayer is 1 µm to 10 µm.

In some examples, including any of the foregoing, the thickness of the metal layer of the bilayer is 5 µm to 10 µm.

In some examples, including any of the foregoing, the bilayer is not supported by an air bearing as it moves through the CML.

In some examples, including any of the foregoing, the bilayer is suspended as it moves through the CML.

In some examples, including any of the foregoing, the bilayer is suspended as it moves through the binder burn-out section.

In some examples, including any of the foregoing, the bilayer is suspended as it moves through the bisque section.

In some examples, including any of the foregoing, the bilayer is suspended as it moves through the sintering.

In some examples, including any of the foregoing, the binder burn-out section is a binder burn-out furnace.

In some examples, including any of the foregoing, the binder burn-out furnace is a furnace heated to a temperature sufficient to volatilize, pyrolize, combust, or decompose a binder present in the green body.

In some examples, including any of the foregoing, the temperature in the binder burn-out furnace is between 80° C. and 500° C.

In some examples, including any of the foregoing, the temperature in the binder burn-out furnace is between 100° C. and 500° C.

In some examples, including any of the foregoing, the temperature in the binder burn-out furnace is between 80° C. and 800° C.

In some examples, including any of the foregoing, the binder burn-out furnace comprises oxygen. In certain of these examples, the sintering furnace does not comprise oxygen.

In some examples, including any of the foregoing, the bisque section is a bisque furnace.

In some examples, including any of the foregoing, the bisque furnace is a furnace heated to a temperature sufficient to bisque the green body after removing of the binder.

In some examples, including any of the foregoing, the temperature in the bisque furnace is between 100° C. and 800° C.

In some examples, including any of the foregoing, the sintering section is a sintering furnace.

In some examples, including any of the foregoing, the sintering furnace is a furnace heated to a temperature sufficient to sinter the green body.

In some examples, including any of the foregoing, the sintering furnace is a furnace heated to a temperature sufficient to sinter lithium-stuffed garnet.

In some examples, including any of the foregoing, the temperature in the sintering furnace is between 500° C. and 1300° C.

In some examples, including any of the foregoing, the temperature in the sintering furnace is between 1000° C. and 1300° C.

In some examples, including any of the foregoing, the temperature in the sintering furnace is between 1100° C. and 1300° C.

In some examples, including any of the foregoing, the binder burn-out furnace is hermetically coupled to the bisque furnace and the bisque furnace is hermetically sealed to the sintering furnace.

In some examples, including any of the foregoing, the at least one furnace is a single furnace.

In some examples, including any of the foregoing, the at least one end roller has a roller diameter greater than 4 cm.

In some examples, including any of the foregoing, the at least one end roller has a roller diameter greater than 5 cm.

In some examples, including any of the foregoing, the at least one end roller has a roller diameter greater than 6 cm.

In some examples, including any of the foregoing, the at least one end roller has a roller diameter greater than 7 cm.

In some examples, including any of the foregoing, the at least one end roller has a roller diameter greater than 8 cm.

In some examples, including any of the foregoing, the at least one end roller has a winding tension of greater than 20 g per linear cm.

In some examples, including any of the foregoing, the airspace above and below the bilayer is configured to maintain a lithium-rich atmosphere in contact with the sintering film.

In some examples, including any of the foregoing, the airspace above and below the bilayer is configured to maintain a least 95% by weight of the lithium in the lithium-stuffed garnet.

In some examples, including any of the foregoing, the CML includes at least two end rollers.

In some examples, including any of the foregoing, the green body comprises unsintered lithium-stuffed garnet or chemical precursors to lithium-stuffed garnet.

In some examples, including any of the foregoing, the CML includes a sintered bilayer wound around the at least one end roller.

In some examples, including any of the foregoing, the sintered bilayer comprise sintered lithium-stuffed garnet.

In some examples, including any of the foregoing, the green body comprises a binder.

In some examples, including any of the foregoing, the green body comprises a dispersant.

In some examples, including any of the foregoing, the green body comprises a solvent or a combination of solvents.

In some examples, including any of the foregoing, the CML is configured to move the bilayer through the at least one furnace at rate of at least 2 inches per minute.

In some examples, including any of the foregoing, the CML is configured to move the bilayer through the sintering section at rate of at least 2 inches per minute.

In some examples, including any of the foregoing, the CML includes a curved ramp before the at least one furnace.

In some examples, including any of the foregoing, the CML includes a curved ramp before the binder burn-out section.

In some examples, including any of the foregoing, the CML includes a curved ramp before the bisque section.

In some examples, including any of the foregoing, the CML includes a curved ramp before the sintering section.

In some examples, including any of the foregoing, the CML includes a curved ramp inside the at least one furnace.

In some examples, including any of the foregoing, the CML includes a curved ramp inside the binder burn-out section.

In some examples, including any of the foregoing, the CML includes a curved ramp inside the bisque section.

In some examples, including any of the foregoing, the CML includes a curved ramp inside the sintering section.

In some examples, including any of the foregoing, the curved ramp is coated.

In some examples, including any of the foregoing, the coating is a lithium aluminate coating.

In some examples, including any of the foregoing, the coating is boron nitride coating.

In some examples, including any of the foregoing, the top surface of the curved ramp is made of a ceramic.

In some examples, including any of the foregoing, the ceramic is silicon carbide, boron nitride, alumina, zirconia, lithium aluminate.

In some examples, including any of the foregoing, the ramp is made of SS 430, SS 304, Kovar, Invar, Haynes 214, greater than 99.5% (w/w) alumina, a carbon composite, boron nitride, or a combination thereof.

Figure 20:
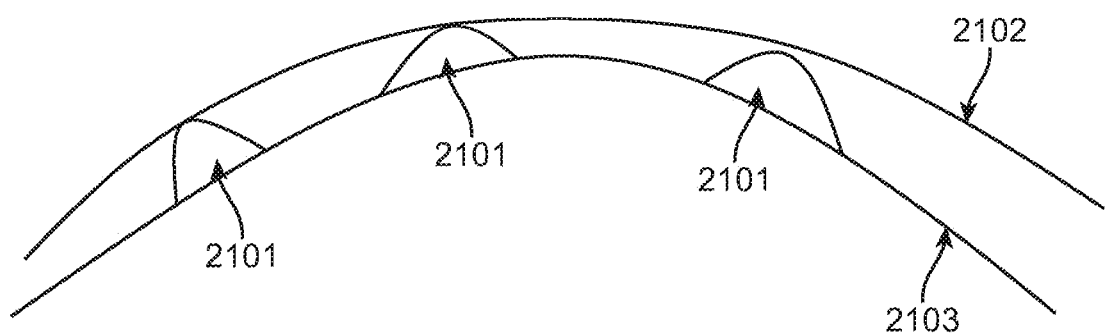
FIG. 20 shows an example of a speed bump component of a curved runway on a continuous manufacturing line.

In some examples, including any of the foregoing, the CML includes speed bumps over which the bilayer passes as it moves through the CML. See FIG. 20 which shows speed bumps, 2102, over which tape, 2102, is tensioned as it moves across a curved run-way, 2103.

In some examples, speed bumps are deposed a runway. In some examples, speed bumps are deposed on a flat runway. In some examples, the speed bumps are deposed on a on curved runways. These bumps break the stress from the metal layer continuously touching the runway. These bumps creates "airspace" when the film goes up and over the "speed bump". In some examples, there is a speed bump on the run way spaced about 1 inches from the next speed bump. In some examples, there is a speed bump on the run way spaced about 2 inches from the next speed bump. In some examples, there is a speed bump on the run way spaced about 3 inches from the next speed bump. In some examples, there is a speed bump on the run way spaced about 4 inches from the next speed bump. In some examples, there is a speed bump on the run way spaced about 5 inches from the next speed bump. In some examples, there is a speed bump on the run way spaced about 6 inches from the next speed bump. In some examples, there is a speed bump on the run way spaced about 7 inches from the next speed bump. In some examples, there is a speed bump on the run way spaced about 8 inches from the next speed bump. In some examples, there is a speed bump on the run way spaced about 9 inches from the next speed bump. In some examples, there is a speed bump on the run way spaced about 10 inches from the next speed bump.

In some examples, the CML includes curved runways which curve in the cross-web direction. Similar to a bike tire, wherein the tire is curved in the y direction and the x direction. This curved runway may help to minimize wrinkles in the bilayer. The metal foil may want to expand as it moves through the CML and this curvature allows the metal to expand and release off the CML track.

In some examples, including any of the foregoing, the CML includes at least one curved runway.

In some examples, including any of the foregoing, the CML includes at least one curved runway, that curve in the y and x direction.

In some examples, including any of the foregoing, the runway is made of SS 430, SS 304, Kovar, Invar, Haynes 214, greater than 99.5% (w/w) alumina, a carbon-carbon composite, boron nitride, or a combination thereof.

In some examples, the runway is made of a weave carbon-carbon composite. In certain examples, this runway made of a weaved carbon-carbon composite is used only on the hot portions of the CML over which the tape may move. In some other examples, the entire runway, or the surface of the entire runway, of the CML is a weaved carbon-carbon composite.

An example continuous manufacturing line (100) is shown in FIG. 1. CML includes a front section (101) and an end section (103). In between is a middle section (102). In between, and in line with, the front section and the end section, are at least three ovens. In some examples, there could be one oven with multiple heating zones which accomplish what three separate ovens could accomplish individually. In other examples, there could be two ovens. In yet other examples, there could be even more ovens. Front section may have one or more rollers on which green (i.e., unsintered) tape is provided. The rollers may be referred to as rewinders, laminators, drives, brakes, masters, slaves, or dancers. Additional rollers, pins, and pulleys may be present in front section to apply tension, to flatten, to roll, to curl, to imprint, or to direct green tapes from the front section to binder burn out oven and/or the green tape inlet (not shown) of an oven. End section may have one or more rollers on which sintered tape is received from the oven through an outlet. Additional rollers, pins, and pulleys may be present in the end section to apply tension, to flatten, to roll, to curl, to imprint, or to direct the sintered tapes to the front section from the outlet of oven. Weights may also be used to apply tension.

In some examples, tension is applied to the green tape or sintered film using an electric motor. In this example, the tension is proportional to the motor torque (for a given roller diameter). In certain examples, one can control the torque by the current going through the motor (for DC motors).

In some examples, tension is applied to the green tape or sintered film using a movable so-called "dancer" roller. In certain examples, one can control the tension by the amount of weight hanging from the dancer.

In some examples, one large oven is used and has one green tape inlet and one sintered tape outlet. In some other examples, multiple ovens are used and some ovens have a green tape inlet and an outlet for a processed green tape which may not be completely sintered. This processed green tape would enter another oven inlet for sintering and then exit that another oven through a sintered film outlet. In some examples, the one large oven is enclosed in an enclosure which provides a controlled atmosphere in contact with the green tape. In other examples, the multiple ovens are enclosed in a single enclosure which provides a controlled atmosphere in contact with the green tape. In other examples, the multiple ovens are enclosed in multiple enclosures which provide a controlled atmosphere in contact with the green tape.

Herein, ovens may be substituted for furnace.

In some examples, a roller has an inner diameter between 2 cm to 100 cm, 5 cm to 50 cm, or 5 cm to 15 cm. A roller may comprise metals, such as nickel, steel, stainless steel, copper, aluminum, or combinations thereof. A roller may be made up of nickel, steel, stainless steel, copper, aluminum, Kovar, Invar, zirconia on another substrate, zirconia on a ceramic, zirconia on a metal, alumina, quartz, boron nitride, silicon carbide, ceramic, ceramic on metal, LLZO on Ni, or combinations thereof. A roller may be made of SS 430, SS 304, Kovar, Invar, Haynes 214, greater than 99.5% (w/w) alumina, a carbon-carbon composite, boron nitride, or a combination thereof.

In some examples, after the sintered film is passed through an oven, the sintered film is passed through a tool which cuts the sintered film into desired sizes and deposits the cut films into a sintered article receiver. The tool may comprise an in-line laser cutter. The tool may cut the sintered film into the desired size (parallel and/or perpendicular to the direction of travel through the CML).

In some examples, oven (102) is a bisque oven. In some examples, the oven (102) has multiple, distinct heating zones in the oven—e.g., one zone for bisqueing and one zone for sintering.

In some examples, oven (103) is a sintering oven. In some examples, the oven (103) has multiple, distinct heating zones in the oven—e.g., one zone for bisqueing and one zone for sintering.

A unique atmosphere, in this instance, means that gaseous or vapor environment in one furnace is materially different from the gaseous or vapor environment in another furnace. For example, a material difference in one oven relative to another may include, but is not limited to, a 5% or greater difference in total pressure, a 5% or greater difference in partial pressure, a two-fold difference in the concentration or amount of a given gas (e.g., $O_2$, $H_2$, $N_2$, Ar, Xe, or $H_2O$) or a 10-fold difference in the flow rate of one gas or gases (e.g., gas mixture) in one oven relative to another oven. For example, one furnace may include a sufficient amount of $O_2$ so that organic material can combust if heated to the ignition temperature of the organic material. This may be the conditions in the binder burn out section. In such an example, if another furnace had a low concentration of $O_2$ such that combustion could not be sustained therein even at the combustion temperature, this would demonstrate a material difference in one oven relative to another oven. For example, the sintering oven may have a lower oxygen concentration than the binder burn out oven. In another example, one furnace may include water vapor in concentrations greater than 1,000 parts-per-million (ppm); and another oven may include water vapor in concentrations less than 100 ppm. This difference in the partial pressure of $H_2O$ would also demonstrate a material difference in one oven relative to another oven. In another example, one oven may be under vacuum while another oven may be at 1 atm pressure, and this difference would be a material difference in one oven relative to another oven. In another example, two ovens may have similar gas mixtures but one oven may have a total pressure that is 5% or more lower than the other oven, and this difference would be a material difference in one oven relative to another oven.

In certain examples, the binder burn-out oven may include oxidizing agents mixed into the gas or atmosphere which contacts the green tape. These oxidizing agents may include $H_2O$, $O_2$, or clean-dry air. In certain examples, the sintering oven does not include oxidizing agents mixed into the gas or atmosphere which contact the sintering film.

In some examples, the pressurized enclosure comprises argon (Ar) gas.

In some examples, the pressurized enclosure comprises nitrogen ($N_2$) gas.

In some examples, the pressurized enclosure further comprises hydrogen ($H_2$) gas.

In some examples, the $H_2$ gas is present at about 5% v/v.

In some examples, the pressurized enclosure further comprises water ($H_2O$) gas.

In some examples, the pressurized enclosure further comprises inert gases such as, but not limited to, $N_2$, $H_2$, Ar, and their mixtures, e.g., $N_2$ and $H_2$. In some examples, the mixture is 2.9% $H_2$ and 97.1% $N_2$. In some examples, the mixture is 0% $H_2$ and 100% $N_2$. In some examples, the mixture is 1% $H_2$ and 99% $N_2$. In some examples, the mixture is 2% $H_2$ and 98% $N_2$. In some examples, the mixture is 3% $H_2$ and 97% $N_2$. In some examples, the mixture is 4% $H_2$ and 98% $N_2$. In some examples, the mixture is 5% $H_2$ and 96% $N_2$. In some examples, the mixture is 6% $H_2$ and 94% $N_2$. In some examples, the mixture is 7% $H_2$ and 93% $N_2$. In some examples, the mixture is 8% $H_2$ and 92% $N_2$. In some examples, the mixture is 9% $H_2$ and 91% $N_2$. In some examples, the mixture is 10% $H_2$ and 90% $N_2$. In some examples, the mixture is 0-10% $H_2$ and 90-100% $N_2$. In some examples, the mixture is 0-5% $H_2$ and 95-100% $N_2$. In some examples, including any of the foregoing, $O_2$ is present at less than 10 parts-per-million (ppm). In some examples, including any of the foregoing, $O_2$ is present at 5-10 ppm.

In some examples, including any of the foregoing, $O_2$ is present at less than 10 ppm in the binder burn-out oven.

In some examples, including any of the foregoing, $O_2$ is present at less than 10 ppm in the sintering oven.

In some examples, including any of the foregoing, $O_2$ is present at 5-10 ppm in the binder burn-out oven.

In some examples, including any of the foregoing, $O_2$ is present at 5-10 ppm in the sintering oven.

In some examples, including any of the foregoing, $O_2$ is present at $10^{-16}$ to $10^{-20}$ Pa in the sintering oven.

In some examples, the ovens include $H_2O$ at 1 to 500 ppm.

In some examples, the ovens include $H_2O$ at 1 to 1000 ppm.

In some examples, the opening gap or aperture through which a green tape, a sintering tape, or a sintered tape would pass has a shape that is cylindrical, elliptical, rectangular, or square, wherein the dimension (e.g., the diameter of the gap is circular, the length of a side of the gap is square, or one side if the gap is a rectangle, or one axis if the gap is an ellipse) of the gap or aperture is less than 10 cm but greater than 1 cm. In some examples, the opening gap is shaped like a rectangle that is about 5 to 20 cm wide and 1 to 20 mm tall. In some examples, the opening gap is shaped like a rectangle that is about 5 to 20 cm wide and 1 mm tall. In some examples, the opening gap is shaped like a rectangle that is about 5 to 20 cm wide and 2 mm tall. In some examples, the opening gap is shaped like a rectangle that is about 5 to 20 cm wide and 3 mm tall. In some examples, the opening gap is shaped like a rectangle that is about 5 to 20 cm wide and 4 mm tall. In some examples, the opening gap is shaped like a rectangle that is about 5 to 20 cm wide and 5 mm tall. In some examples, the opening gap is shaped like a rectangle that is about 5 to 20 cm wide and 6 mm tall. In some examples, the opening gap is shaped like a rectangle that is about 5 to 20 cm wide and 7 mm tall. In some examples, the opening gap is shaped like a rectangle that is about 5 to 20 cm wide and 8 mm tall. In some examples, the opening gap is shaped like a rectangle that is about 5 to 20 cm wide and 9 mm tall. In some examples, the opening gap is shaped like a rectangle that is about 5 to 20 cm wide and 10 mm tall. In some examples, the opening gap is shaped like a rectangle that is about 5 to 20 cm wide and 11 mm tall. In some examples, the opening gap is shaped like a rectangle that is about 5 to 20 cm wide and 12 mm tall. In some examples, the opening gap is shaped like a rectangle that is about 5 to 20 cm wide and 13 mm tall. In some examples, the opening gap is shaped like a rectangle that is about 5 to 20 cm wide and 14 mm tall. In some examples, the opening gap is shaped like a rectangle that is about 5 to 20 cm wide and 15 mm tall. In some examples, the opening gap is shaped like a rectangle that is about 5 to 20 cm wide and 16 mm tall. In some examples, the opening gap is shaped like a rectangle that is about 5 to 20 cm wide and 17 mm tall. In some examples, the opening gap is shaped like a rectangle that is about 5 to 20 cm wide and 18 mm tall. In some examples, the opening gap is shaped like a rectangle that is about 5 to 20 cm wide and 19 mm tall. In some examples, the opening gap is shaped like a rectangle that is about 5 to 20 cm wide and 20 mm tall. In some examples, the dimension of the gap or aperture is 9 cm. In some examples, the dimension of the gap or aperture is 8 cm. In some examples, the dimension of the gap or aperture is 7 cm. In some examples, the dimension of the gap or aperture is 6 cm. In some examples, the dimension of the gap or aperture is 5 cm. In some examples, the dimension of the gap or aperture is 4 cm. In some examples, the dimension of the gap or aperture is 3 cm. In some examples, the dimension of the gap or aperture is 2 cm. In some examples, the dimension of the gap or aperture is 1 cm. In some examples, the dimension of the gap or aperture is 500 µm. In some examples, the dimension of the gap or aperture is 400 µm. In some examples, the dimension of the gap or aperture is 8 mm. In some examples, the dimension of the gap or aperture is 300 µm. In some examples, the dimension of the gap or aperture is 6 mm. In some examples, the dimension of the gap or aperture is 200 µm. In some examples, the dimension of the gap or aperture is 4 mm. In some examples, the dimension of the gap or aperture is 100 µm. In some examples, the dimension of the gap or aperture is 50 µm. In some examples, this dimension of the gap or aperture at the gap or aperture is also the same dimension of the gap or aperture through the oven as the green tape passes through the oven. In some examples, this narrowest dimension at the gap or aperture is also the same dimension of the gap or aperture through the oven as the green tape passes through the oven. The opening gap or aperture through which the green tape or sintered tape would pass may have its gap as no more than 5 meters. In some examples, the largest dimension of the opening gap may be between 1 cm and 5 meters, 1 cm and 4 meters, 1 cm and 3 meters, 1 cm and 2 meters, 1 cm and 1 meter, 1 cm and 50 centimeters, or 1 cm and 5 centimeters.

In some examples, the length of the roll of green tape or sintered film may be between 10 meters and 10,000 meters. In some examples, the length of the roll of green tape or sintered film may be between 10 meters and 1000 meters. In some examples, the length of the roll of green tape or sintered film may be between 10 meters and 500 meters. In some examples, the length of the roll of green tape or sintered film may be between 10 meters and 100 meters.

In certain examples, the rapid sintering occurs within a confined space. The confined space may have an atmosphere that reduces the loss of lithium during sintering of LLZO and helps to retain the stoichiometric amount of lithium in a given LLZO formula. The confined space may be a portion of the oven through which the sintering film moves as it is sintered. Certain processes set forth herein include steps for suspending the film using tension without contacting a surface. Tension may be applied with weights or other methods for applying tension. Certain processes set forth herein include steps for suspending the film using tension without contacting a surface while moving through the aforementioned confined space. Herein, the portion of the film which is suspended is not contacting a surface, but the devices used to apply tension are contacting other portions of the film. In some examples, only the suspended portion of film is sintered while it is not touching other surfaces. Certain processes set forth herein include steps for contacting only one surface (e.g., the bottom surface of a tape or film may contact a roller, tension device, or substrate) during sintering. Certain processes set forth herein include steps for suspending the film using tension, gas flow; or a combination of both tension and gas flow, without contacting a surface. Herein, "without contacting a surface" is specifically referencing the sintering film as it moves through an oven. During the sintering phase, the portion of the green tape that is undergoing sintering is not in contact with any surface which could impart sintering defects into the surface of the green tape. As a green tape moves outside of an oven, the green tape may encounter rollers, rewinders, pins, posts, tension devices, and the like, which contact the green tape's surface. Similarly, as a sintering film moves outside of an oven, the sintered film may encounter rollers, rewinders, pins, posts, and the like, which contact the sintered film. In this case, the contact occurs after the film is sintered, not during sintering. Certain processes set forth herein include steps for continuous peeling of a green tape from a Mylar substrate on which it is disposed. This may occur at the beginning of a sintering process to unroll the green tape from a roller and introduce the peeled green tape into a binder burn out oven. Certain processes set forth herein include steps for applying tension to a green film while it is sintered. Certain processes set forth herein include steps for avoiding reactions with water/oxygen in the ambient while a green tape is processed from a green tape into a sintered film of LLZO. In some examples, a metal foil is used in place of a Mylar substrate. In some examples, the metal foil is an iron foil, a copper foil, a nickel foil, an alloy thereof, or a combination thereof. In some examples, the metal foil is a combination of iron and nickel. In certain examples, the combination of iron and nickel has more than 1% iron and the remainder is nickel. In certain examples, the combination of iron and nickel has more than 2% iron and the remainder is nickel. In certain examples, the combination of iron and nickel has more than 3% iron and the remainder is nickel. In certain examples, the combination of iron and nickel has more than 4% iron and the remainder is nickel. In certain examples, the combination of iron and nickel has more than 5% iron and the remainder is nickel. In certain examples, the combination of iron and nickel has more than 6% iron and the remainder is nickel. In certain examples, the combination of iron and nickel has more than 7% iron and the remainder is nickel. In certain examples, the combination of iron and nickel has more than 8% iron and the remainder is nickel. In certain examples, the combination of iron and nickel has more than 9% iron and the remainder is nickel. In certain examples, the combination of iron and nickel has more than 10% iron and the remainder is nickel. In certain examples, the combination of iron and nickel has more than 11% iron and the remainder is nickel. In certain examples, the combination of iron and nickel has more than 12% iron and the remainder is nickel. In certain examples, the combination of iron and nickel has more than 13% iron and the remainder is nickel. In certain examples, the combination of iron and nickel has more than 14% iron and the remainder is nickel. In certain examples, the combination of iron and nickel has more than 15% iron and the remainder is nickel. In certain examples, the combination of iron and nickel has more than 16% iron and the remainder is nickel. In certain examples, the combination of iron and nickel has more than 17% iron and the remainder is nickel. In certain examples, the combination of iron and nickel has more than 18% iron and the remainder is nickel. In certain examples, the combination of iron and nickel has more than 19% iron and the remainder is nickel. In certain examples, the combination of iron and nickel has more than 20% iron and the remainder is nickel. In certain examples, the combination of iron and nickel has more than 11% iron and the remainder is nickel. In certain examples, the combination of iron and nickel has more than 12% iron and the remainder is nickel. In certain examples, the combination of iron and nickel has more than 13% iron and the remainder is nickel. In certain examples, the combination of iron and nickel has more than 14% iron and the remainder is nickel. In certain examples, the combination of iron and nickel has more than 15% iron and the remainder is nickel. In certain examples, the combination of iron and nickel has more than 16% iron and the remainder is nickel. In certain examples, the combination of iron and nickel has more than 17% iron and the remainder is nickel. In certain examples, the combination of iron and nickel has more than 18% iron and the remainder is nickel. In certain examples, the combination of iron and nickel has more than 19% iron and the remainder is nickel. In certain examples, the combination of iron and nickel has more than 20% iron and the remainder is nickel. In certain examples, the combination of iron and nickel has more than 11% iron and the remainder is nickel. In certain examples, the combination of iron and nickel has more than 12% iron and the remainder is nickel. In certain examples, the combination of iron and nickel has more than 13% iron and the remainder is nickel. In certain examples, the combination of iron and nickel has more than 14% iron and the remainder is nickel. In certain examples, the combination of iron and nickel has more than 15% iron and the remainder is nickel. In certain examples, the combination of iron and nickel has more than 16% iron and the remainder is nickel. In certain examples, the combination of iron and nickel has more than 17% iron and the remainder is nickel. In certain examples, the combination of iron and nickel has more than 18% iron and the remainder is nickel. In certain examples, the combination of iron and nickel has more than 19% iron and the remainder is nickel. In certain examples, the combination of iron and nickel has more than 20% iron and the remainder is nickel. In certain examples, the combination of iron and nickel has more than 21% iron and the remainder is nickel. In certain examples, the combination of iron and nickel has more than 22% iron and the remainder is nickel. In certain examples, the combination of iron and nickel has more than 23% iron and the remainder is nickel. In certain examples, the combination of iron and nickel has more than 24% iron and the remainder is nickel. In certain examples, the combination of iron and nickel has more than 25% iron and the remainder is nickel. In certain examples, the combination of iron and nickel has more than 26% iron and the remainder is nickel. In certain examples, the combination of iron and nickel has more than 27% iron and the remainder is nickel. In certain examples, the combination of iron and nickel has more than 28% iron and the remainder is nickel. In certain examples, the combination of iron and nickel has more than 29% iron and the remainder is nickel. In certain examples, the combination of iron and nickel has more than 30% iron and the remainder is nickel. In certain examples, the combination of iron and nickel has more than 31% iron and the remainder is nickel. In certain examples, the combination of iron and nickel has more than 32% iron and the remainder is nickel. In certain examples, the combination of iron and nickel has more than 33% iron and the remainder is nickel. In certain examples, the combination of iron and nickel has more than 34% iron and the remainder is nickel. In certain examples, the combination of iron and nickel has more than 35% iron and the remainder is nickel. In certain examples, the combination of iron and nickel has more than 36% iron and the remainder is nickel. In certain examples, the combination of iron and nickel has more than 37% iron and the remainder is nickel. In certain examples, the combination of iron and nickel has more than 38% iron and the remainder is nickel. In certain examples, the combination of iron and nickel has more than 39% iron and the remainder is nickel. In certain examples, the combination of iron and nickel has more than 40% iron and the remainder is nickel. In certain examples, the combination of iron and nickel has more than 41% iron and the remainder is nickel. In certain examples, the combination of iron and nickel has more than 42% iron and the remainder is nickel. In certain examples, the combination of iron and nickel has more than 43% iron and the remainder is nickel. In certain examples, the combination of iron and nickel has more than 44% iron and the remainder is nickel. In certain examples, the combination of iron and nickel has more than 45% iron and the remainder is nickel. In certain examples, the combination of iron and nickel has more than 46% iron and the remainder is nickel. In certain examples, the combination of iron and nickel has more than 47% iron and the remainder is nickel. In certain examples, the combination of iron and nickel has more than 48% iron and the remainder is nickel. In certain examples, the combination of iron and nickel has more than 49% iron and the remainder is nickel. In certain examples, the combination of iron and nickel has more than 50% iron and the remainder is nickel. In certain examples, the combination of iron and nickel has more than 51% iron and the remainder is nickel. In certain examples, the combination of iron and nickel has more than 52% iron and the remainder is nickel. In certain examples, the combination of iron and nickel has more than 53% iron and the remainder is nickel. In certain examples, the combination of iron and nickel has more than 54% iron and the remainder is nickel. In certain examples, the combination of iron and nickel has more than 55% iron and the remainder is nickel. In certain examples, the combination of iron and nickel has more than 56% iron and the remainder is nickel. In certain examples, the combination of iron and nickel has more than 57% iron and the remainder is nickel. In certain examples, the combination of iron and nickel has more than 58% iron and the remainder is nickel. In certain examples, the combination of iron and nickel has more than 59% iron and the remainder is nickel. In certain examples, the combination of iron and nickel has more than 60% iron and the remainder is nickel. In certain examples, the combination of iron and nickel has more than 61% iron and the remainder is nickel. In certain examples, the combination of iron and nickel has more than 62% iron and the remainder is nickel. In certain examples, the combination of iron and nickel has more than 63% iron and the remainder is nickel. In certain examples, the combination of iron and nickel has more than 64% iron and the remainder is nickel. In certain examples, the combination of iron and nickel has more than 65% iron and the remainder is nickel. In certain examples, the combination of iron and nickel has more than 66% iron and the remainder is nickel. In certain examples, the combination of iron and nickel has more than 67% iron and the remainder is nickel. In certain examples, the combination of iron and nickel has more than 68% iron and the remainder is nickel. In certain examples, the combination of iron and nickel has more than 69% iron and the remainder is nickel. In certain examples, the combination of iron and nickel has more than 70% iron and the remainder is nickel. In certain examples, the combination of iron and nickel has more than 71% iron and the remainder is nickel. In certain examples, the combination of iron and nickel has more than 72% iron and the remainder is nickel. In certain examples, the combination of iron and nickel has more than 73% iron and the remainder is nickel. In certain examples, the combination of iron and nickel has more than 74% iron and the remainder is nickel. In certain examples, the combination of iron and nickel has more than 75% iron and the remainder is nickel. In certain examples, the combination of iron and nickel has more than 76% iron and the remainder is nickel. In certain examples, the combination of iron and nickel has more than 77% iron and the remainder is nickel. In certain examples, the combination of iron and nickel has more than 78% iron and the remainder is nickel. In certain examples, the combination of iron and nickel has more than 79% iron and the remainder is nickel. In certain examples, the combination of iron and nickel has more than 80% iron and the remainder is nickel. In certain examples, the combination of iron and nickel has more than 81% iron and the remainder is nickel. In certain examples, the combination of iron and nickel has more than 82% iron and the remainder is nickel. In certain examples, the combination of iron and nickel has more than 83% iron and the remainder is nickel. In certain examples, the combination of iron and nickel has more than 84% iron and the remainder is nickel. In certain examples, the combination of iron and nickel has more than 85% iron and the remainder is nickel. In certain examples, the combination of iron and nickel has more than 86% iron and the remainder is nickel. In certain examples, the combination of iron and nickel has more than 87% iron and the remainder is nickel. In certain examples, the combination of iron and nickel has more than 88% iron and the remainder is nickel. In certain examples, the combination of iron and nickel has more than 89% iron and the remainder is nickel. In certain examples, the combination of iron and nickel has more than 90% iron and the remainder is nickel. In certain examples, the combination of iron and nickel has more than 91% iron and the remainder is nickel. In certain examples, the combination of iron and nickel has more than 92% iron and the remainder is nickel. In certain examples, the combination of iron and nickel has more than 93% iron and the remainder is nickel. In certain examples, the combination of iron and nickel has more than 94% iron and the remainder is nickel. In certain examples, the combination of iron and nickel has more than 95% iron and the remainder is nickel. In certain examples, the combination of iron and nickel has more than 96% iron and the remainder is nickel. In certain examples, the combination of iron and nickel has more than 97% iron and the remainder is nickel. In certain examples, the combination of iron and nickel has more than 98% iron and the remainder is nickel. In certain examples, the combination of iron and nickel has more than 99% iron and the remainder is nickel.

In one example, set forth herein is a continuous manufacturing line (CML) comprising: a front section comprising a front roller; an end section comprising an end roller, a sintered article receiver, or a combination thereof: a middle section, between the front section and end section, comprising at least one oven; wherein the at least one oven comprises a green tape inlet and a sintered film outlet; and an atmospheric controller that maintains an atmospheric condition inside the at least one oven.

In another example, set forth herein is a continuous manufacturing line (CML) comprising: a front section comprising at least one front roller; an end section comprising at least one end roller, at least one sintered article receiver, or a combination thereof; a middle section between the front section and end section comprising at least one oven; wherein the at least one oven comprises at least one green tape inlet and at least one sintered film outlet; and wherein the at least one green tape inlet has an opening gap of less than 5 mm in height.

In another example, set forth herein is a continuous manufacturing line (CML) comprising: a front section comprising at least one front roller; an end section comprising at least one sintered article receiver: a middle section between the front section and end section comprising a binder burn-out oven and a bisqueing oven; wherein the middle section comprises a curved ramp before either the binder burn-out oven or before the bisqueing oven.

In another example, set forth herein is a process of using a continuous manufacturing line, comprising the following operations: (a) providing, or having provided, a green tape wound around a front roller positioned in a front section; (b) unwinding the green tape into an inlet in an oven; (c) sintering the green tape in the oven while moving the green tape through the oven to produce a sintered film, and (d) winding the sintered film onto an end roller after exiting the oven through an outlet; and (e) controlling, or having controlled, the atmosphere in contact with the sintering green tape.

In another example, set forth herein is a process of using a continuous manufacturing line, comprising the following operations: (a) moving a green tape, under tension, through at least two ovens at a rate of at least two inches per minute; (b) wherein the green tape is less than 200 μm thick; (c) sintering the green tape while moving the green tape to produce a sintered film, and (d) controlling, or having controlled, the atmosphere in contact with the sintering green tape.

Certain processes set forth herein include steps for sintering a film without using setters, or any surface, during sintering. This advantageously avoids sticking, particle transfer, pull-outs, and scratches, and results in higher quality films. Herein, pull-outs are particles of materials which are pulled out of the film because of adherence. For example, when films are sintered on surfaces, a particle from the surface may transfer to a surface of the film. Alternatively, a particle from the surface of the film may transfer to the surface on which the film is sintered.

Certain processes set forth herein include steps for sintering a film with higher throughput than was previously possible. For example, certain processes herein provide for a continuous binder burn out, sintering, and cooling cycle in under an hour instead of about twenty-four hours or greater than twenty-four hours.

In some examples, a sintered film may have a width of about 0.8 mm to about 5 meters. In certain examples, the sintered films set forth herein have a width of about 5.0 meters. In certain examples, the sintered films set forth herein have a width of about 4.9 meters. In certain examples, the sintered films set forth herein have a width of about 4.8 meters. In certain examples, the sintered films set forth herein have a width of about 4.7 meters. In certain examples, the sintered films set forth herein have a width of about 4.6 meters. In certain examples, the sintered films set forth herein have a width of about 4.5 meters. In certain examples, the sintered films set forth herein have a width of about 4.4 meters. In certain examples, the sintered films set forth herein have a width of about 4.3 meters. In certain examples, the sintered films set forth herein have a width of about 4.2 meters. In certain examples, the sintered films set forth herein have a width of about 4.1 meters. In certain examples, the sintered films set forth herein have a width of about 4.0 meters. In certain examples, the sintered films set forth herein have a width of about 3.9 meters. In certain examples, the sintered films set forth herein have a width of about 3.8 meters. In certain examples, the sintered films set forth herein have a width of about 3.7 meters. In certain examples, the sintered films set forth herein have a width of about 3.6 meters. In certain examples, the sintered films set forth herein have a width of about 3.5 meters. In certain examples, the sintered films set forth herein have a width of about 3.4 meters. In certain examples, the sintered films set forth herein have a width of about 3.3 meters. In certain examples, the sintered films set forth herein have a width of about 3.2 meters. In certain examples, the sintered films set forth herein have a width of about 3.1 meters. In certain examples, the sintered films set forth herein have a width of about 3.0 meters. In certain examples, the sintered films set forth herein have a width of about 2.9 meters. In certain examples, the sintered films set forth herein have a width of about 2.8 meters. In certain examples, the sintered films set forth herein have a width of about 2.7 meters. In certain examples, the sintered films set forth herein have a width of about 2.6 meters. In certain examples, the sintered films set forth herein have a width of about 2.5 meters. In certain examples, the sintered films set forth herein have a width of about 2.4 meters. In certain examples, the sintered films set forth herein have a width of about 2.3 meters. In certain examples, the sintered films set forth herein have a width of about 2.2 meters. In certain examples, the sintered films set forth herein have a width of about 2.1 meters. In certain examples, the sintered films set forth herein have a width of about 2.0 meters. In certain examples, the sintered films set forth herein have a width of about 1.9 meters. In certain examples, the sintered films set forth herein have a width of about 1.8 meters. In certain examples, the sintered films set forth herein have a width of about 1.7 meters. In certain examples, the sintered films set forth herein have a width of about 1.6 meters. In certain examples, the sintered films set forth herein have a width of about 1.5 meters. In certain examples, the sintered films set forth herein have a width of about 1.4 meters. In certain examples, the sintered films set forth herein have a width of about 1.3 meters. In certain examples, the sintered films set forth herein have a width of about 1.2 meters. In certain examples, the sintered films set forth herein have a width of about 1.1 meters. In certain examples, the sintered films set forth herein have a width of about 1.0) meters. In certain examples, the sintered films set forth herein have a width of about 0.9 meters. In certain examples, the sintered films set forth herein have a width of about 0.8 meters. In certain examples, the sintered films set forth herein have a width of about 0.7 meters. In certain examples, the sintered films set forth herein have a width of about 0.6 meters. In certain examples, the sintered films set forth herein have a width of about 0.5 meters. In certain examples, the sintered films set forth herein have a width of about 0.45 meters. In certain examples, the sintered films set forth herein have a width of about 0.4 meters. In certain examples, the sintered films set forth herein have a width of about 0.35 meters. In certain examples, the sintered films set forth herein have a width of about 0.3 meters. In certain examples, the sintered films set forth herein have a width of about 0.275 meters. In certain examples, the sintered films set forth herein have a width of about 0.25 meters. In certain examples, the sintered films set forth herein have a width of about 0.225 meters. In certain examples, the sintered films set forth herein have a width of about 0.2 meters. In certain examples, the sintered films set forth herein have a width of about 0.18 meters. In certain examples, the sintered films set forth herein have a width of about 0.16 meters. In certain examples, the sintered films set forth herein have a width of about 0.15 meters. In certain examples, the sintered films set forth herein have a width of about 0.14 meters. In certain examples, the sintered films set forth herein have a width of about 0.13 meters. In certain examples, the sintered films set forth herein have a width of about 0.12 meters. In certain examples, the sintered films set forth herein have a width of about 0.11 meters. In certain examples, the sintered films set forth herein have a width of about 0.1 meters. In certain examples, the sintered films set forth herein have a width of about 9 cm. In certain examples, the sintered films set forth herein have a width of about 8 cm. In certain examples, the sintered films set forth herein have a width of about 7 cm. In certain examples, the sintered films set forth herein have a width of about 6 cm. In certain examples, the sintered films set forth herein have a width of about 5 cm. In certain examples, the sintered films set forth herein have a width of about 4 cm. In certain examples, the sintered films set forth herein have a width of about 3 cm. In certain examples, the sintered films set forth herein have a width of about 2 cm. In certain examples, the sintered films set forth herein have a width of about 1 cm. In certain examples, the sintered films set forth herein have a width of about 9 mm. In certain examples, the sintered films set forth herein have a width of about 8 mm. In certain examples, the sintered films set forth herein have a width of about 7 mm. In certain examples, the sintered films set forth herein have a width of about 6 mm. In certain examples, the sintered films set forth herein have a width of about 5 mm. In certain examples, the sintered films set forth herein have a width of about 4 mm. In certain examples, the sintered films set forth herein have a width of about 3 mm. In certain examples, the sintered films set forth herein have a width of about 2 mm. In certain examples, the sintered films set forth herein have a width of about 1 mm. In certain examples, the sintered films set forth herein have a width of about 0.9 mm. In certain examples, the sintered films set forth herein have a width of about 0.8 mm.

In some examples, a sintered film may have a width of 0.8 mm to 5 meters. In certain examples, the sintered films set forth herein have a width of 5.0 meters. In certain examples, the sintered films set forth herein have a width of 4.9 meters. In certain examples, the sintered films set forth herein have a width of 4.8 meters. In certain examples, the sintered films set forth herein have a width of 4.7 meters. In certain examples, the sintered films set forth herein have a width of 4.6 meters. In certain examples, the sintered films set forth herein have a width of 4.5 meters. In certain examples, the sintered films set forth herein have a width of 4.4 meters. In certain examples, the sintered films set forth herein have a width of 4.3 meters. In certain examples, the sintered films set forth herein have a width of 4.2 meters. In certain examples, the sintered films set forth herein have a width of 4.1 meters. In certain examples, the sintered films set forth herein have a width of 4.0 meters. In certain examples, the sintered films set forth herein have a width of 3.9 meters. In certain examples, the sintered films set forth herein have a width of 3.8 meters. In certain examples, the sintered films set forth herein have a width of 3.7 meters. In certain examples, the sintered films set forth herein have a width of 3.6 meters. In certain examples, the sintered films set forth herein have a width of 3.5 meters. In certain examples, the sintered films set forth herein have a width of 3.4 meters. In certain examples, the sintered films set forth herein have a width of 3.3 meters. In certain examples, the sintered films set forth herein have a width of 3.2 meters. In certain examples, the sintered films set forth herein have a width of 3.1 meters. In certain examples, the sintered films set forth herein have a width of 3.0 meters. In certain examples, the sintered films set forth herein have a width of 2.9 meters. In certain examples, the sintered films set forth herein have a width of 2.8 meters. In certain examples, the sintered films set forth herein have a width of 2.7 meters. In certain examples, the sintered films set forth herein have a width of 2.6 meters. In certain examples, the sintered films set forth herein have a width of 2.5 meters. In certain examples, the sintered films set forth herein have a width of 2.4 meters. In certain examples, the sintered films set forth herein have a width of 2.3 meters. In certain examples, the sintered films set forth herein have a width of 2.2 meters. In certain examples, the sintered films set forth herein have a width of 2.1 meters. In certain examples, the sintered films set forth herein have a width of 2.0 meters. In certain examples, the sintered films set forth herein have a width of 1.9 meters. In certain examples, the sintered films set forth herein have a width of 1.8 meters. In certain examples, the sintered films set forth herein have a width of 1.7 meters. In certain examples, the sintered films set forth herein have a width of 1.6 meters. In certain examples, the sintered films set forth herein have a width of 1.5 meters. In certain examples, the sintered films set forth herein have a width of 1.4 meters. In certain examples, the sintered films set forth herein have a width of 1.3 meters. In certain examples, the sintered films set forth herein have a width of 1.2 meters. In certain examples, the sintered films set forth herein have a width of 1.1 meters. In certain examples, the sintered films set forth herein have a width of 1.0 meters. In certain examples, the sintered films set forth herein have a width of 0.9 meters. In certain examples, the sintered films set forth herein have a width of 0.8 meters. In certain examples, the sintered films set forth herein have a width of 0.7 meters. In certain examples, the sintered films set forth herein have a width of 0.6 meters. In certain examples, the sintered films set forth herein have a width of 0.5 meters. In certain examples, the sintered films set forth herein have a width of 0.4 meters. In certain examples, the sintered films set forth herein have a width of 0.35 meters. In certain examples, the sintered films set forth herein have a width of 0.3 meters. In certain examples, the sintered films set forth herein have a width of 0.2 meters. In certain examples, the sintered films set forth herein have a width of 0.18 meters. In certain examples, the sintered films set forth herein have a width of 0.17 meters. In certain examples, the sintered films set forth herein have a width of 0.16 meters. In certain examples, the sintered films set forth herein have a width of 0.15 meters. In certain examples, the sintered films set forth herein have a width of 0.14 meters. In certain examples, the sintered films set forth herein have a width of 0.13 meters. In certain examples, the sintered films set forth herein have a width of 0.12 meters. In certain examples, the sintered films set forth herein have a width of 0.11 meters. In certain examples, the sintered films set forth herein have a width of 0.1 meters. In certain examples, the sintered films set forth herein have a width of 9 cm. In certain examples, the sintered films set forth herein have a width of 8 cm. In certain examples, the sintered films set forth herein have a width of 7 cm. In certain examples, the sintered films set forth herein have a width of 6 cm. In certain examples, the sintered films set forth herein have a width of 5 cm. In certain examples, the sintered films set forth herein have a width of 4 cm. In certain examples, the sintered films set forth herein have a width of 3 cm. In certain examples, the sintered films set forth herein have a width of 2 cm. In certain examples, the sintered films set forth herein have a width of 1 cm. In certain examples, the sintered films set forth herein have a width of 9 mm. In certain examples, the sintered films set forth herein have a width of 8 mm. In certain examples, the sintered films set forth herein have a width of 7 mm. In certain examples, the sintered films set forth herein have a width of 6 mm. In certain examples, the sintered films set forth herein have a width of 5 mm. In certain examples, the sintered films set forth herein have a width of 4 mm. In certain examples, the sintered films set forth herein have a width of 3 mm. In certain examples, the sintered films set forth herein have a width of 2 mm. In certain examples, the sintered films set forth herein have a width of 1 mm. In certain examples, the sintered films set forth herein have a width of 0.9 mm. In certain examples, the sintered films set forth herein have a width of 0.8 mm.

In some examples, a sintered film may have a width of 0.8 mm to 4 meters. In some examples, a sintered film may have a width of 0.8 mm to 3 meters. In some examples, a sintered film may have a width of 0.8 mm to 2 meters. In some examples, a sintered film may have a width of 0.8 mm to 1 meters. In some examples, a sintered film may have a width of 0.8 mm to 0.5 meters. In some examples, a sintered film may have a width of 0.8 mm to 0.4 meters. In some examples, a sintered film may have a width of 0.8 mm to 0.3 meters. In some examples, a sintered film may have a width of 0.8 mm to 0.2 meters. In some examples, a sintered film may have a width of 0.8 mm to 0.1 meters.

In some examples, a sintered film may have a width of 1 cm to 25 cm. In some examples, a sintered film may have a width of 2 cm to 22 cm. In some examples, a sintered film may have a width of 4 cm to 22 cm. In some examples, a sintered film may have a width of 6 cm to 22 cm. In some examples, a sintered film may have a width of 8 cm to 22 cm. In some examples, a sintered film may have a width of 10 cm to 22 cm. In some examples, a sintered film may have a width of 12 cm to 22 cm. In some examples, a sintered film may have a width of 14 cm to 22 cm. In some examples, a sintered film may have a width of 16 cm to 22 cm.

In some examples, a bilayer after sintering may have a width of 1 In some examples, a bilayer after sintering may have a width of 1 cm to 25 cm. In some examples, a bilayer after sintering may have a width of 2 cm to 22 cm. In some examples, a bilayer after sintering may have a width of 4 cm to 22 cm. In some examples, a bilayer after sintering may have a width of 6 cm to 22 cm. In some examples, a bilayer after sintering may have a width of 8 cm to 22 cm. In some examples, a bilayer after sintering may have a width of 10 cm to 22 cm. In some examples, a bilayer after sintering may have a width of 12 cm to 22 cm. In some examples, a bilayer after sintering may have a width of 14 cm to 22 cm. In some examples, a bilayer after sintering may have a width of 16 cm to 22 cm.

In some examples, a sintered film may have a width of 2 cm to 25 cm. In some examples, a sintered film may have a width of 4 cm to 25 cm. In some examples, a sintered film may have a width of 6 cm to 25 cm. In some examples, a sintered film may have a width of 8 cm to 25 cm. In some examples, a sintered film may have a width of 10 cm to 25 cm. In some examples, a sintered film may have a width of 12 cm to 25 cm. In some examples, a sintered film may have a width of 14 cm to 25 cm. In some examples, a sintered film may have a width of 16 cm to 25 cm.

In some examples, a bilayer after sintering may have a width of 2 cm to 25 cm. In some examples, a bilayer after sintering may have a width of 4 cm to 25 cm. In some examples, a bilayer after sintering may have a width of 6 cm to 25 cm. In some examples, a bilayer after sintering may have a width of 8 cm to 25 cm. In some examples, a bilayer after sintering may have a width of 10 cm to 25 cm. In some examples, a bilayer after sintering may have a width of 12 cm to 25 cm. In some examples, a bilayer after sintering may have a width of 14 cm to 25 cm. In some examples, a bilayer after sintering may have a width of 16 cm to 25 cm.

In some examples, a sintered film may have a width of 1 cm. In some examples, a sintered film may have a width of 2 cm. In some examples, a sintered film may have a width of 1 cm. In some examples, a sintered film may have a width of 3 cm. In some examples, a sintered film may have a width of 4 cm. In some examples, a sintered film may have a width of 5 cm. In some examples, a sintered film may have a width of 6 cm. In some examples, a sintered film may have a width of 7 cm. In some examples, a sintered film may have a width of 8 cm. In some examples, a sintered film may have a width of 9 cm. In some examples, a sintered film may have a width of 10 cm. In some examples, a sintered film may have a width of 11 cm. In some examples, a sintered film may have a width of 12 cm. In some examples, a sintered film may have a width of 13 cm. In some examples, a sintered film may have a width of 14 cm. In some examples, a sintered film may have a width of 15 cm. In some examples, a sintered film may have a width of 16 cm. In some examples, a sintered film may have a width of 17 cm. In some examples, a sintered film may have a width of 18 cm. In some examples, a sintered film may have a width of 19 cm. In some examples, a sintered film may have a width of 20 cm. In some examples, a sintered film may have a width of 21 cm. In some examples, a sintered film may have a width of 22 cm. In some examples, a sintered film may have a width of 23 cm. In some examples, a sintered film may have a width of 24 cm. In some examples, a sintered film may have a width of 25 cm.

In some examples, the green tape, sintered film, or bilayer, may move through the CML at a rate of greater than 0.1 mm per minute. Here, the distance "0, 1 mm" is measured in the direction of travel. In some examples, the green tape, or sintered film, may move through the CML at a rate of greater than 1 mm per minute. In some examples, the green tape, or sintered film, may move through the CML at a rate of greater than greater than 10 mm per minute. In some examples, the green tape, or sintered film, may move through the CML at a rate of greater than greater than 100 mm per minute. In some examples, the green tape, or sintered film, may move through the CML at a rate of greater than 1000 mm per minute.

In some examples, the sintering film, or sintering bilayer, may move through the CML at a rate between 2 centimeters/minute (cm/min) and 100 cm/min. In some examples, the sintering film may move through the CML at a rate of about 5 cm/min. In some examples, the sintering film may move through the CML at a rate of about 60 cm/min. In some examples, the sintering film may move through the CML at a rate of about 50 cm/min. In some examples, the sintering film may move through the CML at a rate of about 25 cm/min. In some examples, the sintering film may move through the CML at a rate of about 15 cm/min. In some examples, the sintering film may move through the CML at a rate of about 10 cm/min. Herein the times refer to the time spent moving through the sintering oven.

Herein, in some examples, the sintered film, or bilayer after sintering, has a thickness less than 200 µm. In some examples, including any of the foregoing, the sintered film, or bilayer after sintering, has a thickness less than 100 µm. In some examples, including any of the foregoing, the sintered film, or bilayer after sintering, has a thickness less than 60 µm. In some examples, including any of the foregoing, the sintered film, or bilayer after sintering, has a thickness less than 50 µm. In some examples, including any of the foregoing, the sintered film, or bilayer after sintering, has a thickness less than 40 µm. In some examples, including any of the foregoing, the sintered film, or bilayer after sintering, has a thickness less than 30 µm. In some examples, including any of the foregoing, the sintered film, or bilayer after sintering, has a thickness less than 25 µm. In some examples, including any of the foregoing, the sintered film, or bilayer after sintering, has a thickness less than 20 µm. In some examples, including any of the foregoing, the sintered film, or bilayer after sintering, has a thickness less than 15 µm. In some examples, including any of the foregoing, the sintered film, or bilayer after sintering, has a thickness less than 10 µm. In some examples, including any of the foregoing, the sintered film, or bilayer after sintering, has a thickness less than 5 µm. In some examples, including any of the foregoing, the sintered film, or bilayer after sintering, has a thickness between 5 µm and 50 µm. In some examples, including any of the foregoing, the sintered film, or bilayer after sintering, has a thickness between 10 µm and 40 µm. In some examples, including any of the foregoing, the sintered film, or bilayer after sintering, has a thickness between 20

μm and 40 μm. In some examples, including any of the foregoing, the sintered film, or bilayer after sintering, has a thickness of at least 10 μm. In some examples, including any of the foregoing, the sintered film, or bilayer after sintering, has a thickness of at least 20 μm. In some examples, including any of the foregoing, the sintered film, or bilayer after sintering, has a thickness of at least 30 μm. In some examples, including any of the foregoing, the sintered film, or bilayer after sintering, has a thickness of at least 40 μm. In some examples, including any of the foregoing, the sintered film, or bilayer after sintering, has a thickness of at least 50 μm.

Herein, in some examples, the sintered film, or bilayer after sintering, has a thickness of about 200 μm. In some examples, including any of the foregoing, the sintered film, or bilayer after sintering, has a thickness of about 100 μm. In some examples, including any of the foregoing, the sintered film, or bilayer after sintering, has a thickness of about 90) μm. In some examples, including any of the foregoing, the sintered film, or bilayer after sintering, has a thickness of about 80 μm. In some examples, including any of the foregoing, the sintered film, or bilayer after sintering, has a thickness of about 70 μm. In some examples, including any of the foregoing, the sintered film, or bilayer after sintering, has a thickness of about 60 μm. In some examples, including any of the foregoing, the sintered film, or bilayer after sintering, has a thickness of about 50 μm. In some examples, including any of the foregoing, the sintered film, or bilayer after sintering, has a thickness of about 40 μm. In some examples, including any of the foregoing, the sintered film, or bilayer after sintering, has a thickness of about 30 μm. In some examples, including any of the foregoing, the sintered film, or bilayer after sintering, has a thickness of about 25 μm. In some examples, including any of the foregoing, the sintered film, or bilayer after sintering, has a thickness of about 20 μm. In some examples, including any of the foregoing, the sintered film, or bilayer after sintering, has a thickness less than 15 μm. In some examples, including any of the foregoing, the sintered film, or bilayer after sintering, has a thickness of about 10 μm. In some examples, including any of the foregoing, the sintered film, or bilayer after sintering, has a thickness of about 5 μm. In some examples, including any of the foregoing, the sintered film, or bilayer after sintering, has a thickness between 5 μm and 50 μm. In some examples, including any of the foregoing, the sintered film, or bilayer after sintering, has a thickness between 10 μm and 40 μm. In some examples, including any of the foregoing, the sintered film, or bilayer after sintering, has a thickness between 20 μm and 40 μm.

Herein, in some examples, the sintered film, or bilayer after sintering, has a thickness of 200 μm. In some examples, including any of the foregoing, the sintered film, or bilayer after sintering, has a thickness of 100 μm. In some examples, including any of the foregoing, the sintered film, or bilayer after sintering, has a thickness of 90 μm. In some examples, including any of the foregoing, the sintered film, or bilayer after sintering, has a thickness of 80 μm. In some examples, including any of the foregoing, the sintered film, or bilayer after sintering, has a thickness of 70 μm. In some examples, including any of the foregoing, the sintered film, or bilayer after sintering, has a thickness of 60 μm. In some examples, including any of the foregoing, the sintered film, or bilayer after sintering, has a thickness of 50 μm. In some examples, including any of the foregoing, the sintered film, or bilayer after sintering, has a thickness of 45 μm. In some examples, including any of the foregoing, the sintered film, or bilayer after sintering, has a thickness of 40 μm. In some examples, including any of the foregoing, the sintered film, or bilayer after sintering, has a thickness of 35 μm. In some examples, including any of the foregoing, the sintered film, or bilayer after sintering, has a thickness of 30 μm. In some examples, including any of the foregoing, the sintered film, or bilayer after sintering, has a thickness of 25 μm. In some examples, including any of the foregoing, the sintered film, or bilayer after sintering, has a thickness of 20 μm. In some examples, including any of the foregoing, the sintered film, or bilayer after sintering, has a thickness of 18 μm. In some examples, including any of the foregoing, the sintered film, or bilayer after sintering, has a thickness of 16 μm. In some examples, including any of the foregoing, the sintered film, or bilayer after sintering, has a thickness less than 15 μm. In some examples, including any of the foregoing, the sintered film, or bilayer after sintering, has a thickness of 10 μm. In some examples, including any of the foregoing, the sintered film, or bilayer after sintering, has a thickness of 5 μm. In some examples, including any of the foregoing, the sintered film, or bilayer after sintering, has a thickness between 5 μm and 50 μm. In some examples, including any of the foregoing, the sintered film, or bilayer after sintering, has a thickness between 10 μm and 40 μm. In some examples, including any of the foregoing, the sintered film, or bilayer after sintering, has a thickness between 20 μm and 40 μm. In some examples, including any of the foregoing, the sintered film, or bilayer after sintering, has a thickness between 10 μm and 60 μm. In some examples, including any of the foregoing, the sintered film, or bilayer after sintering, has a thickness between 10 μm and 70 μm. In some examples, including any of the foregoing, the sintered film, or bilayer after sintering, has a thickness between 10 μm and 80 μm. In some examples, including any of the foregoing, the sintered film, or bilayer after sintering, has a thickness between 20 μm and 60 μm. In some examples, including any of the foregoing, the sintered film, or bilayer after sintering, has a thickness between 20 μm and 70 μm. In some examples, including any of the foregoing, the sintered film, or bilayer after sintering, has a thickness between 20 μm and 80 μm.

In some of the methods disclosed herein, the thickness of the ceramic film in a bilayer after sintering is from about 10 μm to about 50 μm. In some of the methods disclosed herein, the thickness of the ceramic film in a bilayer after sintering is from about 20 μm to about 40 μm. In some of the methods disclosed herein, the thickness of the ceramic film in a bilayer after sintering is from about 20 μm to about 30 μm.

The methods herein include methods for producing a roll of sintered film. This reduces the number of cutting and stacking operations normally required in batch processing of sintered films. The methods herein eliminate many process steps. And these eliminated process steps could have introduced variability, particles, and other defects into the sintered film. The roll format and processing conditions set forth herein are easier to maintain. The sintered films, because of how they are produced and rolled after production, are easier to ship than conventionally made sintered films. A roll format of sintered films, as set forth herein, is useful for downstream continuous processing steps such as, but not limited to, coating with interlayers, protective layers, adhesive layers, or other functional layers.

In some examples, set forth herein, the continuous manufacturing line includes three furnaces. One furnace is for binder burn out. One furnace is for bisque firing. And one furnace is for sintering. The first, the second, and/or the third furnace may each, individually or collectively, have multiple temperature zones. The first, the second, and/or the third furnace may each, individually or collectively, have multiple atmosphere control zones.

In some examples, set forth herein, the continuous manufacturing line includes two furnaces. One furnace is for binder burn out and also bisqueing. In some examples, the oven that is used for binder burn out and bisque firing has multiple heating zones within the furnace. In this example, the second furnace is for sintering. The second furnace may have multiple heating zones. The first and or the second furnace may have multiple atmosphere control zones.

In other examples set forth herein, the continuous manufacturing line includes two furnaces. The first furnace is for binder burn out. In some examples, the oven that is used for binder burn out has multiple heating zones within the furnace. The second furnace is for bisque firing and sintering. The second furnace may have multiple heating zones. The first and or second furnace may have multiple atmosphere control zones.

In some examples, set forth herein, the continuous manufacturing line includes one furnace that has multiple heating zones. The one furnace performs all or at least one of binder burn out, bisque firing, and sintering. The one furnace may have multiple atmosphere control zones.

Figure 2:
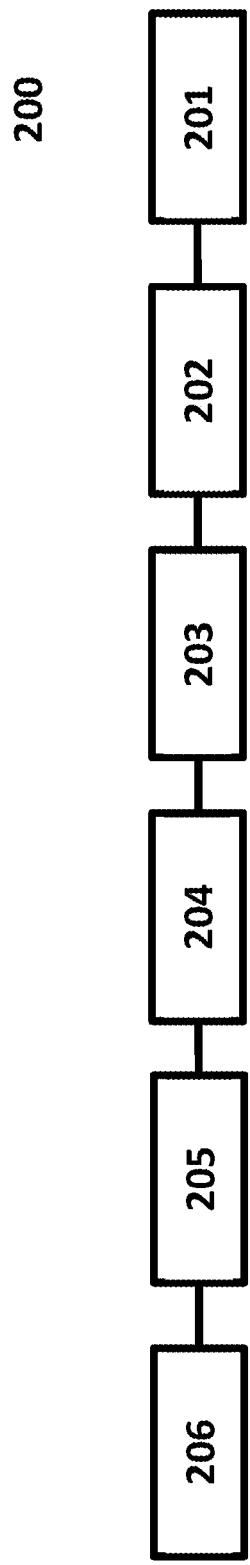
FIG. 2 shows another example of a continuous manufacturing line.

FIG. 2 shows an example of a continuous manufacturing line (200). A front section (201) has at least one roller. In some examples, front section includes additional rollers (not shown). During operation of the CML (200), the green tape unwinds from one roller. In some examples, the green tape is disposed on a Mylar substrate before it is wound-up on roller. As the green tape unwinds from roller, the underlying Mylar substrate is removed. This removed Mylar substrate may be wound-up at another roller. The green tape, without a Mylar substrate, and moves into the binder burn-out oven (202), and then into the bisque oven (203). After exiting the bisque oven, the green tape which has passed through the binder burn-out oven and then the bisque oven is moved into the sintering oven by way of various rollers, pins and tensioners (204). Various sensors and metrology tools may be present at the middle section to assess the quality of the tape as it passes thereby. The tape then enters into the sintering oven (205). After exiting the sintering oven, the sintered article arrives at end section (206). In end section, rollers are used to direct and roll the sintered article onto rollers that can be removed from the CML for further processing. End section (206) may further comprise another device. End section (206) may have enclosure for atmospheric control around the sintered article. In some examples, the end section (206) collects sintered lithium-stuffed garnet films. In some examples, the binder burn-out oven (202) is enclosed in an enclosure which provides a controlled atmosphere in contact with the green tape. In other examples, the bisque oven (203) is enclosed in an enclosure which provides a controlled atmosphere in contact with the green tape. In other examples, the sintering oven (205) is enclosed in an enclosure which provides a controlled atmosphere in contact with the green tape.

A middle section may also have these metrology analytical tools (not shown). These metrology analytical tools may include lasers, x-ray devices, electron microscope devices, or combinations thereof. These metrology analytical tools are useful for analyzing the sintered articles as they are being produced.

The above figures are merely shown to illustrate some examples contemplated here. In some examples, there can be 1, 2, or 3 ovens, one for binder burn out, one for bisque, and one for sintering. In some examples, there can be one oven with multiple heating zones. In some examples, the CML may have an area at the end for with decreasing heat zones, or cooling zones. The number of rollers is only exemplary. More or fewer rollers may be used in various combinations with different types and numbers of ovens. Various suction devices may be used to move tapes and sintered article. Various sensors and feedback devices may be employed for quality control.

While the CML in FIGS. 1-3, 6-7A, 7B, 12-20 is shown in a horizontal format, in some examples, the CML may also be used in a vertical format, in other examples.

The instant disclosure contemplates having metrology analytical tools at various places along the CML. The metrology tools can assess, for example, sintered films or green tapes undergoing processing into sintered films, with respect to their surface quality (e.g., defect density, types of defects, size of protrusions), film thickness, film uniformity, cambering, bending, crystallinity, grain size, grain shape, flatness, roughness, density, refractive index, transparency, chemical analysis, crystalline phase, and combinations thereof. These metrology analytical tools may include lasers, x-ray devices, profilometers, atomic force microscopes, electron microscope devices, imaging systems, Raman microscopy, X-ray diffractometers, and combinations thereof. These metrology analytical tools are useful for analyzing the sintered articles as they are being produced.

The instant disclosure contemplates having a high-throughput continuous apparatus in which a green tape starts on a roll, is processed by the CML, and the CML produces a sintered film which is rolled up onto a roll at the end of the process. The instant disclosure contemplates having a roll-to-sheet apparatus in which a green tape starts on a roll, is processed by the CML, and the CML produces a sintered film which is cut (or divided) into sheets which are then stacked at the end of the process.

The CML as a complete system, or various components of the CML (e.g., ovens), may be encased in an enclosure, or in more than one enclosure, that provide atmospheric controls.

Various gas curtains may be used with the CML, as a complete system, or with various components of the CML (e.g., ovens), to provide atmospheric controls.

In some examples, atmospheric controls includes using narrow oven openings.

In some examples, atmospheric controls includes using excess flow at oven inlets and outlets. In some examples, atmospheric controls includes using a $N_2$ or Ar-filled glove box around various components such as rollers. In some examples, atmospheric controls includes using overpressures inside ovens.

In some examples, atmospheric controls includes controlling the amount of $H_2O$ in an oven. In some examples, atmospheric controls includes controlling the amount of $O_2$ in an oven. In some examples, atmospheric controls includes controlling the amount of $O_2$ in an oven to levels less than 100 ppm. In some examples, atmospheric controls includes controlling the amount of $O_2$ in an oven to levels less than 10 ppm. In some examples, atmospheric controls includes controlling the amount of $O_2$ in an oven to levels less than 1 ppm. In some examples, atmospheric controls includes controlling the amount of $H_2$ in an oven. In some examples, atmospheric controls includes controlling the amount of $N_2$ in an oven.

In some examples, atmospheric controls includes controlling the amount of $H_2O$ in an binder burn-out furnace. In some examples, atmospheric controls includes controlling the amount of $O_2$ in an binder burn-out furnace. In some examples, atmospheric controls includes controlling the amount of $O_2$ in an binder burn-out furnace to levels less than 100 ppm. In some examples, atmospheric controls includes controlling the amount of $O_2$ in an binder burn-out furnace to levels less than 10 ppm. In some examples, atmospheric controls includes controlling the amount of $O_2$ in an binder burn-out furnace to levels less than 1 ppm. In some examples, atmospheric controls includes controlling the amount of $H_2$ in an binder burn-out furnace. In some examples, atmospheric controls includes controlling the amount of $N_2$ in an binder burn-out furnace.

In some examples, atmospheric controls includes controlling the amount of $H_2O$ in an sintering furnace. In some examples, atmospheric controls includes controlling the amount of $O_2$ in an sintering furnace. In some examples, atmospheric controls includes controlling the amount of $O_2$ in an sintering furnace to levels less than 100 ppm. In some examples, atmospheric controls includes controlling the amount of $O_2$ in an sintering furnace to levels less than 10 ppm. In some examples, atmospheric controls includes controlling the amount of $O_2$ in an sintering furnace to levels less than 1 ppm. In some examples, atmospheric controls includes controlling the amount of $H_2$ in an sintering furnace. In some examples, atmospheric controls includes controlling the amount of $N_2$ in an sintering furnace.

In some examples, the gas curtain comprises a $N_2$ gas curtain. In some examples, the gas curtain comprises an argon gas curtain. In some examples, the gas curtain comprises a helium gas curtain.

In some examples, atmospheric controls includes using forming gas in an oven. In certain examples, the forming gas is a mixture of hydrogen ($H_2$) and Ar. In some examples, atmospheric controls includes using forming gas in an oven. In certain examples, the forming gas is a mixture of hydrogen ($H_2$) and nitrogen ($N_2$). In some examples, atmospheric controls includes using forming gas in an oven. In certain examples, the forming gas is a mixture of $H_2$, Ar, and $N_2$. In some of these examples, the $H_2$ is a few percents by volume of the forming gas. For example, in certain examples, the $H_2$ is present in the forming gas at 1%, 2%, 3%, 4%, 6%, 7%, 8%, 9%, or 10% by volume. In certain other examples, the $H_2$ is present in the forming gas at about 1%, about 2%, about 3%, about 4%, about 6%, about 7%, about 8%, about 9%, or about 10% by volume. In certain other examples, the $H_2$ is present in the forming gas at about 1-2%, about 2-3%, about 3-4%, about 4-5%, about 6-7%, about 7-8%, about 8-9%, or about 9-10% v/v. In yet other examples, the $H_2$ is present in the forming gas at 1-2%, 2-3%, 3-4%, 4-5%, 6-7%, 7-8%, 8-9%, or 9-10% v/v. In yet other examples, the $H_2$ is present in the forming gas at 1-5%, 2-5%, 3-5%, 5-9%, 5-7%, 4-6%, 3-7%, or 2-8% v/v.

In other examples, atmospheric controls includes using Ar gas, $N_2$ gas, or a combination thereof in an oven. In certain examples, the gas is Ar. In some examples, the gas is $N_2$. In other examples, the gas is a mixture of Ar and $N_2$.

In some examples, and in some parts of the manufacturing line, such as the parts of the manufacturing line where sintering is not occurring, the atmosphere controls will include oxidizing gases. For example, $H_2O$ may be used alone or in combination with the gases in the preceding paragraphs. For example, $O_2$ may be used alone or in combination with the gases in the preceding paragraphs. For example, CDA (clean dry air) may be used alone or in combination with the gases in the preceding paragraphs.

In some examples, an air box (tunnel configuration) is used with exhaust.

In some examples, an air box with a feedback loop is used to form a gas feed tube and $O_2$ sensor in the ovens.

In some examples, the binder burn out chimney is replaced with Watlow Heater Cartridges embedded in plates, where the plates are perforated to allow gas to diffuse through them. The plates may incorporate a gas diffuser, gas manifold, channels, or other means to direct gas flow over the product surface(s). The unit includes exhaust ports to remove the products of debindering.

In some examples, a 6 inch diameter Lindbergh Bisque tube furnace is used. In some examples this furnace is at 650° C. The furnace may be at 200-900° C. The furnace may incorporate multiple temperature zones. The furnace may include a member to support the product during transit: the member may be made of inconel, hasteloy, Haynes Alloy 214, nickel, steel, stainless steel, boron nitride, silicon carbide, aluminum nitride, alumina, or another ceramic or metal. The support member may include a coating of haynes alloy, nickel, steel, stainless steel, boron nitride, silicon carbide, aluminum nitride, alumina, or another ceramic or metal.

In some examples, a 3 inch diameter furnace is used. In some examples this furnace is at 1000° C. In some examples this furnace is at 1010° C. In some examples this furnace is at 1020° C. In some examples this furnace is at 1030° C. In some examples this furnace is at 1040° C. In some examples this furnace is at 1050° C. In some examples this furnace is at 1060° C. In some examples this furnace is at 1070° C. In some examples this furnace is at 1080° C. In some examples this furnace is at 1090° C. In some examples this furnace is at 1110° C. The furnace may include a Haynes Alloy 214 travel support.

In some examples, a 6 inch diameter furnace is used. In some examples this furnace is at 1000° C. In some examples this furnace is at 1010° C. In some examples this furnace is at 1020° C. In some examples this furnace is at 1030° C. In some examples this furnace is at 1040° C. In some examples this furnace is at 1050° C. In some examples this furnace is at 1060° C. In some examples this furnace is at 1070° C. In some examples this furnace is at 1080° C. In some examples this furnace is at 1090° C. In some examples this furnace is at 1110° C. In some examples this furnace is at 1100° C. In some examples this furnace is at 1120° C. In some examples this furnace is at 1130° C. In some examples this furnace is at 1140° C. In some examples this furnace is at 1150° C. In some examples this furnace is at 1160° C. In some examples this furnace is at 1170° C. In some examples this furnace is at 1180° C. The furnace may include a Haynes Alloy 214 travel support.

In some examples, a 1-10 inch (e.g., 1 inch, 2 inch, 3 inch, 4 inch, 5 inch, 6 inch, 7 inch, 8 inch, 9 inch, or 10 inch) diameter furnace is used. In some examples this furnace is at 1000° C. In some examples this furnace is at 1010° C. In some examples this furnace is at 1020° C. In some examples this furnace is at 1030° C. In some examples this furnace is at 1040° C. In some examples this furnace is at 1050° C. In some examples this furnace is at 1060° C. In some examples this furnace is at 1070° C. In some examples this furnace is at 1080° C. In some examples this furnace is at 1090° C. In some examples this furnace is at 1110° C. The furnace may include a Haynes Alloy 214 travel support.

In some examples, including any of the foregoing, the CML is a three-stage system comprising a binder burn-out furnace: a bisque furnace; and a sintering furnace. Herein, bisque means that the material is heated so that the grains are partially necked but the density of the material is not as high as when the material is sintered.

In some examples, including any of the foregoing, the CML is a two-stage system comprising a binder burn-out and bisque furnace; and a sintering furnace.

In some examples, including any of the foregoing, the CML is a one-stage system comprising a single furnace that is used for binder burn-out, bisque, and sintering. In some of these examples, the furnace has multiple, distinct heating zones.

Figure 13:
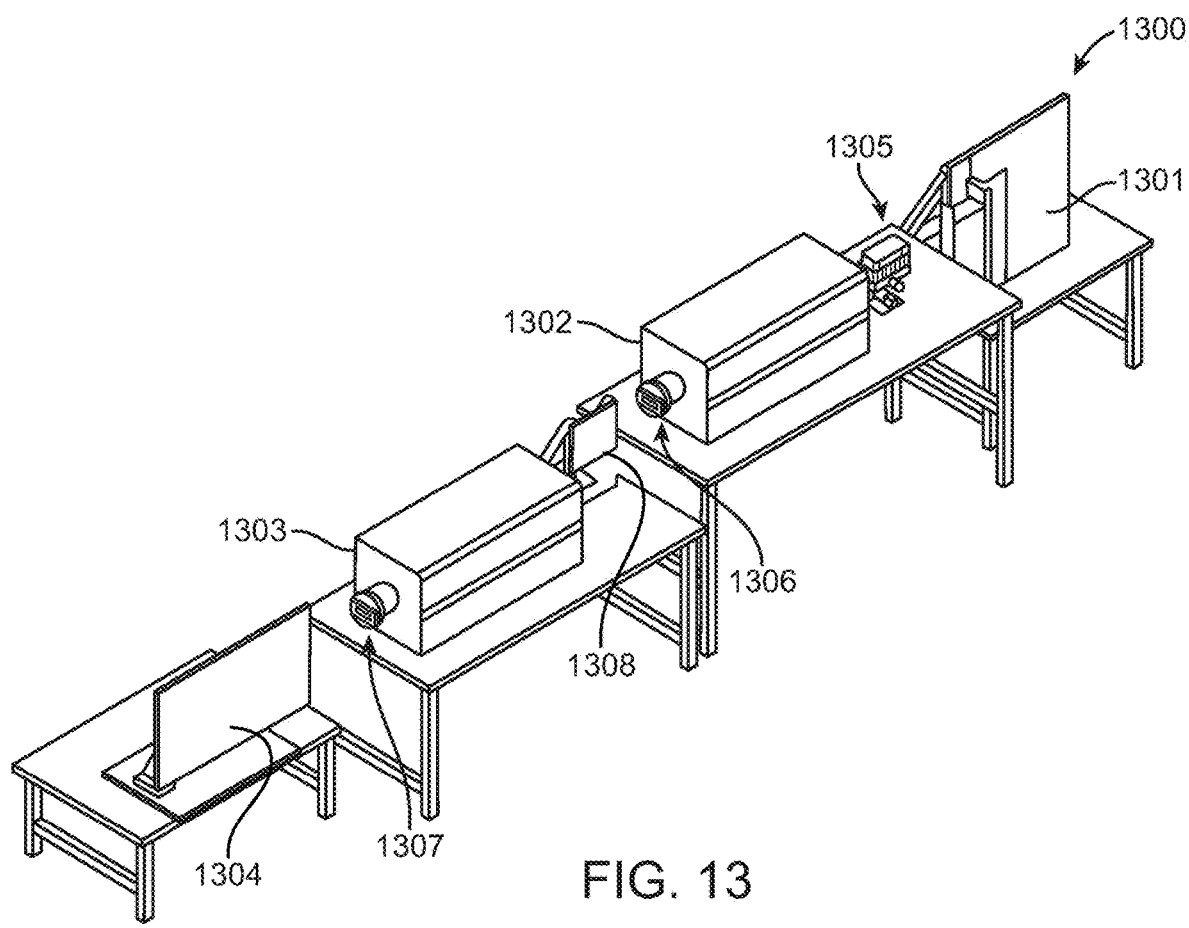
FIG. 13 shows another example of a continuous manufacturing line.

An example continuous manufacturing line (1300) is shown in FIG. 13. CML (1300) includes a front section (1301) and an end section (1304). In between, and in line with, the front section (1301) and the end section (1304), are at least three ovens (shown as 1302, 1303, and 1305). In some examples, there could be one oven with multiple heating zones which accomplish what three separate ovens could accomplish individually. In other examples, there could be two ovens (not shown). In yet other examples, there could be even more ovens. Front section (1301) may have one or more rollers on which green (i.e., unsintered) tape is provided. The rollers may be referred to as rewinders, laminators, or dancers. Additional rollers, pins, and pulleys may be present in front section (1301) to apply tension, to flatten, to roll, to curl, to imprint, or to direct green tapes from the front section (1301) to binder burn out oven (1305) and/or the green tape inlet (not shown) of oven (1302). End section (1304) may have one or more rollers on which sintered tape is received from oven (1303) through outlet (1307). Additional rollers, pins, and pulleys may be present in end section (1304) to apply tension, to flatten, to roll, to curl, to imprint, or to direct the sintered tapes to the front section (1301) from the outlet (1307) of oven (1303).

Figure 6:
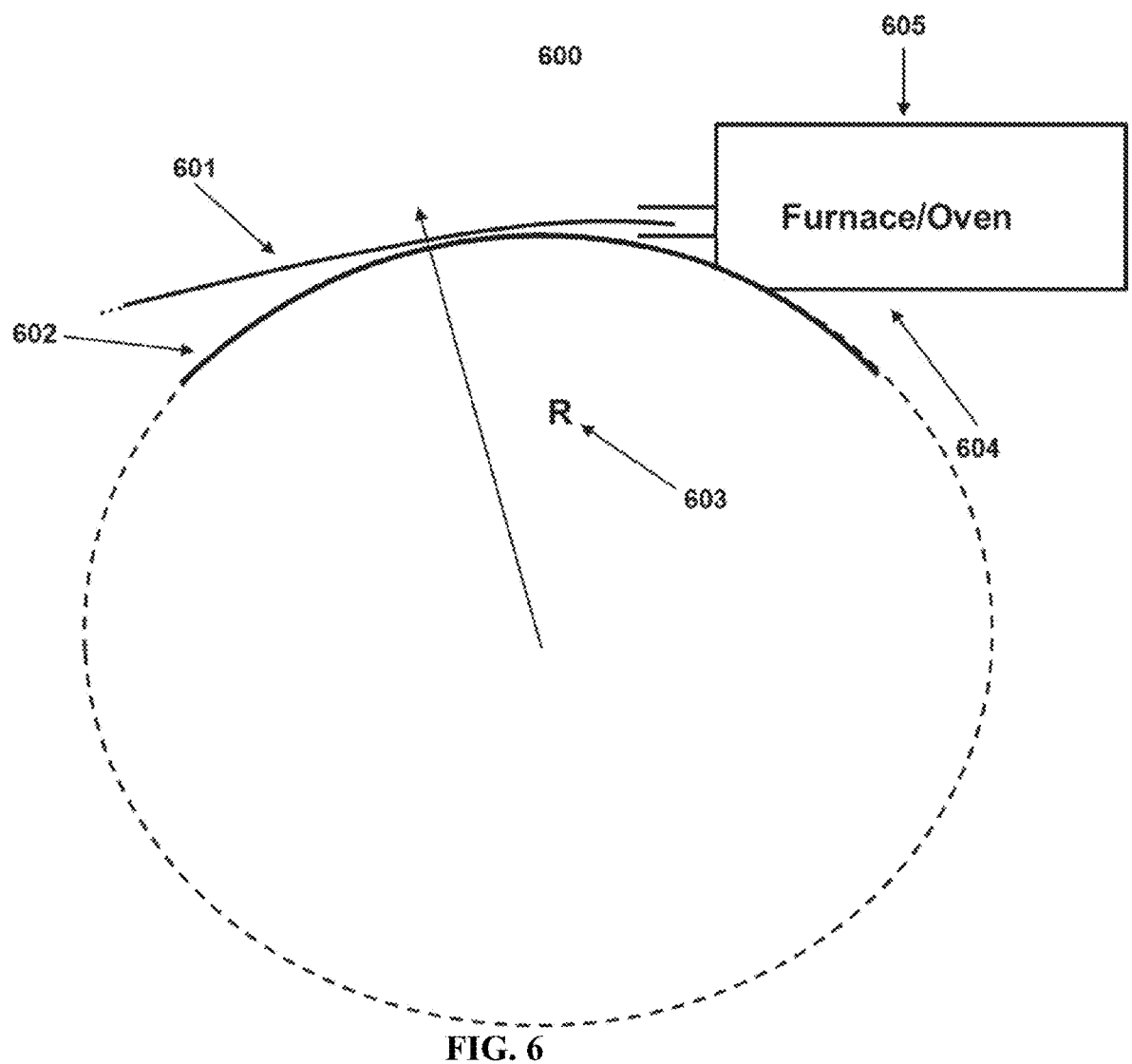
FIG. 6 shows a ramp and furnace/oven component of a continuous manufacturing line.

FIG. 13 also shows second section (1308). Second section (1308) may have one or more rollers on which green tape is provided. Additional rollers and pulleys may be present in second section (1308) to apply tension, to flatten, to roll, to curl, to imprint, or to direct green tapes from the outlet (1306) of bisque oven (1302); and to the green tape inlet to oven (1303). FIG. 6 shows example rollers, pins, and pulleys which may be used in certain examples of the CML (1300) at the end section (1304). Additional rollers and pulleys may be present in second section (1308) to apply tension, to flatten, to roll, to curl, to imprint, or to direct the tapes to the front section (1301) from the outlet (1307) of oven (1303). Weights may also be used to apply tension to the green tape or to the sintering film The tape, when passing through second section (1308) may have been partially calcined or completely calcined. Organic material in the tape may have burned out from the tape by the time the tape passes through second section (1308).

In some examples, bisque oven (1302) is a an oven which heats the green tape after the binder has been burned out of the green tape. In some examples, the oven (1302) has multiple, distinct heating zones in the oven.

In some examples, oven (1303) is a sintering oven. In some examples, the oven (1303) has multiple, distinct heating zones in the oven.

FIG. 13 also shows binder burn-out oven (1305). Binder burn out oven (1305) may be used to control and/or measure the thickness of the green tape before it enters the green tape inlet (not shown) for oven (1302). Binder burn out oven (1305) may be used to partially heat or sinter the green tape before it enters the green tape inlet (not shown) for bisque oven (1302). In some examples, oven (1305) is a binder burn out oven. The tape, when passing through second section (1305) may have been partially calcined or completely calcined. Organic material in the tape may have burned out from the tape by the time the tape passes through second section (1305). Heating cartridges may also be used in place of an oven at position (1305) in order to accomplish the binder burn out from the green tape.

FIG. 13 shows a horizontal tube oven (1302), which serves as a bisque oven, and also a horizontal tube oven (1303), which serves a sintering oven. In some examples, the horizontal tube oven (1302) and the horizontal tube oven (1303) are the same type of ovens. In some other examples, the horizontal tube oven (1302) and the horizontal tube oven (1303) are the different types of ovens. In yet other examples, the horizontal tube oven (1302) and the horizontal tube oven (1303) are the same type of ovens but each has a unique atmosphere inside the oven. In yet other examples, the horizontal tube oven (1303) includes Ar, $N_2$, $H_2$, or a combination thereof. In yet other examples, the horizontal tube oven (1303) includes Ar, $N_2$, $H_2$, or a combination thereof. In some examples, the horizontal tube oven (1303) does not include $O_2$. In some examples, the horizontal tube oven (1303) does not include $O_2$ at more than 100 parts-per-million. A unique atmosphere, in this instance, means that gaseous or vapor environment in one furnace is materially different from the gaseous or vapor environment in another furnace. For example, a material difference in one oven relative to another may include, but is not limited to, a 5% or greater difference in total pressure, a 5% or greater difference in partial pressure, a two-fold difference in the concentration or amount of a given gas (e.g., $O_2$, $H_2$, $N_2$, Ar, Xe, or $H_2O$) or a 10-fold difference in the flow rate of one gas or gases (e.g., gas mixture) in one oven relative to the another oven. For example, one furnace may include a sufficient amount of $O_2$ so that organic material can combust if heated to the ignition temperature of the organic material. This may be the conditions in the binder burn out section. In such an example, if another furnace had a low concentration of $O_2$ such that combustion could not be sustained therein even at the combustion temperature, this would demonstrate a material difference in one oven relative to another oven. For example, the sintering oven may have a lower oxygen concentration than the binder burn out oven. In another example, one furnace may include water vapor in concentrations greater than 1,000 parts-per-million (ppm); and another oven may include water vapor in concentrations less than 100 ppm (by molecule count). This difference in the partial pressure of $H_2O$ would also demonstrate a material difference in one oven relative to another oven.

In some examples, the binder burn-out has a higher flow rate than other furnaces in the CML line and the sintering furnace has lower flow rates and an inert gas.

In FIG. 13, each horizontal tube oven (1302) and horizontal tube oven (1303) has an green tape inlet (not shown because of perspective) and an outlet. Horizontal tube oven (1302) has outlet (1306) and horizontal tube oven (1303) has outlet (1307). In some examples, the opening gap or aperture through which a green tape, a sintering tape, or a sintered tape would pass has a shape that is cylindrical, elliptical, rectangular, or square, wherein the dimension of the gap or aperture is less than 10 cm. In some examples, the dimension of the gap or aperture is 9 cm. In some examples, the dimension of the gap or aperture is 8 cm. In some examples, the dimension of the gap or aperture is 7 cm. In some examples, the dimension of the gap or aperture is 6 cm. In some examples, the dimension of the gap or aperture is 5 cm. In some examples, the dimension of the gap or aperture is 4 cm. In some examples, the dimension of the gap or aperture is 3 cm. In some examples, the dimension of the gap or aperture is 2 cm. In some examples, the dimension of the gap or aperture is 1 cm. In some examples, the dimension of the gap or aperture is 500 μm. In some examples, the dimension of the gap or aperture is 400 μm. In some examples, the dimension of the gap or aperture is 8 mm. In some examples, the dimension of the gap or aperture is 300 μm. In some examples, the dimension of the gap or aperture is 6 mm. In some examples, the dimension of the gap or aperture is 200 μm. In some examples, the dimension of the gap or aperture is 4 mm. In some examples, the dimension of the gap or aperture is 100 μm. In some examples, the dimension of the gap or aperture is 50 μm. In some examples, this dimension of the gap or aperture at the gap or aperture is also the same dimension of the gap or aperture through the oven as the green tape passes through the oven.

Figure 14:
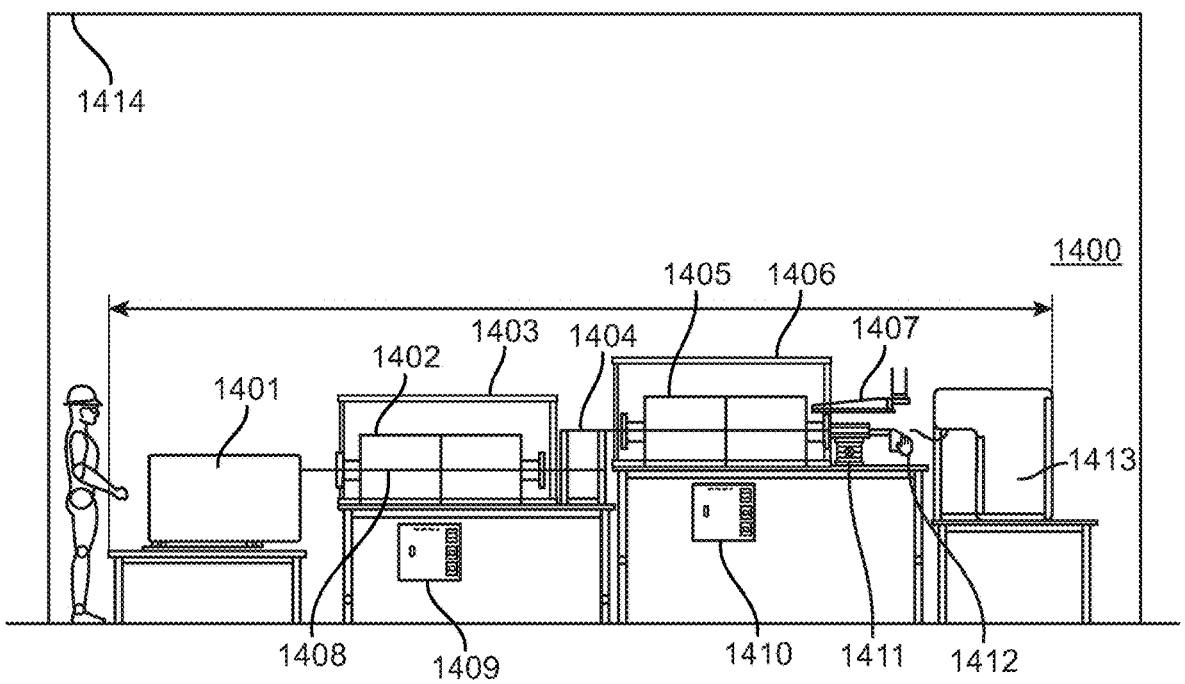
FIG. 14 shows another example of a continuous manufacturing line.

FIG. 14 shows an example of a continuous manufacturing line (1400). Shown is a front section (1413) having a wound-up roll of a green tape (not shown). In some examples, front section (1413) includes a first roller (not shown). During operation of the CML (1400), the green tape unwinds from the roll and moves into the binder burn-out oven (1411). Binder burn-out oven (1411) has chimney (1407) directly above it to contain combustion and other gaseous products. Also shown is a bisque oven (1405) which is encased by enclosure (1406). Also shown is a sintering oven (1402) which is encased by enclosure (1403). In some examples enclosures (1403) and (1406) are the same enclosure (not shown). In some examples, enclosure (1414) is used in place of enclosures (1403) and (1406). Section (1404) is present, in some examples, with various rollers, pins and tensioners to directed the green tape from the bisque oven to the sintering oven. Weights may also be used to apply tension. Controllers (1409 and 1410) control heating and cooling of the ovens, atmospheric controls, and rate at which the green tape moves through the CML (1400). Line (1408) represents the pathway that the green tape moves, starting from the binder burn-out oven (1411), through the bisque oven (1405), and into and out of the sintering oven (1402). Eventually, the sintered article, after exiting the sintering oven (1402), arrives at end section (1401) where the sintered article is wound-up on a roller or cut and stacked. FIG. 14 shows the beginning of the binder burn-out oven as having device (1412).

In some examples, there are transition zones between ovens where the tension in the green tape and/or sintered film can adjusted. On opposing sides of the transition zone, the green tape or sintered film may have non-equal tension applied.

In some examples, between ovens are transition zones where the green tape or sintered film is bent around a corner or around a roller. In some examples, the bending has a radius of curvature of about 6 inches. In some examples, the bending has a radius of curvature of about 7 inches. In some examples, the bending has a radius of curvature of about 8 inches.

In some examples, the tape or bilayer moving through the CML has a residence time in the oven of less than 60 minutes. In some examples, less than 30 minutes. In some other examples, less than 20 minutes. In yet other examples, less than 15 minutes. And in other examples, less than 10 minutes.

As the length of the CML oven increases, the speed at which the tape or bilayer moves through the oven will also increase to achieve one of the above residence times. In some examples, the binder burnout is facilitated by having some water in the atmosphere which assists in the removal of the binder.

In some examples, the CML includes a ramp leading up to the inlet of an oven, such as the binder burn-out oven, the bisque oven, and/or the sintering oven. The ramp may be curved in some examples. In some examples, the ramp may be heated or cooled. The ramp helps to apply tension to the green tape or to the sintered film. The ramp helps to smooth the green tape or the sintered film. The ramp helps to prevent wrinkles in the green tape or the sintered film.

Figure 7A:
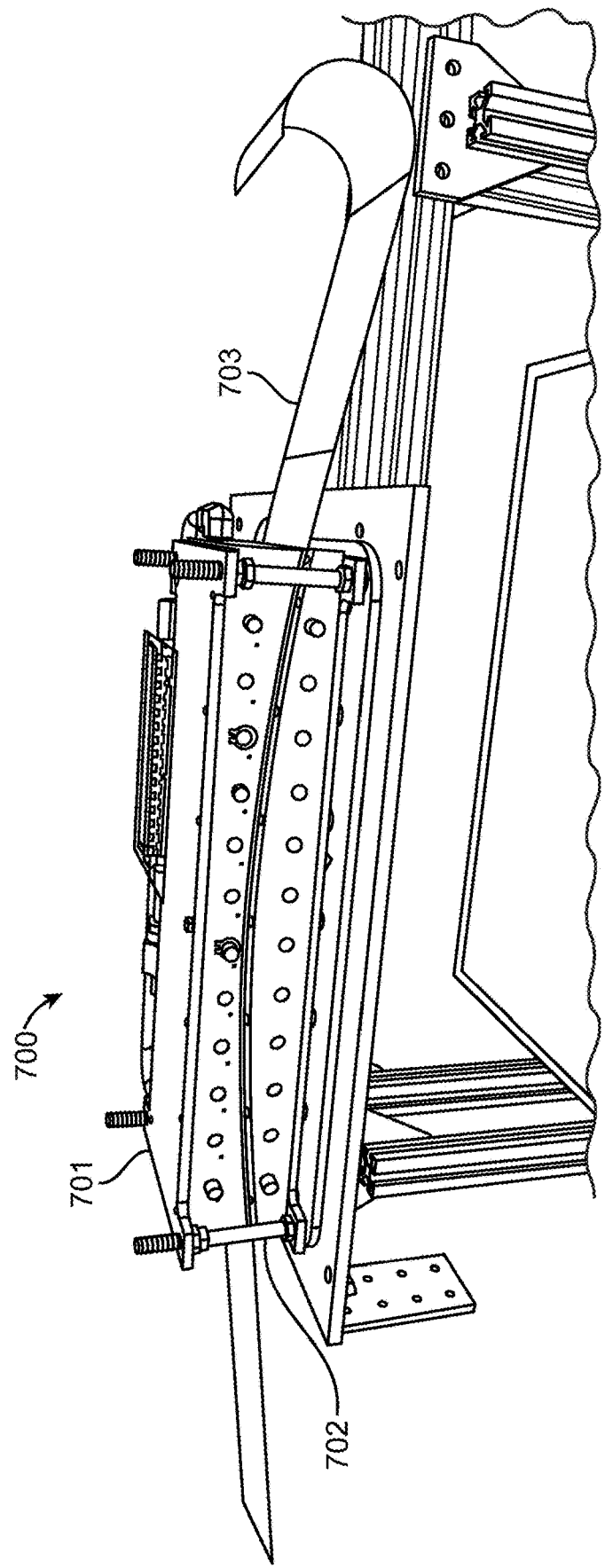
FIG. 7A shows a ramp component of a continuous manufacturing line.

FIG. 7A shows an example of a curved ramp component. 700, of a continuous manufacturing line. The curved ramp component. 700, includes a top part, 701, and a bottom part. 702, 701 and 702 may optionally have thermal controls (not explicitly shown) for heating or cooling purposes. 701 and 702 may be made of metal, e.g., steel, copper, nickel, etc., 701 and 702 may be coated with an oxide, such as but not limited to, lithium-stuffed garnet, zirconia, or lithium zirconia phosphate. In between 701 and 702 may be a film, 703. Film, 703, may be a green film, a film undergoing sintering, or a sintered film.

Figure 7B:
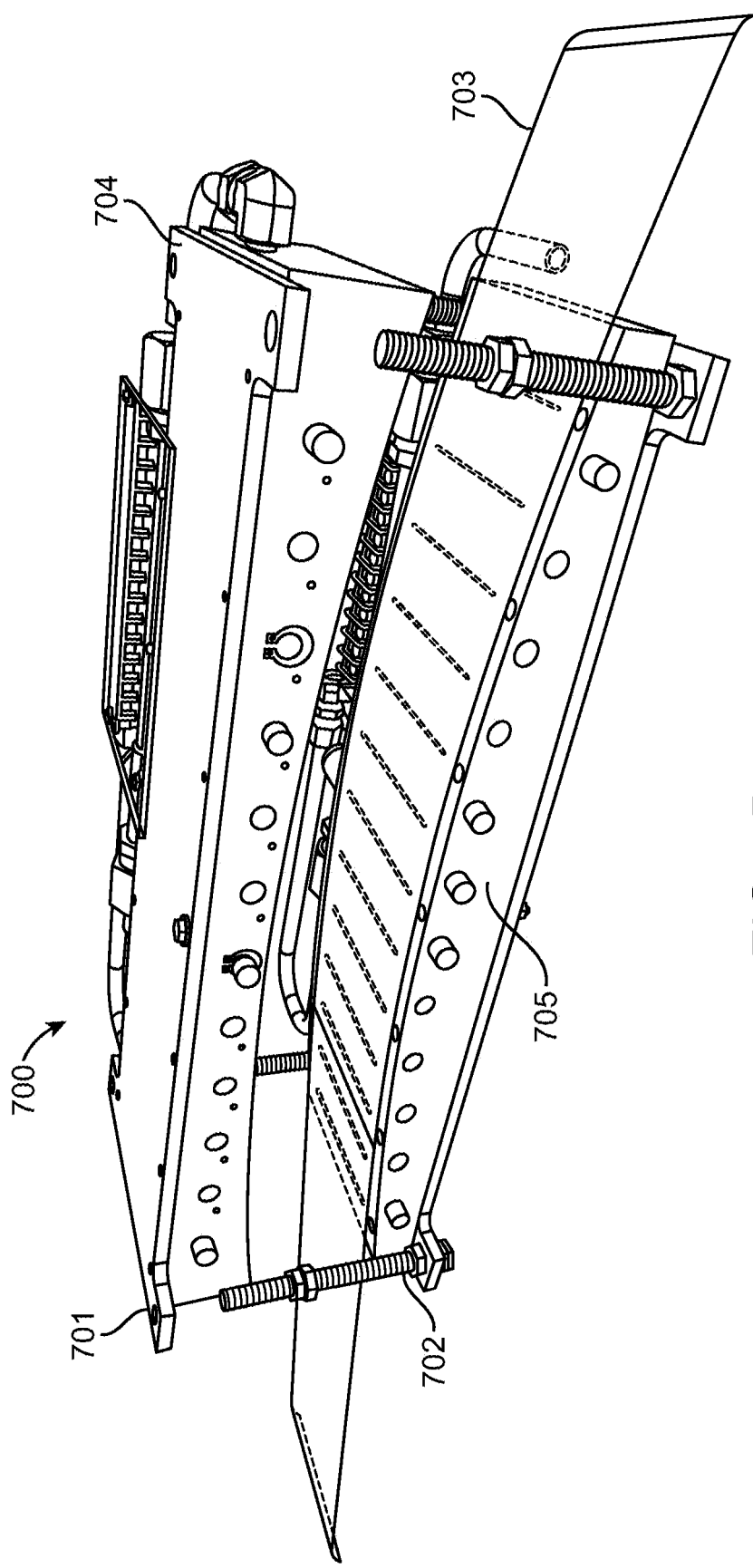
FIG. 7B shows a ramp component of a continuous manufacturing line.

FIG. 7B shows another example of a curved ramp component, 700, of a continuous manufacturing line. The curved ramp component. 700, includes a top part, 701, and a bottom part, 702, 701 and 702 may optionally have thermal controls, 704 and 705, for heating or cooling purposes. 701 and 702 may be made of metal, e.g., steel, copper, nickel, etc., 701 and 702 may be coated with an oxide, such as but not limited to, lithium-stuffed garnet, zirconia, or lithium zirconia phosphate. In between 701 and 702 may be a film, 703. Film, 703, may be a green film, a film undergoing sintering, or a sintered film.

The curved ramp components of the continuous manufacturing line may be adjusted to control the flatness, tension, presence or absence of wrinkles, or other surface features of the film which is placed in contact with the curve ramp. For example, as shown in the process 1200 in FIG. 12, a curved ramp component, 1203, may have end-rollers, 1201, and 1202. In some examples, end-rollers may help to maintain contact between the film and the surface of 1203. Arrow, 1205, indicates the direction which a film moves across the curved ramp component with respect to the rotation of end-rollers 1201 and 1202.

A continuous manufacturing line may, at various points or at just one point in the line, incorporate a spread roller. An example spread roller is shown in FIG. 15. Spread roller, 1500, has a film, 1501, which includes wrinkles or other surface defects. The spread roller, 1500, includes an angular displacement at positions 1502 and 1503. These angular displacement stretch out the film into a flat film at position 1504, 1505 indicates the entry point dimension for the film. 1506 indicates the spread dimension.

In some examples, the aforementioned ramp is characterized by a radius of curvature, which is shown in FIG. 6 as (600). In some examples, ramp (601) leads up to the entrance (604) to the Furnace/oven (605). The curvature of the ramp is represented by (602). The curvature corresponds to a circle having a radius (603). In some examples, including any of the foregoing, the radius of curvature is about 10 cm-50 cm. In some examples, including any of the foregoing, the radius of curvature is about 10 cm-40 cm. In some examples, including any of the foregoing, the radius of curvature is about 20 cm-50 cm. In some examples, including any of the foregoing, the radius of curvature is about 20 cm-40 cm. In some examples, including any of the foregoing, the radius of curvature is about 20 cm-30 cm. In some examples, including any of the foregoing, the radius of curvature is about 30 cm 50 cm. In some examples, including any of the foregoing, the radius of curvature is about 40) cm-50 cm. In some examples, including any of the foregoing, the radius of curvature is about 30 cm-40 cm. In some examples, including any of the foregoing, the radius of curvature is about 10 cm. In some examples, including any of the foregoing, the radius of curvature is about 10 cm. In some examples, including any of the foregoing, the radius of curvature is about 11 cm. In some examples, including any of the foregoing, the radius of curvature is about 12 cm. In some examples, including any of the foregoing, the radius of curvature is about 13 cm. In some examples, including any of the foregoing, the radius of curvature is about 14 cm. In some examples, including any of the foregoing, the radius of curvature is about 15 cm. In some examples, including any of the foregoing, the radius of curvature is about 16 cm. In some examples, including any of the foregoing, the radius of curvature is about 17 cm. In some examples, including any of the foregoing, the radius of curvature is about 18 cm. In some examples, including any of the foregoing, the radius of curvature is about 19 cm. In some examples, including any of the foregoing, the radius of curvature is about 20 cm. In some examples, including any of the foregoing, the radius of curvature is about 21 cm. In some examples, including any of the foregoing, the radius of curvature is about 22 cm. In some examples, including any of the foregoing, the radius of curvature is about 23 cm. In some examples, including any of the foregoing, the radius of curvature is about 24 cm. In some examples, including any of the foregoing, the radius of curvature is about 25 cm. In some examples, including any of the foregoing, the radius of curvature is about 26 cm. In some examples, including any of the foregoing, the radius of curvature is about 27 cm. In some examples, including any of the foregoing, the radius of curvature is about 28 cm. In some examples, including any of the foregoing, the radius of curvature is about 29 cm. In some examples, including any of the foregoing, the radius of curvature is about 30 cm. In some examples, including any of the foregoing, the radius of curvature is about 31 cm. In some examples, including any of the foregoing, the radius of curvature is about 32 cm. In some examples, including any of the foregoing, the radius of curvature is about 33 cm. In some examples, including any of the foregoing, the radius of curvature is about 34 cm. In some examples, including any of the foregoing, the radius of curvature is about 35 cm. In some examples, including any of the foregoing, the radius of curvature is about 36 cm. In some examples, including any of the foregoing, the radius of curvature is about 37 cm. In some examples, including any of the foregoing, the radius of curvature is about 38 cm. In some examples, including any of the foregoing, the radius of curvature is about 39 cm. In some examples, including any of the foregoing, the radius of curvature is about 40 cm. In some examples, including any of the foregoing, the radius of curvature is about 41 cm. In some examples, including any of the foregoing, the radius of curvature is about 42 cm. In some examples, including any of the foregoing, the radius of curvature is about 43 cm. In some examples, including any of the foregoing, the radius of curvature is about 44 cm. In some examples, including any of the foregoing, the radius of curvature is about 45 cm. In some examples, including any of the foregoing, the radius of curvature is about 46 cm. In some examples, including any of the foregoing, the radius of curvature is about 47 cm. In some examples, including any of the foregoing, the radius of curvature is about 48 cm. In some examples, including any of the foregoing, the radius of curvature is about 49 cm. In some examples, including any of the foregoing, the radius of curvature is about 50 cm.

In some examples, including any of the foregoing, the radius of curvature is about 6 inches-8 inches.

In some examples, including any of the foregoing, the radius of curvature is about 6 inches.

In some examples, including any of the foregoing, the radius of curvature is about 7 inches.

In some examples, including any of the foregoing, the radius of curvature is about 8 inches.

In some examples, the ramp may be made up of nickel, steel, stainless steel, copper, aluminum, Kovar, Invar, Haynes 216, ceramic, ceramic on metal, LLZO on Ni, or combinations thereof. In some examples, the Ni is thin, e.g., 1 µm-100 µm in thickness. In some examples, the ramp is a substrate with a zirconia coating on the substrate.

Figure 3:
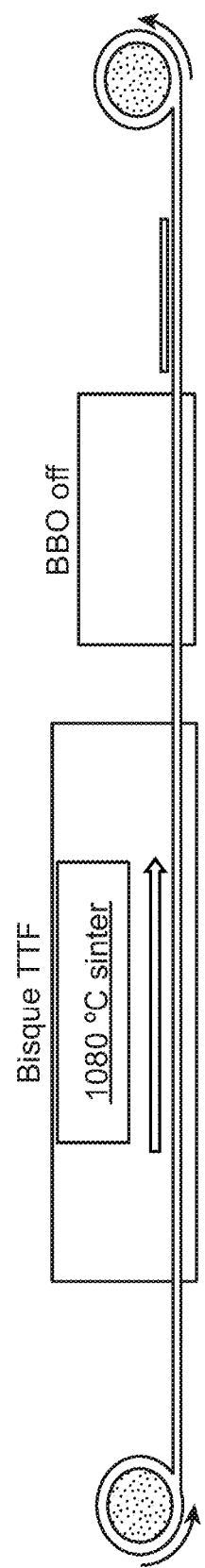
FIG. 3 shows an example of part of a continuous manufacturing line.

In some examples, the CML has a component which is substantially shown in FIG. 3. In FIG. 3, a green tape unrolls and enters a oven. Using the CML configuration as shown in FIG. 3, the process may be run as follows. In a first step, the tape is first run through the CML in the opposite direction of the arrows in FIG. 3, i.e. entering the BBO oven first, which is heated to less than 750 C (in some examples, 625° C.). Afterwards the tape enters the furnace which is heated to 600-900 C (in some examples, 850° C.), for bisque firing. In a second step, when the above is complete, the tape direction is reversed (so it now matches the arrows in the drawing) and it runs through the furnace which is heated to 900 C-1450° C. (in some examples, 1150° C.) for sintering. It goes through the BBO oven after but that is turned off (at ~room temp).

In some examples, including any of the foregoing, set forth herein is a continuous manufacturing line (CML) comprising: a front section comprising at least one front roller; an end section comprising at least one sintered article receiver; a middle section between the front section and end section comprising a binder burn-out oven and a bisqueing oven; wherein the middle section comprises a curved ramp before either the binder burn-out oven or before the bisqueing oven.

In certain examples, the curved ramp is positioned inside a sintering oven. In certain other examples, the curved ramp is positioned inside the bisque oven. In yet other examples, the curved ramp is positioned inside the binder burn-out oven. In other examples, the curved ramp is positioned between ovens.

In certain examples, the curved ramp is positioned in front of a sintering furnace. In certain other examples, the curved ramp is positioned in front of the bisque furnace. In yet other examples, the curved ramp is positioned in front of the binder burn-out furnace. In other examples, the curved ramp is positioned between furnaces.

In some examples, including any of the foregoing, the middle section further comprises a sintering oven.

In some examples, including any of the foregoing, the binder burn-out oven is enclosed in an atmospheric enclosure.

In some examples, including any of the foregoing, the CML oven has lower oxygen and water partial pressure (by a factor of at least 10×) compared to outside the oven.

In some examples, including any of the foregoing, the bilayer used is made of lithium-stuffed garnet at or above 90% by weight.

In some examples, including any of the foregoing, the bilayer made has an ASR below 20 ohm-cm$^2$ at room temperature with two Li electrodes. The ceramic portion of the bilayer has a thickness of about 40 µm.

In some examples, including any of the foregoing, the bisqueing oven is enclosed in an atmospheric enclosure.

In some examples, including any of the foregoing, the sintering oven is enclosed in an atmospheric enclosure.

In some examples, including any of the foregoing, the atmospheric enclosure enclosing the sintering oven comprises Ar, $N_2$, $H_2O$, $H_2$, or a combination thereof.

In some examples, including any of the foregoing, the atmospheric enclosure enclosing the binder burn-out oven comprises Ar, $N_2$, $H_2O$, $H_2$, $O_2$, or a combination thereof.

In some examples, including any of the foregoing, the atmospheric enclosure enclosing the bisqueing oven comprises Ar, $N_2$, $H_2O$, $H_2$, $O_2$, or a combination thereof.

In some examples, including any of the foregoing, the CML includes a green tape wound around the at least one front roller.

In some examples, the sintering of the LLZO films occurs without contacting portions of the LLZO film which are sintering with other surfaces, such as CML surfaces, during sintering. Not contacting the portion of the film which is sintering may have unexpectedly advantageous properties such as low flatness, retention of the stoichiometric amount of lithium in a given LLZO formula, and advantageous microstructure (e.g., high density, small grain size, and combinations thereof).

C. SINTERED ARTICLES (e.g., FILMS, MONOLITHS, WAFERS, SHEETS, CONTINUOUS TAPES, PRESSED POWDER PELLETS, AND BOULES)

Set forth herein is a sintered article, wherein the sintered article has a density of more than 95%.

Set forth herein is a sintered article substantially as shown in FIGS. 4-5 and 9-11.

In some examples, including any of the foregoing, the sintered article comprises a bilayer. In examples, the bilayer includes a metal foil and a ceramic film. In some examples, the sintered article comprises a trilayer. In some examples, the metal is Ni. In some examples, the Ni is 1 μm thick. In some examples, the Ni is 2 μm thick. In some examples, the Ni is 3 μm thick. In some examples, the Ni is 4 μm thick. In some examples, the Ni is 5 μm thick. In some examples, the Ni is 6 μm thick. In some examples, the Ni is 7 μm thick. In some examples, the Ni is 8 μm thick. In some examples, the Ni is 9 μm thick. In some examples, the Ni is 10 μm thick. In some examples, the Ni is 11 μm thick. In some examples, the Ni is 12 μm thick. In some examples, the Ni is 13 μm thick. In some examples, the Ni is 14 μm thick. In some examples, the Ni is 15 μm thick. In some examples, the Ni is 16 μm thick. In some examples, the Ni is 17 μm thick. In some examples, the Ni is 18 μm thick. In some examples, the Ni is 19 μm thick. In some examples, the Ni is 20 μm thick.

In some examples, a slurry may be deposited onto a piece of foil, forming a green tape with a foil backing. In some examples, the foil is a Mylar foil. The green tape with foil backing may be wound up into a roll, forming a roll of unsintered film with a foil backing. The roll of unsintered film with a foil backing may be loaded onto a CML as described herein. In some examples, a method of using the CML may include: (a) loading a roll of unsintered film with a foil backing on a front roller, (b) unrolling the unsintered film, (c) sintering the unsintered film to produce a sintered film with a foil backing, and (d) rolling the sintered film with a foil backing onto an end roller, wherein the operations are conducted in a controlled atmosphere. In some examples, the foil backing may comprise nickel metal or nickel foil.

In some examples, the green film sintered using the CML is a bilayer or a trilayer.

In some examples, various layer architectures can be envisioned and sintered according to the sintering methods set forth herein: A) free-standing lithium stuffed garnet material; B) free-standing lithium stuffed garnet material which optionally includes an active material, a binder, a solvent, and, or, carbon; C) a bilayer having one layer of a lithium stuffed garnet and one layer of a metal powder, foil or sheet; D) a bilayer having one layer of a lithium stuffed garnet and one layer comprising a metal powder, foil or sheet, E) a bilayer having one layer of a lithium stuffed garnet material which optionally includes an active material, a binder, a solvent, and, or, carbon and one layer of a metal powder, foil, or sheet; F) a trilayer having two layers of a lithium stuffed garnet and one layer of a metal powder, foil or sheet, between and in contact with the garnet layers; G) a trilayer having two layers of a lithium stuffed garnet and one layer comprising a metal powder, foil or sheet, between and in contact with the garnet layers; and H) a trilayer having two layers of a lithium stuffed garnet material wherein each garnet layer optionally includes an active material, a binder, a solvent, and, or, carbon and one layer of a metal powder, foil, or sheet, between and in contact with the garnet layers.

In some cases, a bilayer may be sintered using a CML described herein. In some cases, a trilayer may be sintered using a CML described herein.

A trilayer may comprises a layer of lithium-stuffed garnet, a metal layer, and a second layer of lithium-stuffed garnet on the opposite side of the metal layer. A bilayer film may pass through the CML with a layer of lithium-stuffed garnet facing up and the second layer of lithium-stuffed garnet facing down.

A bilayer may comprises a layer of lithium-stuffed garnet and a layer of metal foil. In some examples, a metal layer comprises Ni, Fe, Cu, Al, Sn, In, Ag, Au, steel, alloys, or combinations thereof. For example, the metal layer may include Ni and Fe. For example, the metal layer may include 90% Ni and 10% Fe. For example, the metal layer may include Ni and Fe. For example, the metal layer may include 91% Ni and 9% Fe. For example, the metal layer may include Ni and Fe. For example, the metal layer may include 92% Ni and 8% Fe. For example, the metal layer may include Ni and Fe. For example, the metal layer may include 93% Ni and 7% Fe. For example, the metal layer may include Ni and Fe. For example, the metal layer may include 94% Ni and 6% Fe. For example, the metal layer may include Ni and Fe. For example, the metal layer may include 95% Ni and 5% Fe. For example, the metal layer may include Ni and Fe. For example, the metal layer may include 96% Ni and 4% Fe. For example, the metal layer may include Ni and Fe. For example, the metal layer may include 97% Ni and 3% Fe. For example, the metal layer may include Ni and Fe. For example, the metal layer may include 98% Ni and 2% Fe. For example, the metal layer may include Ni and Fe. For example, the metal layer may include 99% Ni and 1% Fe. In some examples, a metal layer is a sheet of metal. In some examples, a metal layer is a sheet of aluminum. In some examples, a metal layer is a sheet of nickel. In some examples, a metal layer may be malleable. In some examples, the metal layer is 1 μm thick. In some examples, the metal layer is 2 μm thick. In some examples, the metal layer is 3 μm thick. In some examples, the metal layer is 4 μm thick. In some examples, the metal layer is 5 μm thick. In some examples, the metal layer is 6 μm thick. In some examples, the metal layer is 7 μm thick. In some examples, the metal layer is 8 μm thick. In some examples, the metal layer is 9 μm thick. In some examples, the metal layer is 10 μm thick. In some examples, the metal layer is 11 μm thick. In some examples, the metal layer is 12 μm thick.

In some examples, the metal layer is 13 μm thick. In some examples, the metal layer is 14 μm thick. In some examples, the metal layer is 15 μm thick. In some examples, the metal layer is 16 μm thick. In some examples, the metal layer is 17 μm thick. In some examples, the metal layer is 18 μm thick. In some examples, the metal layer is 19 μm thick. In some examples, the metal layer is 20 μm thick.

In some examples, the lithium-stuffed garnet-metal sintered films herein are 1 μm to 100 μm in thickness. In certain examples, these films are co-sintered with a mixed amount of lithium-stuffed garnet and a metal. The metal may be selected from the group consisting of Ni, Mg, Li, Fe, Al, Cu, Au, Ag, Pd, Pt, Ti, steel, alloys thereof, and combination thereof. The lithium-stuffed garnet and metal are mixed as powders and then co-sintered to form a film. In some examples, the film includes a uniform mixture of lithium-stuffed garnet and metal. The relative amounts of lithium-stuffed garnet and metal may vary by volume percent from 1% lithium-stuffed garnet up to 99% lithium-stuffed garnet with the remainder being the metal.

In some examples, including any of the foregoing, lithium-stuffed garnet is sintered onto a ceramic-metal film.

The CML systems and processes set forth herein are useful for making a variety of materials. These materials include but are not limited to lithium-stuffed garnet film films. These materials include but are not limited to bilayers of a lithium-stuffed garnet film on a metal layer or trilayers of a metal layer between two lithium-stuffed garnet films. The CML systems and processes set forth herein are useful for making lithium-stuffed garnet films or composite materials, including but not limited to any of the sintered films or film-including materials set forth in PCT/US2016/043428, filed Jul. 21, 2016, and published as WO2017015511A1—titled PROCESSES AND MATERIALS FOR CASTING AND SINTERING GREEN GARNET THIN FILMS; PCT/US2019/056584, filed Oct. 16, 2019, and published as WO2020081718A1—titled SINTERING LARGE AREA CERAMIC FILMS; PCT/US2016/15209, filed Jan. 27, 2016, and published as WO2017131676A1—titled ANNEALED GARNET ELECTROLYTE SEPARATORS; PCT/US2017/039069, filed Jan. 23, 2017, and published as WO2018236394A1—titled LITHIUM-STUFFED GARNET ELECTROLYTES WITH SECONDARY PHASE INCLUSIONS. PCT/US2019/54117, filed Oct. 1, 2019, and published as WO2020072524A1—titled METHODS OF MAKING AND USING AN ELECTROCHEMICAL CELL COMPRISING AN INTERLAYER; U.S. Pat. Nos. 10,403,931; 10,290,895; 9,966,630 B2; 10,347,937 B2; and 10,103,405, the entire contents of each of which are herein incorporate by reference in their entirety for all purposes.

In some examples, including any of the foregoing, the ceramic-metal film may be an oxide-metal film. In some examples, the film has one layer that is a ceramic and one layer that is a metal. In other examples, the film is a homogenous mixture of ceramic and metal. In some examples, the ceramic-metal film comprises a ceramic and a metal. In some examples, the volume percent of the ceramic is 10% and the volume percent of the metal is 90%. In some examples, the volume percent of the ceramic is 20% and the volume percent of the metal is 80%. In some examples, the volume percent of the ceramic is 30% and the volume percent of the metal is 70%. In some examples, the volume percent of the ceramic is 40% and the volume percent of the metal is 60%. In some examples, the volume percent of the ceramic is 50% and the volume percent of the metal is 50%. In some examples, the volume percent of the ceramic is 60% and the volume percent of the metal is 40%. In some examples, the volume percent of the ceramic is 70% and the volume percent of the metal is 30%. In some examples, the volume percent of the ceramic is 80% and the volume percent of the metal is 20%. In some examples, the volume percent of the ceramic is 90% and the volume percent of the metal is 10%. In some examples, the volume percent of the ceramic is 5% and the volume percent of the metal is 95%. In some examples, the volume percent of the ceramic is 15% and the volume percent of the metal is 85%. In some examples, the volume percent of the ceramic is 25% and the volume percent of the metal is 75%. In some examples, the volume percent of the ceramic is 35% and the volume percent of the metal is 65%. In some examples, the volume percent of the ceramic is 45% and the volume percent of the metal is 55%. In some examples, the volume percent of the ceramic is 55% and the volume percent of the metal is 45%. In some examples, the volume percent of the ceramic is 65% and the volume percent of the metal is 32%. In some examples, the volume percent of the ceramic is 75% and the volume percent of the metal is 25%. In some examples, the volume percent of the ceramic is 85% and the volume percent of the metal is 15%. In some examples, the volume percent of the ceramic is 95% and the volume percent of the metal is 5%.

In some examples, including any of the foregoing, the ceramic-metal film comprises an oxide and a metal. In some examples, the volume percent of the oxide is 10% and the volume percent of the metal is 90%. In some examples, the volume percent of the oxide is 20% and the volume percent of the metal is 80%. In some examples, the volume percent of the oxide is 30% and the volume percent of the metal is 70%. In some examples, the volume percent of the oxide is 40% and the volume percent of the metal is 60%. In some examples, the volume percent of the oxide is 50% and the volume percent of the metal is 50%. In some examples, the volume percent of the oxide is 60% and the volume percent of the metal is 40%. In some examples, the volume percent of the oxide is 70% and the volume percent of the metal is 30%. In some examples, the volume percent of the oxide is 80% and the volume percent of the metal is 20%. In some examples, the volume percent of the oxide is 90% and the volume percent of the metal is 10%. In some examples, the volume percent of the oxide is 5% and the volume percent of the metal is 95%. In some examples, the volume percent of the oxide is 15% and the volume percent of the metal is 85%. In some examples, the volume percent of the oxide is 25% and the volume percent of the metal is 75%. In some examples, the volume percent of the oxide is 35% and the volume percent of the metal is 65%. In some examples, the volume percent of the oxide is 45% and the volume percent of the metal is 55%. In some examples, the volume percent of the oxide is 55% and the volume percent of the metal is 45%. In some examples, the volume percent of the oxide is 65% and the volume percent of the metal is 32%. In some examples, the volume percent of the oxide is 75% and the volume percent of the metal is 25%. In some examples, the volume percent of the oxide is 85% and the volume percent of the metal is 15%. In some examples, the volume percent of the oxide is 95% and the volume percent of the metal is 5%.

In some examples, including any of the foregoing, the ceramic-metal film may be an oxide-metal film. In some examples, the ceramic-metal film comprises a ceramic and a metal. In some examples, the weight percent of the ceramic is 10% and the weight percent of the metal is 90%. In some examples, the weight percent of the ceramic is 20% and the weight percent of the metal is 80%. In some examples, the weight percent of the ceramic is 30% and the weight percent of the metal is 70%. In some examples, the weight percent of the ceramic is 40% and the weight percent of the metal is 60%. In some examples, the weight percent of the ceramic is 50% and the weight percent of the metal is 50%. In some examples, the weight percent of the ceramic is 60% and the weight percent of the metal is 40%. In some examples, the weight percent of the ceramic is 70% and the weight percent of the metal is 30%. In some examples, the weight percent of the ceramic is 80% and the weight percent of the metal is 20%. In some examples, the weight percent of the ceramic is 90% and the weight percent of the metal is 10%. In some examples, the weight percent of the ceramic is 5% and the weight percent of the metal is 95%. In some examples, the weight percent of the ceramic is 15% and the weight percent of the metal is 85%. In some examples, the weight percent of the ceramic is 25% and the weight percent of the metal is 75%. In some examples, the weight percent of the ceramic is 35% and the weight percent of the metal is 65%. In some examples, the weight percent of the ceramic is 45% and the weight percent of the metal is 55%. In some examples, the weight percent of the ceramic is 55% and the weight percent of the metal is 45%. In some examples, the weight percent of the ceramic is 65% and the weight percent of the metal is 32%. In some examples, the weight percent of the ceramic is 75% and the weight percent of the metal is 25%. In some examples, the weight percent of the ceramic is 85% and the weight percent of the metal is 15%. In some examples, the weight percent of the ceramic is 95% and the weight percent of the metal is 5%.

In some examples, including any of the foregoing, the ceramic in the ceramic-metal film may be selected from alumina, silica, titania, lithium-stuffed garnet, lithium aluminate, aluminum hydroxide, an aluminosilicate, lithium zirconate, lanthanum aluminate, lanthanum zirconate, lanthanum oxide, lithium lanthanum oxide, zirconia, $Li_2ZrO_3$, $xLi_2O\text{-}(1-x)SiO_2$ (where $x=0.01\text{-}0.99$), $aLi_2O\text{-}bB_2O_3\text{-}cSiO_2$ (where $a+b+c=1$), $LiLaO_2$, $LiAlO_2$, $Li_2O$, $Li_3PO_4$, or combinations thereof.

In examples, the trilayer includes a metal foil and a green ceramic film on both sides of the metal foil. A metal foil in a bilayer or trilayer may have a thickness of between 0.5 µm to 50 µm. A metal foil in a bilayer or trilayer may have a thickness of between 3 µm to 30 µm. In some examples, the metal foil in a bilayer or trilayer may have a thickness of between 5-20 µm. In other examples, the metal foil in a bilayer or trilayer may have a thickness of between 5 µm to 15 µm.

In some examples, including any of the foregoing, the sintered article comprises LLZO.

In some examples, the sintered film has a $D_{50}$ grain size less than 5 µm. In some examples, the sintered film has a $D_{50}$ grain size less than 4 µm. In some examples, the sintered film has a $D_{50}$ grain size less than 3 µm. In some examples, the sintered film has a $D_{50}$ grain size less than 2 µm. In some examples, the sintered film has a $D_{50}$ grain size less than 1 µm. In some examples, the sintered film has a $D_{50}$ grain size less than 0.9 µm. In some examples, the sintered film has a $D_{50}$ grain size less than 0.8 µm. In some examples, the sintered film has a $D_{50}$ grain size less than 0.7 µm. In some examples, the sintered film has a $D_{50}$ grain size less than 0.6 µm. In some examples, the sintered film has a $D_{50}$ grain size less than 0.5 µm. In some examples, the sintered film has a $D_{50}$ grain size less than 0.4 µm. In some examples, the sintered film has a $D_{50}$ grain size less than 0.3 µm. In some examples, the sintered film has a $D_{50}$ grain size less than 0.2 µm. In some examples, the sintered film has a $D_{50}$ grain size less than 0.1 micron. In some examples, the sintered film has a $D_{90}$ grain size less than 5 µm. In some examples, the sintered film has a $D_{90}$ grain size less than 4 µm. In some examples, the sintered film has a $D_{90}$ grain size less than 3 µm. In some examples, the sintered film has a $D_{90}$ grain size less than 2 µm. In some examples, the sintered film has a $D_{90}$ grain size less than 1 µm. In some examples, the sintered film has a $D_{90}$ grain size less than 0.9 µm. In some examples, the sintered film has a $D_{90}$ grain size less than 0.8 µm. In some examples, the sintered film has a $D_{90}$ grain size less than 0.7 µm. In some examples, the sintered film has a $D_{90}$ grain size less than 0.6 µm. In some examples, the sintered film has a $D_{90}$ grain size less than 0.5 µm. In some examples, the sintered film has a $D_{90}$ grain size less than 0.4 µm. In some examples, the sintered film has a $D_{90}$ grain size less than 0.3 µm. In some examples, the sintered film has a $D_{90}$ grain size less than 0.2 µm. In some examples, the sintered film has a $D_{90}$ grain size less than 0.1 micron. In some examples, the sintered film has a porosity of less than 5%. In some examples, the sintered film has a porosity of 1 less than 4%. In some examples, the sintered film has a porosity of less than 3%. In some examples, the sintered film has a porosity of less than 2%. In some examples, the sintered film has a porosity of less than 1%. In some examples, the sintered film has a porosity of less than 0.5%. In some examples, the sintered film has a porosity of less than 0.4%. In some examples, the sintered film has a porosity of less than 0.3%. In some examples, the sintered film has a porosity of less than 0.2%. In some examples, the sintered film has a density of greater than 95%. In some examples, the sintered film has a density of greater than 96%. In some examples, the sintered film has a density of greater than 97%. In some examples, the sintered film has a density of greater than 98%. In some examples, the sintered film has a density of greater than 99%. In some examples, the sintered film has a density of greater than 99.5%. In some examples, the sintered film has a density of greater than 99.6%. In some examples, the sintered film has a density of greater than 99.7%. In some examples, the sintered film has a density of greater than 99.8%. In some examples, the sintered film has a density of greater than 99.9%.

In some examples, a roll of sintered film may further comprise additional padding material.

In some examples, including any of the foregoing, the sintered film has a $D_{50}$ grain size of less than 5 microns (µm).

In some examples, including any of the foregoing, the sintered film has a $D_{90}$ grain size of less than 5 µm.

In some examples, including any of the foregoing, the sintered film has a porosity of less than 5% by volume.

In some examples, including any of the foregoing, the sintered film has a defect density of fewer than 100 protrusions per square centimeter from the surface with an aspect ratio (height/diameter) of greater than 1.

In some examples, including any of the foregoing, the sintered film has a defect density of fewer than 100 valleys per square centimeter from the surface with an aspect ratio (height/diameter) greater than 1.

In some examples, including any of the foregoing, the sintered film has a defect density of fewer than 100 protrusions per square centimeter at the interface between a lithium-stuffed garnet film and a metal layer with an aspect ratio (height/diameter) of greater than 1.

In some examples, including any of the foregoing, the sintered film has a defect density of fewer than 100 valleys per square centimeter the interface between a lithium-stuffed garnet film and a metal layer with an aspect ratio (height/diameter) greater than 1.

In some examples, including any of the foregoing, the $D_{50}$ grain size is at least 10 nm.

In some examples, including any of the foregoing, the $D_{50}$ grain size is at least 50 nm.

In some examples, including any of the foregoing, the $D_{50}$ grain size is at least 1 μm.

a. Sintered Lithium-Stuffed Garnet on Metal Foil

The CML disclosed herein may be used to sinter lithium-stuffed garnet on a metal foil. In some examples, the metal foil is a densified metal layer. In certain examples, the metal foil is a densified metal layer that also includes a ceramic. In some of these examples, the ceramic is a lithium-stuffed garnet.

In some examples, the metal foil or metal layer is nickel, steel, stainless steel, copper, aluminum, Kovar, Invar, ceramic, Haynes216, or a combination thereof.

In certain examples, the LLZO is sintered on a metal foil. In some of these examples, the metal foil is pure Ni. In some of these examples, the metal foil is a combination of Ni and Fe. In some of these examples, the metal foil is Ni/Fe 93%/7%.

In certain examples, the LLZO is sintered on a metal foil. In some of these examples, the metal foil is pure Cu. In some of these examples, the metal foil is Cu/Fe 93%/7%. In some of these examples, the metal foil is a combination of Cu and Fe.

In some examples, CTE matching is used to prevent curvature from forming in the sintered film. CTE matching includes making the two layers' coefficients of thermal expansion (CTE) the same. The interface between the two layers gets formed/fixed during sintering at >1000 C. As the film then cools down to room temperature, if the CTEs aren't the same, one layer will contract a little more than the other, creating a film that is curved to one side (the one that contracted more), which is undesirable.

Herein, "Invar" is a Ni/Fe material.

In some examples, the green tape which is described above as deposited on mylar foil is instead deposited onto a metal layer. The metal may be nickel, steel, stainless steel, copper, aluminum, Kovar, Invar, ceramic, ceramic on metal, Haynes216, LLZO, LLZO on Ni, or a combination thereof. In this example, the green tape does not need to be peeled off mylar and can instead be directly sintered on the metal. The green tape the metal may be rolled up together before the green tape is moved through the CML. In some examples, a backing layer is applied to the metal which is rolled up with a green tape on the metal. In some examples, an interleaf layer is used when the metal with a green tape on the metal is rolled up. The interleaf provides padding between the layers which are rolled up.

b. Sintered Lithium-Stuffed Garnet with No Underlying Substrate

In some examples, the CML is used to sintered lithium-stuffed garnet with no underlying substrate.

c. Sintered Lithium-Stuffed Garnet with a Co-Sintered Current Collector

In some examples, the CML is used to sintered lithium-stuffed garnet layer adjacent to a co-sintered current collector (CSC). The CSC layer may comprise Ni in 0.0001-25% by weight, Fe in 1-25% by weight, or combinations thereof. In some cases, the CSC layer comprises 1-20 weight % of Ni and 1-10 weight % of Fe and the remainder is lithium-stuffed garnet. In some cases, the CSC layer comprises 5-15 weight % of Ni and 1-5 weight % of Fe and the remainder is lithium-stuffed garnet. In some cases, the CSC layer comprises 10-15 weight % of Ni and 3-5 weight % of Fe and the remainder is lithium-stuffed garnet.

Other configurations are contemplated herein. For example, a bare film configuration may be as follows: a sintered LLZO film with no other, metal-containing layers.

For example, a CSC or co-sintering configuration may include a bilayer of green LLZO and green metal-ceramic layer. The metal-ceramic layer is a metal and ceramic powder while in green state.

For example, an on-foil configuration may be as follows. This includes casting a green LLZO on a metal layer/foil. The metal layer is a dense layer, not a powder. The foil in this case has no ceramic in it, can be purchased, and is typically made by processes other than sintering (e.g. electrodeposition or roll-annealing). For example, an on-foil configuration is possible as well with a ceramic-metal foil. This includes using a normal metal foil, starting out with a metal-ceramic foil, and hence the resulting final product similar to CSC.

D. ATMOSPHERIC CONTROLS

The CML as a complete system, or various components of the CML (e.g., ovens), may be encased in enclosures that provide atmospheric controls.

Various gas curtains may be used with the CML, as a complete system, or with various components of the CML (e.g., ovens), to provide atmospheric controls.

In some examples, atmospheric controls includes using narrow oven openings.

In some examples, atmospheric controls includes using excess flow at oven inlets and outlets. In some examples, atmospheric controls includes using a $N_2$ or Ar-filled glove box around various components such as rollers. In some examples, atmospheric controls includes using overpressures inside ovens.

In some examples, atmospheric controls includes controlling the amount of $H_2O$ in an oven. In some examples, atmospheric controls includes controlling the amount of $O_2$ in an oven. In some examples, atmospheric controls includes controlling the amount of $O_2$ in an oven to levels less than 100 ppm. In some examples, atmospheric controls includes controlling the amount of $O_2$ in an oven to levels less than 10 ppm. In some examples, atmospheric controls includes controlling the amount of $O_2$ in an oven to levels less than 1 ppm. In some examples, atmospheric controls includes controlling the amount of $H_2$ in an oven. In some examples, atmospheric controls includes controlling the amount of $N_2$ in an oven.

In some examples, the gas curtain is an $N_2$ curtain.

In some examples, an air box (tunnel configuration) is used with exhaust.

In some examples, an air box with a feedback loop is used to form a gas feed tube. In some examples, also included is $O_2$ sensor(s) in the ovens.

In some examples, the process will use atmospheric controls. This may include, for example, controlling the amount of $O_2$ in the sintering oven to less than 100 ppm or even lower. In some examples, atmospheric controls includes using $N_2$, Ar, or other inert gases to form gas curtains around the oven's (e.g., around the inlets and outlets to an oven). In some examples, atmospheric controls includes using excess flow around the inlets and outlets to an oven. In some examples, atmospheric controls includes using narrow openings around the inlets and outlets to an oven. In some examples, atmospheric controls includes using gas injection near the center of an oven. This gas injection may lead to laminar flow from center to both ends of the oven. In some examples, atmospheric controls includes passive or active overpressure inside an oven by using high gas flows and low opening sizes around the inlets and outlets to an oven.

In some examples, atmospheric controls includes using an enclosure to provide an enclosed environment with atmosphere control around or near an oven. For example, an enclosure filled with nitrogen with some regions exposed to reducing environment. The reducing environment may be accomplished by providing a partial pressure of $H_2$ or CO.

In some examples parts of the manufacturing line are enclosed in a container or room which includes atmosphere controls. For example, the manufacturing line may be completely enclosed in a clean room. In certain of these examples, gases are introduced into the enclosed container or room (e.g., clean room) which are free of particles. CDA refers to clean dry air and is the air or gases which have been filtered to remove particles based on the size of those particles. The gases may include $N_2$, Ar, forming gas (Ar/$H_2$; or $N_2$/$H_2$), or a combination thereof.

Pressure is measured with pressure gauge(s) and gas flow is controlled by mass-flow controllers.

E. METHOD OF USING CML AND PRODUCING A SINTERED ARTICLE

In some examples, set forth herein is a process of using a continuous manufacturing line, comprising the following operations: (a) providing, or having provided, a green tape wound around a front roller positioned in a front section; (b) unwinding the green tape into an inlet in an oven; (c) burning out the binder, (d) bisqueing; and (e) sintering the green tape in the oven while moving the green tape through the oven to produce a sintered film, and (f) winding the sintered film onto an end roller after exiting the oven through an outlet; and (g) controlling, or having controlled, the atmosphere in contact with the sintering green tape.

During this process, a variety of examples of use are possible depending on certain conditions and the article being produced. In some example, a leader tape will be used. This leader tape will be attached to the green tape with a high temperature ceramic (e.g., zirconia) epoxy. During the binder burn-out process, the green tape will be, in certain examples, suspended so that the green tape is not in contact with surfaces (e.g., setters). During the sintering process, the green tape will be, in certain examples, suspended so that the green tape is not in contact with surfaces (e.g., setters). This suspension may be accomplished by a variety of means. For example, tension, air bearings, or other devices may be used to suspend the green tape. In some examples, the surfaces of, for example, rollers, which the green tape may contact before or after sintering, may be coated with nickel or an inert coating that contains nickel. During sintering, in some examples, the sintering tape will move through a narrow gap made of nickel-plated metal plates. In some examples, the metal plates are stainless steel metal plates. In some examples, this gap will be less than 5 mm in thickness, wherein the thickness is the maximum distance between the nickel-plated metal plates, perpendicular to the face of one of the metal plates. In some examples, this gap will be less than 4.5 mm. In some examples, this gap will be less than 4 mm. In some examples, this gap will be less than 3.5 mm. In some examples, this gap will be less than 3 mm. In some examples, this gap will be less than 2.5 mm. In some examples, this gap will be less than 2 mm. In some examples, this gap will be less than 1.5 mm. In some examples, this gap will be less than 1 mm. In some examples, this gap will be less than 0.5 mm. In some examples, this gap will be less than 500 µm. In some examples, this gap will be less than 400 µm. In some examples, this gap will be less than 300 µm. In some examples, this gap will be less than 200 µm. In some examples, this gap will be less than 100 µm. In some examples, this narrow gap is helpful to prevent lithium loss from a sintering article during the sintering process.

In some examples, the flatness of the green tape will be controlled by applying tension to the green tape. In some examples, the flatness of the green tape will be controlled by precise tape slitting, which imparts minimal stress to edges of the sintered article. In some examples, the flatness of the green tape will be controlled by laser cutting the edges pre- or post-sintered articles. In some examples, the flatness of the green tape will be controlled by adjusting the lateral heating profile, e.g., heating center of film first. In some examples, flatness is controlled by precise alignment of the rollers applying the tension and other rollers in the CML.

In some examples, the sintered microstructure (high density, small grains) of the produced sintered article will be controlled by rapid sintering. In some examples, the sintered microstructure (high density, small grains) of the produced sintered article will be controlled by temperature ramp rate control, by tape speed, by the multiple heating zones, or combinations thereof.

In some examples, the process will use atmospheric controls. This may include, for example, controlling the amount of $O_2$ in the sintering oven to less than 100 ppm or even lower. In some examples, atmospheric controls includes using $N_2$, Ar, or other inert gases to form gas curtains around the oven's (e.g., around the inlets and outlets to an oven). In some examples, atmospheric controls includes using excess flow around the inlets and outlets to an oven. In some examples, atmospheric controls includes using narrow openings around the inlets and outlets to an oven. In some examples, atmospheric controls includes using gas injection near the center of an oven. This gas injection may lead to laminar flow from center to both ends of the oven. In some examples, atmospheric controls includes passive or active overpressure inside an oven by using high gas flows and low opening sizes around the inlets and outlets to an oven.

In some examples, atmospheric controls includes using an enclosure to provide an enclosed environment with atmosphere control around or near an oven. For example, an enclosure filled with nitrogen with some regions exposed to reducing environment. The reducing environment may be accomplished by providing a partial pressure of $H_2$ or CO.

In some examples, the green tapes are rapidly sintered. The time at which any given part of a film spends at a temperature above room temperature may be between 15 seconds and 20 minutes. In other examples, the time at which any given part of a film spends at a temperature above room temperature may be between 1 minute and 10 minutes. In other examples, the time at which any given part of a film spends at a temperature above room temperature may be between 1 minute and 5 minutes. In other examples, the time at which any given part of a film spends at a temperature above room temperature may be between 1 minute and 2 minutes.

To avoid surface contamination of the sintered article, or pre-sintered article as it moves through the CML, the films may be cooled to less than 40° C. In some examples, the films are maintained in an atmosphere that has a low $H_2O$ content. For example, the $H_2O$ content may be less than 10 ppm. In some examples, the films are maintained in an atmosphere that is mostly argon gas. In some examples, the films are maintained in an atmosphere that is mostly nitrogen gas. In some examples, the films are maintained in clean dry air (CDA).

Because the green tape will shrink as it is processed in the CML, different tape speeds (e.g., different roller rotation speeds) may be used for the green tape stage, as compared to the binder burn-out stage, or the sintering stage. Each part of the line may have different tape speeds. These varying speeds may, in some examples, be accomplished by independent tension control (e.g., dancer after bisque furnace, tension control after sintering).

Because of lateral shrinkage during sintering, the length of the sintering zone (along tape direction) may be large compared to the lateral shrinkage distance. This will make the angle of the tape edges low.

The green tape strength may change as it is processed in the CML. To accommodate this, the tape tension may be varied throughout the CML. For example, the tape may be under one tension setting in the binder burn out oven, and the tape may be under a different tension setting in the bisque oven, and, still, the tape may be under yet another a different tension in the sintering oven.

In some examples, the green tapes are peeled off Mylar substrates before moving through the continuous manufacturing line. This may be accomplished using a sharp knife edge (e.g., 180° angle at knife edge), tension controls, and other devices.

In some examples, the methods include (a) loading a roll of unsintered film on a front roller, (b) unrolling the unsintered film, (c) sintering the unsintered film to produce a sintered film, and (d) rolling the sintered film onto an end roller, wherein the operations are conducted in a controlled atmosphere. A roller may be used to keep the green film or the sintered film in a desired position.

In some examples, the green tape moves through the CML at a rate of about 2 inches to 25 inches per minute. In some examples, the green tape moves through the CML at a rate of about 3 inches to 6 inches per minute. In some examples, the green tape moves through the CML at a rate of about 1 inches to 5 inches per minute. In some examples, the green tape moves through the CML at a rate of about 5 inches to 10 inches per minute.

In some examples, the tape moves through the CML at a rate of about 2-25 inches/min. In some examples, the tape moves through the CML at a rate of about 3-6 inches/min.

In some examples, including any of the foregoing, the rate that the tape moves through the CML refers to the distance traveled and time spent moving through the sintering oven.

EMBODIMENTS

Embodiment 1: A continuous manufacturing line (CML) comprising:
a front roller;
an end roller;
at least one sealed furnace, between the front roller and the end roller, wherein the at least one furnace comprises (a) a binder burn-out section; (b) a bisque section; and (c) a sintering section; and
at least one atmospheric controller which controls at least one condition in the furnace selected from the group consisting of gas flow rate, flow direction, gas composition, pressure, and a combination thereof.

Embodiment 2: The CML of claim 1, further comprising a bilayer wound onto the front roller, wherein the bilayer comprises a metal layer and a green body layer.

Embodiment 3: A continuous manufacturing line (CML) comprising:
a front roller onto which is wound a bilayer, wherein the bilayer comprises a metal layer and a green body layer;
an end roller;
at least one furnace between the front roller and the end roller; and
at least one atmospheric controller which controls at least one condition in the furnace selected from the group consisting of gas flow rate, flow direction, gas composition, pressure, and a combination thereof.

Embodiment 4: The CML of claim 3, wherein the green body layer comprising unsintered lithium-stuffed garnet.

Embodiment 5: The CML of claim 3 or 4, wherein the at least one furnace comprises (a) a binder burn-out section; (b) a bisque section; and (c) a sintering section.

Embodiment 6: The CML of any one of embodiments 1-2 or 5, wherein the sintering section is not directly exposed to Earth's atmosphere.

Embodiment 7: The CML of any one of embodiments 3 or 4, wherein the at least one furnace is not directly exposed to Earth's atmosphere.

Embodiment 8: The CML of any one of embodiments 1-7, wherein the at least one furnace is sealed such that the at least one atmospheric controller controls the flow of gas into and out of the at least one furnace.

Embodiment 9: The CML of any one of embodiments 1-8, wherein the flow rate in the binder burn-out section is higher than the flow rate in the bisque section, higher than the flow rate in the sintering section, or higher than both the flow rate in the bisque section and higher than the flow rate in the sintering section.

Embodiment 10: The CML of any one of embodiments 1-9, wherein the atmospheric controller maintains a consistent atmospheric condition inside the at least one furnace.

Embodiment 11: The CML of any one of embodiments 1-2 and 5-9, wherein the atmospheric controller maintains a consistent atmospheric condition inside the binder burn-out section.

Embodiment 12: The CML of any one of embodiments 1-2 and 5-11, wherein the atmospheric controller maintains a consistent atmospheric condition inside the bisque section.

Embodiment 13: The CML of any one of embodiments 1-2 and 5-12, wherein the atmospheric controller maintains a consistent atmospheric condition inside the sintering section.

Embodiment 14: The CML of any one of embodiments 1-13, further comprising at least one gas curtain coupled to the at least one furnace.

Embodiment 15: The CML of claim 14, comprising a gas curtain at the inlet to the at least one furnace.

Embodiment 16: The CML of claim 14 or 15, comprising a gas curtain at the outlet to the at least one furnace.

Embodiment 17: The CML of any one of embodiments 1-16, comprising a pressurized gas line between the bisque section and the sintering section which pumps gas into the bisque section and into the sintering section.

Embodiment 18: The CML of any one of embodiments 1-17, comprising exhaust ports in the binder burn-out section, in the bisque section, in the sintering section, or a combination thereof.

Embodiment 19: The CML of any one of embodiments 1-18, wherein the at least one furnace is enclosed in a sealed container.

Embodiment 20: The CML of any one of embodiments 1-19, wherein Embodiment 1: The CML is enclosed in sealed room.

Embodiment 21: The CML of any one of embodiments 1-19, wherein the binder burn-out section is enclosed in a sealed container.

Embodiment 22: The CML of any one of embodiments 1-19, wherein the bisque section is enclosed in a sealed container.

Embodiment 23: The CML of any one of embodiments 1-19, wherein the sintering section is enclosed in a sealed container.

Embodiment 24: The CML of any one of embodiments 21-23, wherein the sealed container comprises an atmosphere of Ar, $N_2$, $H_2O$, $H_2$, or a combination thereof.

Embodiment 25: The CML of any one of embodiments 1-24, wherein the atmospheric controller maintains a reducing atmosphere in the bisque section.

Embodiment 26: The CML of any one of embodiments 1-25, wherein the atmospheric controller maintains an atmosphere in the bisque section comprising argon (Ar) gas; nitrogen ($N_2$) gas; hydrogen ($H_2$) gas; or a mixture thereof.

Embodiment 27: The CML of any one of embodiments 1-26, wherein the atmospheric controller maintains a reducing atmosphere in the sintering section.

Embodiment 28: The CML of any one of embodiments 1-27, wherein the atmospheric controller maintains an atmosphere in the sintering section comprising argon (Ar) gas; nitrogen ($N_2$) gas; hydrogen ($H_2$) gas; or a mixture thereof.

Embodiment 29: The CML of any one of embodiments 1-28, wherein the atmospheric controller maintains an atmosphere comprising less than 500 ppm $O_2$ in the bisque section, the sintering section, or both the bisque section and the sintering section.

Embodiment 30: The CML of any one of embodiments 1-24, wherein the atmospheric controller maintains an atmosphere in the binder burn-out section comprising $H_2O$ at less than 5% v/v.

Embodiment 31: The CML of any one of embodiments 26-30, wherein the $H_2$ gas is present at about 1, 2, 3, 4, or 5% v/v.

Embodiment 32: The CML of any one of embodiments 26-31, wherein the $H_2$ gas is present at about 2.9% v/v.

Embodiment 33: The CML of any one of embodiments 26-31, wherein the $H_2$ gas is present at about 5% v/v.

Embodiment 34: The CML of any one of embodiments 1-33, wherein the at least one furnace, or a part thereof, is under vacuum at a pressure less than 1 atmosphere (atm).

Embodiment 35: The CML of any one of embodiments 1-34, wherein the at least one furnace, or a part thereof, is under vacuum at a pressure less than 100 Torr.

Embodiment 36: The CML of any one of embodiments 1-35, wherein the ambient atmosphere in the binder burn-out section is different from the ambient atmosphere in the bisque section.

Embodiment 37: The CML of any one of embodiments 1-36, wherein the ambient atmosphere in the binder burn-out section is different from the ambient atmosphere in the sintering section.

Embodiment 38: The CML of any one of embodiments 1-37, wherein the ambient atmosphere in the bisque section is different from the ambient atmosphere in the sintering section.

Embodiment 39: The CML of any one of embodiments 1-38, wherein the amount of $O_2$ in the binder burn-out section is less than 0.2% by volume.

Embodiment 40: The CML of any one of embodiments 1-38, wherein the amount of $CO_2$ in the binder burn-out section is less than 0.2% by volume.

Embodiment 41: The CML of any one of embodiments 1-40, wherein the amount of carbon from $CO_2$ in the sintering section is less than 100 parts-per-million (ppm).

Embodiment 42: The CML of any one of embodiments 1-40, wherein the amount of carbon from $CO_2$ in the sintering section is about 50 ppm to 100 ppm.

Embodiment 43: The CML of any one of embodiments 2-42, wherein the bilayer shrinks primarily in the z-direction when moving through the sintering section.

Embodiment 44: The CML of any one of embodiments 2-43, wherein

Embodiment 1: The CML is configured to heat the bilayer at a rate higher than 2.5° C./min.

Embodiment 45: The CML of any one of embodiments 2-44, wherein Embodiment 1: The CML is configured to heat the bilayer at a rate higher than 5° C./min, 50° C./min, or 300° C./min.

Embodiment 46: The CML of any one of embodiments 2-43, wherein Embodiment 1: The CML is configured to heat the bilayer at a rate of about 5° C./min to about 50° C./min.

Embodiment 47: The CML of any one of embodiments 1-46, comprising infrared heaters.

Embodiment 48: The CML of any one of embodiments 1-48, comprising inductive carbon plate heaters.

Embodiment 49: The CML of any one of embodiments 2-48, wherein Embodiment 1: The CML is configured so that the residence time in the sintering section is two minutes or less.

Embodiment 50: The CML of any one of embodiments 2-49, wherein Embodiment 1: The CML is configured so that the residence time in the sintering section is about thirty seconds.

Embodiment 51: The CML of any one of embodiments 2-50, wherein Embodiment 1: The CML is configured so that the residence time in binder burn-out section is about ten times the residence time in the sintering section.

Embodiment 52: The CML of any one of embodiments 1-51, comprising at least one tension regulator.

Embodiment 53: The CML of claim 52, wherein the tension of the bilayer after the front roller is 270 g.

Embodiment 54: The CML of claim 52 or 53, wherein the tension of the bilayer before the end roller is 500 g.

Embodiment 55: The CML of any one of embodiments 52-54, wherein the width of the bilayer is 8 cm.

Embodiment 56: The CML of any one of embodiments 52-55, wherein the tension of the bilayer is about 34 g/cm.

Embodiment 58: The CML of any one of embodiments 52-55, wherein the tension of the bilayer is about 35 N/10 µm.

Embodiment 58: The CML of any one of embodiments 52-55, wherein the tension of the bilayer is less than 50% of its yield strength Embodiment 59: The CML of any one of embodiments 52-55, wherein the tension of the bilayer is less than 50% of the yield strength of the metal layer.

Embodiment 60: The CML of any one of embodiments 52-55, wherein the tension of the bilayer is about 25% to 50% of its yield strength Embodiment 61: The CML of any one of embodiments 52-55, wherein the tension of the bilayer is about 25% to 50% of the yield strength of the metal layer.

Embodiment 62: The CML of any one of embodiments 1-61, wherein the green body is a green tape.

Embodiment 63: The CML of any one of embodiments 1-62, wherein the green body is a patched green tape.

Embodiment 64: The CML of any one of embodiments 2-63, wherein the bilayer is oriented for curtain processing as it moves through Embodiment: The CML.

Embodiment 65: The CML of any one of embodiments 2-64, wherein the bilayer is oriented for vertical processing as it moves through Embodiment: The CML.

Embodiment 66: The CML of any one of embodiments 1-65, comprising a middle roller after the binder burn-out section onto which a bilayer is wound as it moves through Embodiment: The CML.

Embodiment 67: The CML of claim 66, wherein the bilayer on the middle roller does not include a binder in the green body.

Embodiment 68: The CML of any one of embodiments 1-67, wherein the at least one furnace has a green tape inlet.

Embodiment 69: The CML of any one of embodiments 1-68, wherein the metal layer comprises a metal selected from the group consisting of nickel (Ni), iron (Fe), copper (Cu), platinum (Pt), gold (Au), silver), an alloy thereof, or a combination thereof.

Embodiment 70: The CML of claim 69, wherein the metal layer is an alloy of Fe and Ni.

Embodiment 71: The CML of claim 69 or 70, wherein the metal layer is an alloy of Fe and Ni, and the amount of Fe is 1% to 25% (w/w) with the remainder being Ni.

Embodiment 72: The CML of any one of embodiments 1-71, wherein the thickness of the metal layer is 1 µm to 20 µm.

Embodiment 73: The CML of any one of embodiments 1-71, wherein the thickness of the metal layer is 1 µm to 10 µm.

Embodiment 74: The CML of any one of embodiments 1-71, wherein the thickness of the metal layer is 5 µm to 10 µm.

Embodiment 75: The CML of any one of embodiments 1-74, wherein the bilayer is not supported by an air bearing as it moves through Embodiment: The CML.

Embodiment 76: The CML of any one of embodiments 1-75, wherein the bilayer is suspended as it moves through Embodiment: The CML.

Embodiment 77: The CML of any one of embodiments 1-76, wherein the bilayer is suspended as it moves through the binder burn-out section.

Embodiment 78: The CML of any one of embodiments 1-77, wherein the bilayer is suspended as it moves through the bisque section.

Embodiment 79: The CML of any one of embodiments 1-78, wherein the bilayer is suspended as it moves through the sintering.

Embodiment 80: The CML of any one of embodiments 1-79, wherein the binder burn-out section is a binder burn-out furnace.

Embodiment 81: The CML of claim 80, wherein the binder burn-out furnace is a furnace heated to a temperature sufficient to volatilize, pyrolize, combust, or decompose a binder present in the green body.

Embodiment 82: The CML of claim 81, wherein the temperature in the binder burn-out furnace is between 100° C. and 500° C.

Embodiment 83: The CML of claim 81 or 82, wherein the binder burn-out furnace comprises some oxygen.

Embodiment 84: The CML of any one of embodiments 1-83, wherein the bisque section is a bisque furnace.

Embodiment 85: The CML of claim 84, wherein the bisque furnace is a furnace heated to a temperature sufficient to bisque the green body after removing of the binder.

Embodiment 86: The CML of claim 85, wherein the temperature in the bisque furnace is between 100° C. and 800° C.

Embodiment 87: The CML of any one of embodiments 1-86, wherein the sintering section is a sintering furnace.

Embodiment 88: The CML of claim 87, wherein the sintering furnace is a furnace heated to a temperature sufficient to sinter the green body.

Embodiment 89: The CML of claim 87 or 88, wherein the sintering furnace is a furnace heated to a temperature sufficient to sinter lithium-stuffed garnet.

Embodiment 90: The CML of claim 87 or 88, wherein the temperature in the sintering furnace is between 500° C. and 1300° C.

Embodiment 91: The CML of any one of embodiments 80-91, wherein the binder burn-out furnace is hermitically coupled to the bisque furnace and the bisque furnace is hermitically sealed to the sintering furnace.

Embodiment 92: The CML of any one of embodiments 1-91, wherein the at least one furnace is a single furnace.

Embodiment 93: The CML of any one of embodiments 1-92, wherein the at least one end roller has a roller diameter greater than 6 cm.

Embodiment 94: The CML of any one of embodiments 1-93, wherein the at least one end roller has a winding tension of greater than 20 g per linear cm.

Embodiment 95: The CML of any one embodiments 1-94, wherein the airspace above and below the bilayer is configured to maintain a lithium-rich atmosphere in contact with the sintering film.

Embodiment 96: The CML of any one embodiments 1-95, wherein the airspace above and below the bilayer is configured to maintain a least 95% by weight of the lithium in the lithium-stuffed garnet.

Embodiment 97: The CML of any one embodiments 1-96, comprising at least two end rollers.

Embodiment 98: The CML of any one embodiments 2-97, wherein the green body comprises unsintered lithium-stuffed garnet or chemical precursors to lithium-stuffed garnet.

Embodiment 99: The CML of any one embodiments 1-98, comprising a sintered bilayer wound around the at least one end roller.

Embodiment 100: The CML of claim 99, wherein the sintered bilayer comprise sintered lithium-stuffed garnet.

Embodiment 101: The CML of any one embodiments 1-100, wherein the green body comprises a binder.

Embodiment 102: The CML of any one embodiments 1-101, wherein the green body comprises a dispersant.

Embodiment 103: The CML of any one of embodiments 1-102, wherein the green body comprises a solvent or a combination of solvents.

Embodiment 104: The CML of any one of embodiments 2-103, wherein Embodiment: The CML is configured to move the bilayer through the at least one furnace at rate of at least 2 inches per minute.

Embodiment 105: The CML of any one of embodiments 2-103, wherein Embodiment: The CML is configured to move the bilayer through the sintering section at rate of at least 2 inches per minute.

Embodiment 106: The CML of any one of embodiments 1-103, further comprising a curved ramp before the at least one furnace.

Embodiment 107: The CML of any one of embodiments 1-103, further comprising a curved ramp before the binder burn-out section.

Embodiment 108: The CML of any one of embodiments 1-103, further comprising a curved ramp before the bisque section.

Embodiment 109: The CML of any one of embodiments 1-103, further comprising a curved ramp before the sintering section.

Embodiment 110: The CML of any one of embodiments 1-103, further comprising a curved ramp inside the at least one furnace.

Embodiment 111: The CML of any one of embodiments 1-103, further comprising a curved ramp inside the binder burn-out section.

Embodiment 112: The CML of any one of embodiments 1-103, further comprising a curved ramp inside the bisque section.

Embodiment 113: The CML of any one of embodiments 1-103, further comprising a curved ramp inside the sintering section.

Embodiment 114: The CML of any one of embodiments 106-113, wherein the curved ramp is coated.

Embodiment 115: The CML of claim 114, wherein the coating is a Lithium aluminate coating.

Embodiment 116: The CML of claim 114, wherein the coating is boron nitride coating.

Embodiment 117: The CML of any one of embodiments 106-114, wherein the top surface of the curved ramp is made of a ceramic.

Embodiment 118: The CML of claim 115, wherein the ceramic is silicon carbide, boron nitride, alumina, zirconia, lithium aluminate.

Embodiment 119: The CML of any one of embodiments 106-118, wherein the ramp is made of SS 430, SS 304, Kovar, Invar, Haynes 214, greater than 99.5% (w/w) alumina, a carbon composite, boron nitride, or a combination thereof.

Embodiment 120: The CML of any one of embodiments 1-119, comprising speed bumps over which the bilayer passes as it moves through Embodiment: The CML.

Embodiment 121: The CML of any one of embodiments 1-120, comprising at least one curved runway.

Embodiment 122: The CML of any one of embodiments 1-121, comprising at least one curved runway, that curve in the z and x direction.

Embodiment 123: The CML of claim 121 or 122, wherein the runway is made of SS 430, SS 304, Kovar, Invar, Haynes 214, greater than 99.5% (w/w) alumina, a carbon-carbon composite, boron nitride, or a combination thereof.

Embodiment 124: A process of using a continuous manufacturing line, comprising the following operations:

(a) providing, or having provided, a CML as in any one of embodiments 1-123;

(b) sintering the green body while moving the green body through the at least one furnace to produce a sintered body, and (c) winding the sintered body onto an end roller.

Embodiment 125: The process of claim 124, comprising controlling, or having controlled, the atmosphere in the at least one furnace.

Embodiment 126: The process of any one of embodiments 124-125, comprising moving the green body, or resulting sintered body, through the at least one furnace at a rate of at least two inches per minute in the direction that the green tape moves.

Embodiment 127: The process of any one of embodiments 124-125, bilayer is less than 200 μm thick.

Embodiment 128: A sintered article prepared by the process of any one of embodiments 124-127.

Embodiment 129: The sintered article of claim 128, wherein the metal layer is 10% or less by weight (w/w) of total weight of the bilayer.

Embodiment 130: The sintered article of any one of embodiments 128-129, wherein the bilayer has an area-specific resistance of less than 20 $\Omega$-cm$^2$ at room temperature.

Embodiment 131: The sintered article of any one of embodiments 128-130, wherein the bilayer has an area-specific resistance of less than 20 $\Omega$-cm$^2$ at 20° C.

Embodiment 132: The sintered article of any one of embodiments 128-131, wherein the thickness of the bilayer is about 30 μm to 50 μm thick.

Embodiment 133: The sintered article of any one of embodiments 128-132, wherein the thickness of the bilayer is about 30 μm, 40 μm, or 50 μm thick.

Embodiment 134: The sintered article of any one of embodiments 128-133, wherein the surface of the bilayer opposite the metal layer is free of defects.

Embodiment 135: The sintered article of any one of embodiments 128-134, wherein the bilayer has a $D_{90}$ ceramic grain size of about 50 μm.

Embodiment 136: The sintered article of any one of embodiments 128-135, wherein the bilayer has a $D_{90}$ ceramic grain size of about 25 μm.

Embodiment 137: The sintered article of any one of embodiments 128-136, wherein the bilayer has a $D_{90}$ ceramic grain size of about 5 μm.

Embodiment 138: The sintered article of any one of embodiments 128-137, wherein the bilayer comprises sintered lithium-stuffed garnet oxide.

Embodiment 139: The sintered article of any one of embodiments 128-138, wherein the bilayer has a porosity of less than 5% by volume as determined by scanning electron microscopy (SEM).

Embodiment 140: The sintered article of any one of embodiments 128-139, wherein the bilayer has a porosity of less than 0% as measured by BET surface area analysis.

Embodiment 141: The sintered article of any one of embodiments 128-140, wherein the bilayer has a porosity of less than 0% by volume as measured by a helium leak test.

Embodiment 142: A sintered film or bilayer comprising lithium-stuffed garnet, wherein the film is wound around a roller, and wherein the film is less than 100 μm thick.

Embodiment 143: The sintered film or bilayer of claim 142, comprising no defects on the lithium-stuffed garnet over a 100 µm² area.

Embodiment 144: The sintered film or bilayer of claim 142, comprising no defects on the lithium-stuffed garnet over a 100 mm² area.

Embodiment 145: The sintered film or bilayer of claim 142, comprising no defects on the lithium-stuffed garnet over a 100 cm² area.

Embodiment 146: The sintered film or bilayer of any one of embodiments 142-145, comprising no defects on the lithium-stuffed garnet over a 100 mm² area.

Embodiment 147: The sintered film or bilayer of any one of embodiments 142-146, wherein the lithium-stuffed garnet has a $D_{90}$ grain size of about 50 µm.

Embodiment 148: The sintered film or bilayer of any one of embodiments 142-147, wherein the lithium-stuffed garnet has a $D_{90}$ grain size of about 25 µm.

Embodiment 149: The sintered film or bilayer of any one of embodiments 142-148, wherein the lithium-stuffed garnet has a $D_{90}$ grain size of about 5 µm.

Embodiment 150: The sintered film or bilayer of any one of embodiments 142-149, wherein Embodiment: The sintered film or bilayer comprises lithium-stuffed garnet oxide.

Embodiment 151: The sintered film or bilayer of any one of embodiments 142-150, wherein Embodiment: The sintered film or bilayer has a porosity of less than 5% by volume as determined by scanning electron microscopy (SEM).

Embodiment 152: The sintered film or bilayer of any one of embodiments 142-151, wherein Embodiment: The sintered film or bilayer has a porosity of 0% as measured by BET surface area analysis.

Embodiment 153: The sintered film or bilayer of any one of embodiments 142-152, wherein Embodiment: The sintered film or bilayer has a porosity of 0% by volume as measured by a helium leak test.

Embodiment 154: The sintered film or bilayer of any one of embodiments 142-153, wherein Embodiment: The sintered film or bilayer has a $D_{50}$ grain size of less than 5 microns (µm).

Embodiment 155: The sintered film or bilayer of any one of embodiments 142-154, wherein Embodiment: The sintered film or bilayer has a $D_{90}$ grain size of less than 5 µm.

Embodiment 156: The sintered film or bilayer of any one of embodiments 142-155, wherein Embodiment: The sintered film or bilayer has a porosity of less than 5% by volume as measured by SEM.

Embodiment 157: The sintered film or bilayer of any one of embodiments 142-156, wherein the lithium-stuffed garnet has a defect density of fewer than 100 protrusions per square centimeter from the surface with an aspect ratio (height/diameter) of greater than 1.

Embodiment 158: The sintered film or bilayer of any one of embodiments 142-157, wherein the lithium-stuffed garnet has a defect density of fewer than 100 valleys per square centimeter from the surface with an aspect ratio (height/diameter) greater than 1.

Embodiment 159: The sintered film or bilayer of any one of embodiments 142 or 158, wherein the lithium-stuffed garnet $D_{50}$ grain size is at least 10 nm.

Embodiment 160: The sintered film or bilayer of any one of embodiments 142 or 159, wherein the lithium-stuffed garnet $D_{50}$ grain size is at least 50 nm.

Embodiment 161: The sintered film or bilayer of any one of embodiments 142 or 160, wherein the lithium-stuffed garnet $D_{50}$ grain size is at least 1 µm.

Embodiment 162: The sintered film or bilayer of any one of embodiments 142-155, wherein Embodiment: The sintered film or bilayer does not have cross-web wrinkling.

Embodiment 163: The process of any one of embodiments 124-127, wherein the bilayer moves through the CML with only the metal layer touching a surface of the CML.

Embodiment 125: The process of claim 124 or 125, further comprising making a rechargeable battery using the sintered body.

EXAMPLES

Reagents, chemicals, and materials were commercially purchased unless specified otherwise to the contrary.

Pouch cell containers were purchased from Showa Denko.

The Electrochemical potentiostat used was an Arbin potentiostat.

Electrical impedance spectroscopy (EIS) was performed with a Biologic VMP3, VSP, VSP-300, SP-150, or SP-200.

Electron microscopy was performed in a FEI Quanta SEM, an Apreo SEM, a Helios 600i, or a Helios 660 FIB-SEM.

Transmission Electron microscopy was performed as follows.

Sample preparation: The samples for TEM measurements were prepared using Ga ion sourced focused ion beam (nanoDUE'T NB5000, Hitachi High-Technologies). To protect the surface of the material from the Ga ion beam, multiple protective layers were deposited in advance to the sampling; at first, a metal layer was deposited by plasma coater and then a carbon protective layer and a tungsten layer were deposited by high vacuum evaporation and focused ion beam, respectively. The thin slice sampling was conducted by focused ion beam. The prepared sample was measured in TEM.

X-ray powder diffraction (XRD) was performed in a Bruker D8 Advance A25 with Cu K-α radiation at room temperature (e.g., between 21° C. and 23° C.). Source is Cu-Ka, wavelength at 1.54 Å. X-ray at 40.kV and 25 mA. Detector: LYNXEYE_XE with PSD opening 2.843. Divergence slit at 0.6 mm and antiscatter at 5.0 mm fixed.

Milling was performed using a Retsch PM 400 Planetary Ball Mill. Mixing was performed using a Fischer Scientific vortex mixer, a Flaktek speed mixer, or a Primix filmix homogenizer.

Casting was performed on a TQC drawdown table. Calendering was performed on an IMC calender.

Light scattering was performed on a Horiba, model: Partica, Model No.: LA-950V2, general term: laser scattering particle size distribution analyzer.

The Lithium Nickel Cobalt Manganese Oxide (NMC) used in the Examples was $LiNi_{0.85}Co_{0.1}Mn_{0.05}O_2$ unless specified otherwise.

Example 1—Making a Sintered Roll—Prophetic Example

In this Example, a slurry would be made by mixing lithium stuffed garnet, a solvent, a binder, and a plasticizer. The following slurry compositions would be used.

Slurry one: LLZO powders would be dispersed in ethanol with 2 wt % polyacrylic acid, using an ultrasonic horn. Larger particles would be allowed to settle. The supernatant would be decanted and the recovered powder would be dried in air. The collected powder, polyvinyl butyral, benzyl butyl phthalate, acetone, and ethanol at weight ratios 37:3:3:29:29 would be added to a vial and ball-milled with 2.0 mm diameter $ZrO_2$ beads for 10-24 h. The slurry would be cast using a doctor blade onto a mylar substrate; film thicknesses would be controlled by adjusting the blade height. Dried green films would be manually peeled off the Mylar substrate and cut to the desired size.

Slurry two: LLZO powders with 3 wt % polyacrylic acid would be dispersed in ethanol. A second solution of polyvinyl butyral, benzyl butyl phthalate, and acetone would be mixed in weight ratios of 1:1:10. The second solution and first solution would be mixed in equal parts by volume. The resulting slurry would be milled with $ZrO_2$ beads for 8-16 hours. The slurry would be cast using a doctor blade onto a mylar substrate at a thickness controlled by the doctor blade height. After drying in air, the films would be manually peeled from the substrate and cut to size.

Slurry three: An aqueous polymer solution would be prepared by dissolving methylcellulose, polyethylene glycol and glycerol in water. The component weight ratios would be water:methylcellulose:polyethylene glycol:glycerol=100:1:4:4. LLZO (lithium-stuffed garnet) powder would be added to the polymer solution at equal weight to the solution. The slurry would be mixed with $ZrO_2$ beads for 5-60 min. The slurry would be cast on mylar foil with a doctor blade: the thickness would be controlled by doctor blade gap. After drying in air, the tapes would be peeled from the mylar substrate and cut to size.

Slurry four: LLZO was ball milled in a mixture of equal parts of ethanol, xylene, toluene. Menhaden fish oil at 2-5 wt % relative to LLZO would be added dropwise for 30 min. Polyvinyl butyral at 6-10 wt % relative to LLZO, polyethylene glycol at 2-4 wt % relative to LLZO and benzyl butyl phthalate at 3-7 wt % relative to LLZO would be added and mixed. Tapes would be cast on mylar substrate with a doctor blade. After drying at 45° C. for 1-6 hours, the tape would be released from mylar and cut to size.

Slurry five: A slurry would be prepared by mixing 100 g LLZO powder, 2-4 g of glyceryl trioleate, 100-200 g of n-propyl propionate, 15-25 g of elvacite E-2046 and ball milling. The slurry would be cast by doctor blade onto a substrate, dried, and released from the substrate.

Slurry six: A slurry would be prepared by mixing 20 g LLZO powder, 25-40 g of a solvent mixture (ethanol:butanol:propylene glycol in volume percentages within the ranges 70-80:15-25:0-5), 1-3 g of dibutyl phthalate, 1-4 g of PVB, and 0.1-1 g of dispersant in a mill. The dispersant may be a dispersant such as Anti-terra-202 from BYK. After mixing, the slurry would be filtered, deaerated, and cast by reverse comma coating onto a substrate. The green tape would be dried, released from the substrate, and cut to size.

Slurry seven: A slurry would be made by mixing water (30 parts by mass), LLZO powder (12-18 parts by mass) a binder solution (WB4101, WB40B-44, WB40B-53 from Polymer Innovations at 8 parts by mass) for at least one hour in a mill. After mixing, the slurry would be filtered, deaerated, and cast by slot die coating onto a substrate. The green tape would be dried, released from the substrate, and cut to size.

Slurry eight: LLZO powder would be milled in a mixed solvent of toluene and isopropanol plus fish oil. The mixture would be mixed for 1-5 hours to prepare a slurry. A binder solution of toluene and isopropanol plus polyvinyl butyral, and butyl benzyl phthalate would be mixed. The binder solution would be added to the slurry and mixed. The mixture would be deaerated, filtered, and cast onto a polymer carrier. The green tape would be dried and blanked into sheets of 10-40 cm length. The blanks would be released from the carrier and subsequently cut to size.

Slurry nine: A slurry of calcined LLZO would be prepared by mixing 80 g of calcined LLZO powder with 50 ml of a 33% w/w solution of polyvinyl butyral in toluene and 4 g of plasticizer di-butyl Phthalate. A polyacrylic binder would be included at 3 weight percent of the solution. The slurry would be tape casted onto a silicone-coated mylar substrate using a doctor blade. The cast mixed slurry would be allowed to dry at room temperature for 2-6 hours to form a green film. The green film would be blanked into sheets of 10-40 cm length. The blanks would be released from the carrier and cut to size.

The slurry would be cast onto nickel foil and dried and then rolled up.

After drying, the dried slurry on the nickel foil would be placed on a continuous manufacturing line. The green tape would be formed when the slurry dries on the nickel foil and moved through the apparatus shown in FIG. 3.

In a first step, the binder would be burned off by heating the green tape.

In a second step, the green tape would be heated in the bisque oven.

In a third step, the green tape would be sintered at about 1100° C. to form a sintered film.

The sintered film would be rolled up on the end roller shown in FIG. 3.

The green tape was moved back and forth between the bisque and binder burn-out oven. The ovens were turned on and off to selectively heat the film in either the bisque or binder burn-out oven. For sintering, the bisque oven was increased in temperature to the sintering temperature.

Example 2-Making a Sintered Roll

In this Example, a slurry was made by mixing lithium stuffed garnet, a solvent, a binder, and a plasticizer.

Specifically, lithium-stuffed garnet was mixed with an acrylic binder and benzyl butyl phthalate in an aprotic solvent to form the slurry. The slurry was cast onto a Ni foil to form the bilayer. The slurry was dried and then rolled up.

After drying, the dried slurry on the nickel foil was placed on the continuous manufacturing line. The green tape formed when the slurry dried on the nickel foil. Then, the tape moved through the apparatus shown in FIG. 3.

The bilayer moved at 5 cm/min through the CML with a hold at the sintering section for about 10 minutes at around 1100° C.

Figure 4:
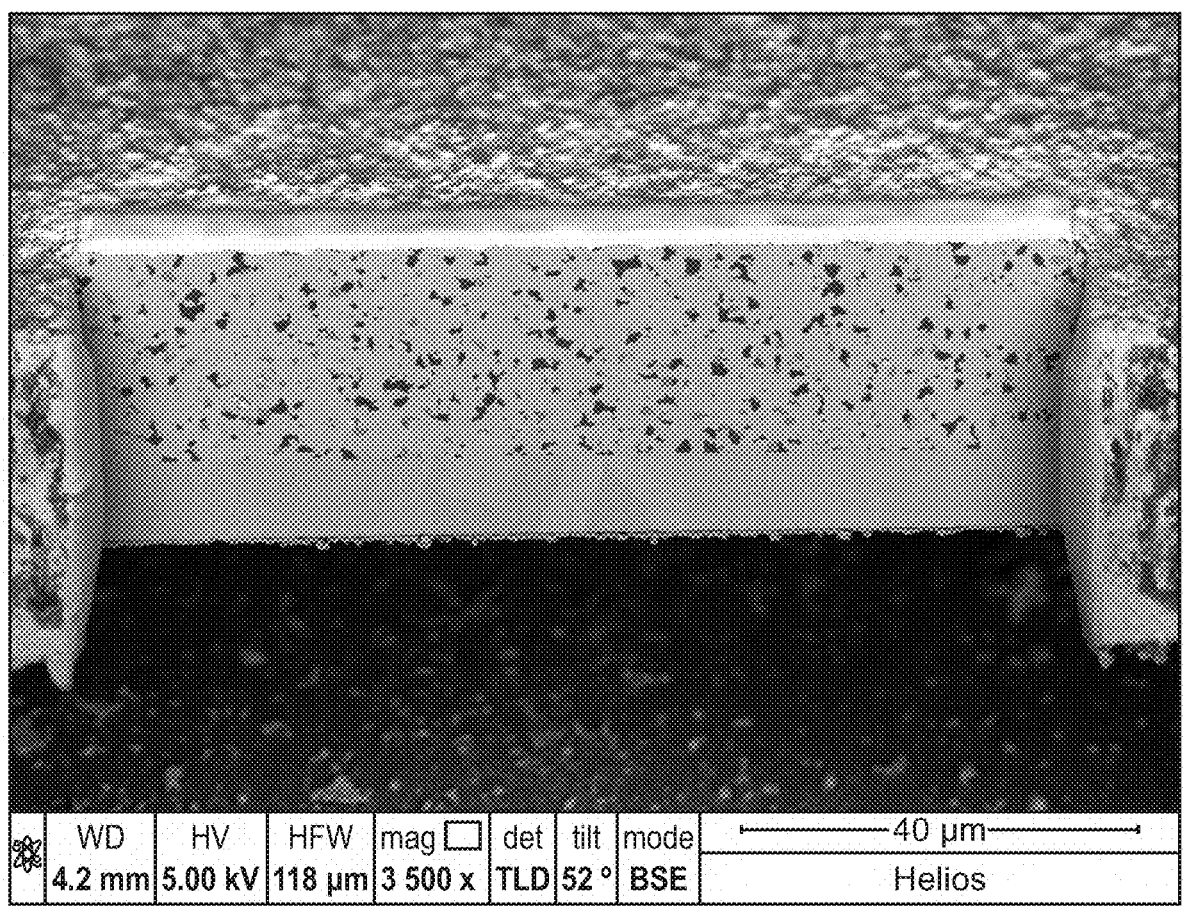
FIG. 4 shows cross-sectional scanning electron microscopy (SEM) of a sintered film of lithium-stuffed garnet on a metal foil. The scale bar is 40 µm.

The sintered film made from this process is shown, in a cross-sectional scanning electron microscopy image, in FIG. 4. The sintered lithium-stuffed garnet is shown as dense and bonded to a Ni film underneath. The porosity of the lithium-stuffed garnet is less than 2% v/v.

Figure 5:
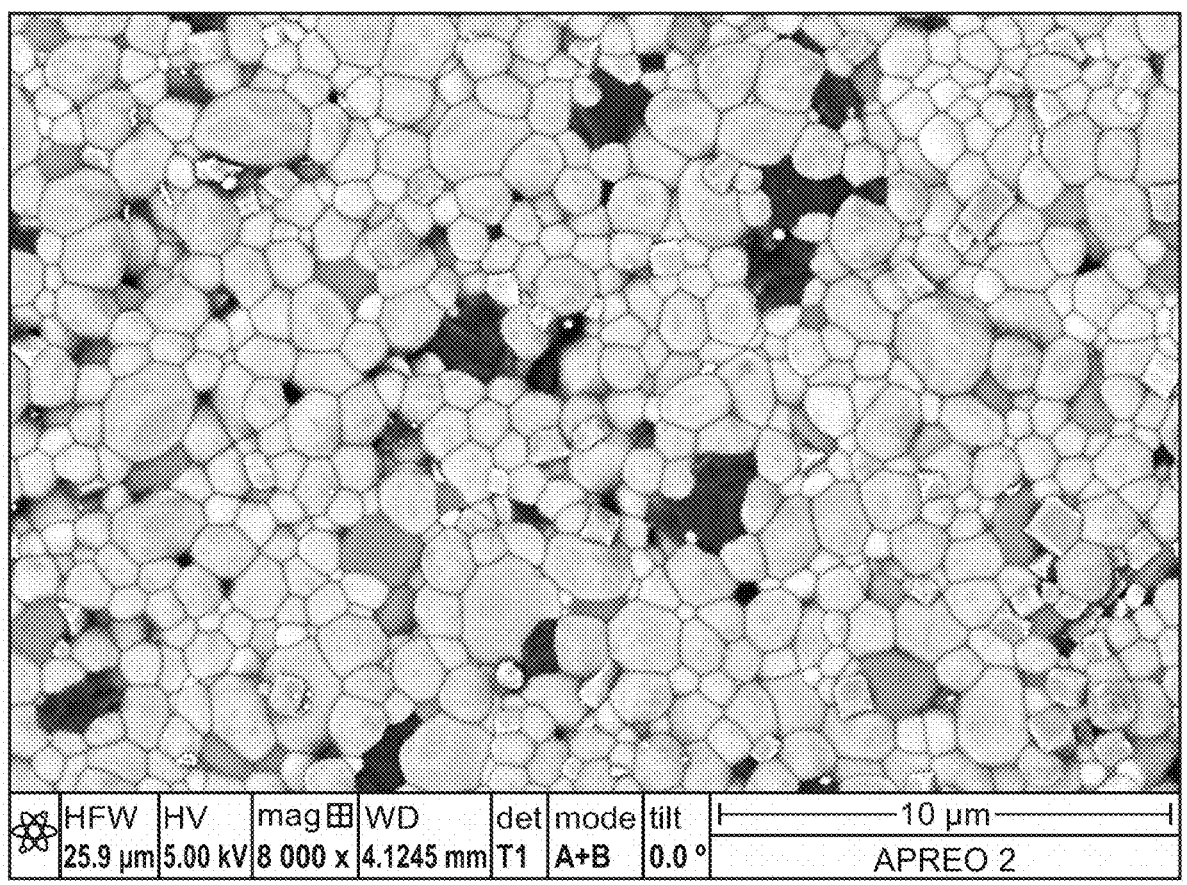
FIG. 5 shows a top-down SEM image of a sintered film of lithium-stuffed garnet. The scale bar is 10 µm.

The sintered film made from this process is shown, in a top-down scanning electron microscopy image, in FIG. 5. The sintered lithium-stuffed garnet is shown as dense and lacking surface defects.

Example 3—Making a Sintered Roll with Controlled Grain and Particle Sizes

In this Example, a slurry was made as in Example 2.

The slurry was processed by a batch process and a continuous process.

Figure 8:
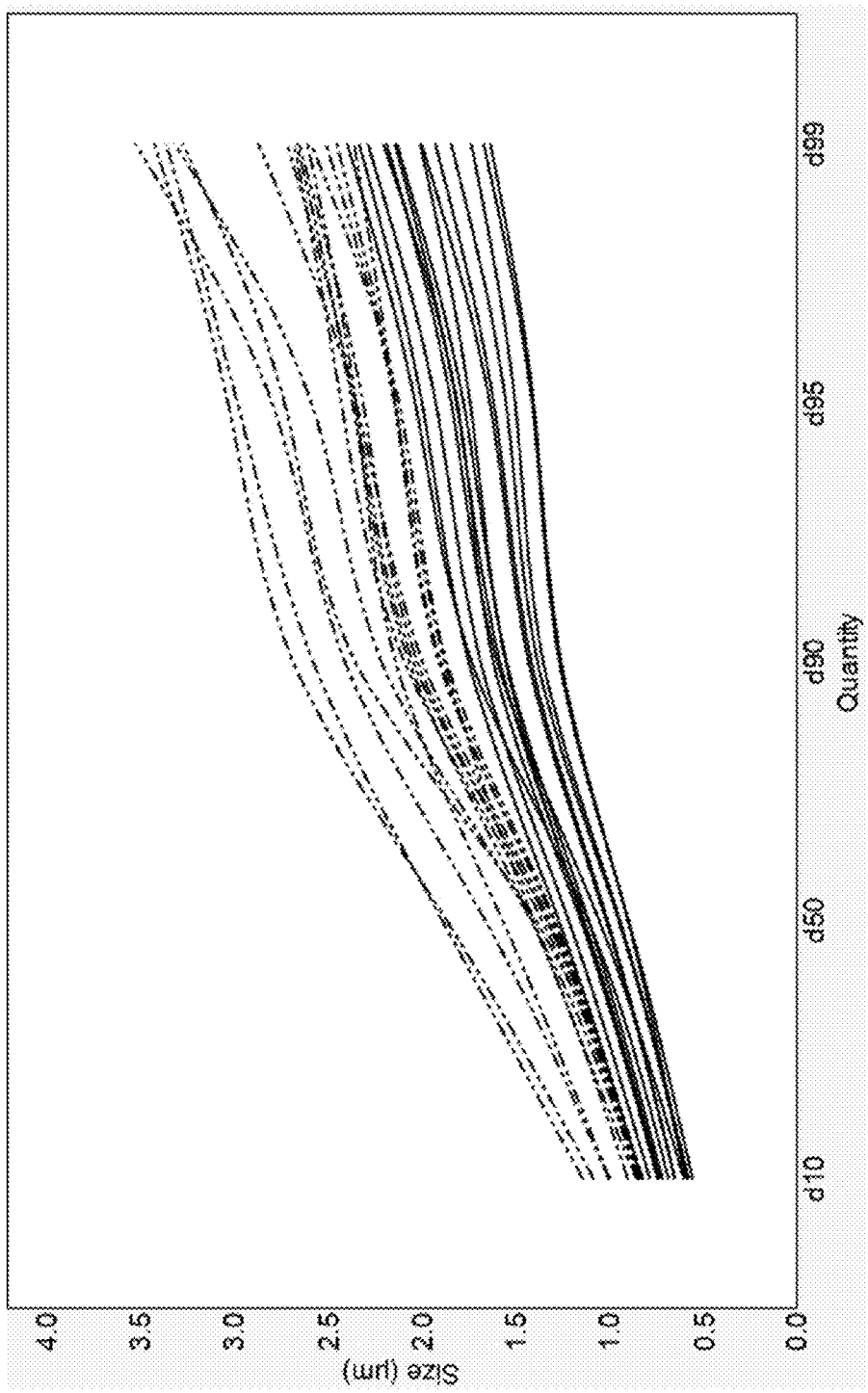
FIG. 8 shows of a plot of grain size (μm, y-axis) versus particle size ($d_{10}$, $d_{50}$, $d_{90}$, $d_{95}$, and $d_{99}$ for sintered films of lithium-stuffed garnet.

The grain size of the sintered films was measured by SEM. The particle size of the input reactants was measured by particle size analyzer. The results are shown in FIG. 8. The films processed by a batch process are shown in dashed lines, whereas the films processed by a continuous process are shown in solid lines.

The results show that as the particle size for the input reactants increased, so too did the grain size.

The sintered film made from this process is shown, in a planview (PV) or top-down scanning electron microscopy image, in FIG. 5. The sintered lithium-stuffed garnet is shown as dense and defect free. FIG. 5 shows relatively small grain sizes. The $d_{50}$ is about 1.1 μm.

Figure 9:
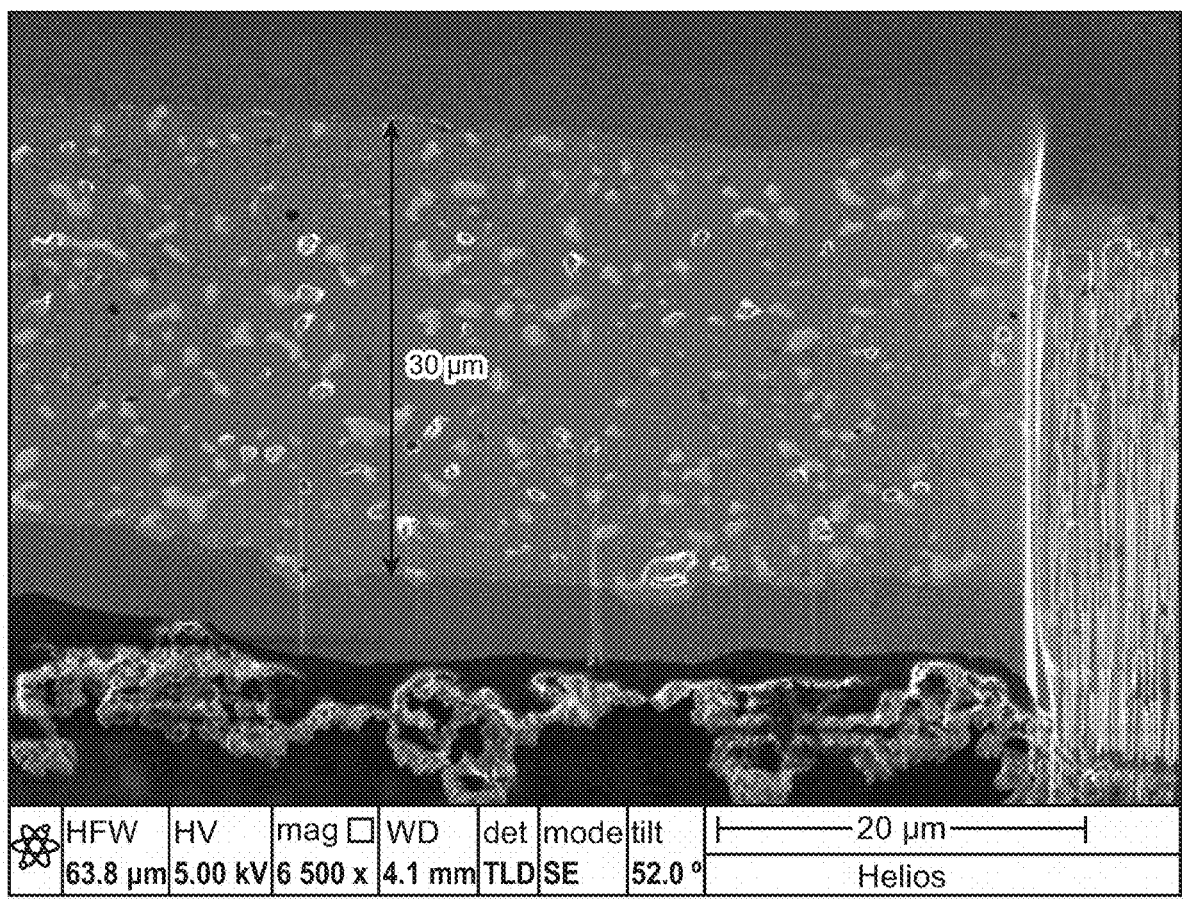
FIG. 9 shows cross-sectional scanning electron microscopy (SEM) of a sintered film of lithium-stuffed garnet on a metal foil. The scale bar is 20 μm.

The sintered film made from this process is shown, in a cross-sectional scanning electron microscopy image, in FIG. 9. The sintered lithium-stuffed garnet is shown as dense and bonded to a Ni film underneath. The film in FIG. 10 was sintered at 1140° C. The film has low porosity of 1.8% v/v. A 5 μm ED foil is shown on the bottom of the film.

Figure 10:
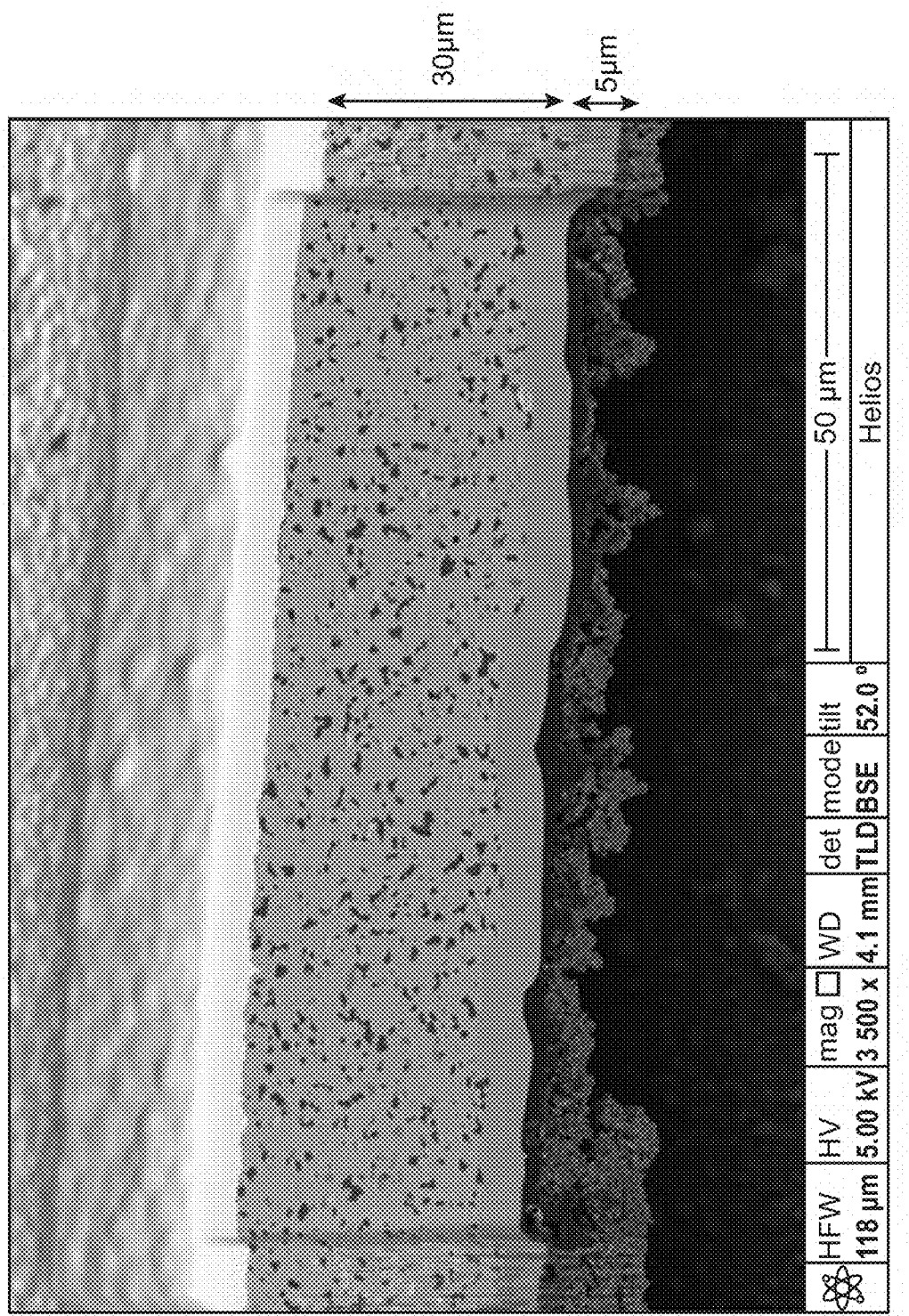
FIG. 10 shows cross-sectional scanning electron microscopy (SEM) of a sintered film of lithium-stuffed garnet on a metal foil. The scale bar is 50 μm.

The sintered film made from this process is shown, in a cross-sectional scanning electron microscopy image, in FIG. 10. The sintered lithium-stuffed garnet is shown as dense and bonded to a Ni film underneath. The film in FIG. 10 was sintered at 1140° C. The film has low porosity of 1.8% v/v. A 5 μm ED foil is shown on the bottom of the film.

Figure 11:
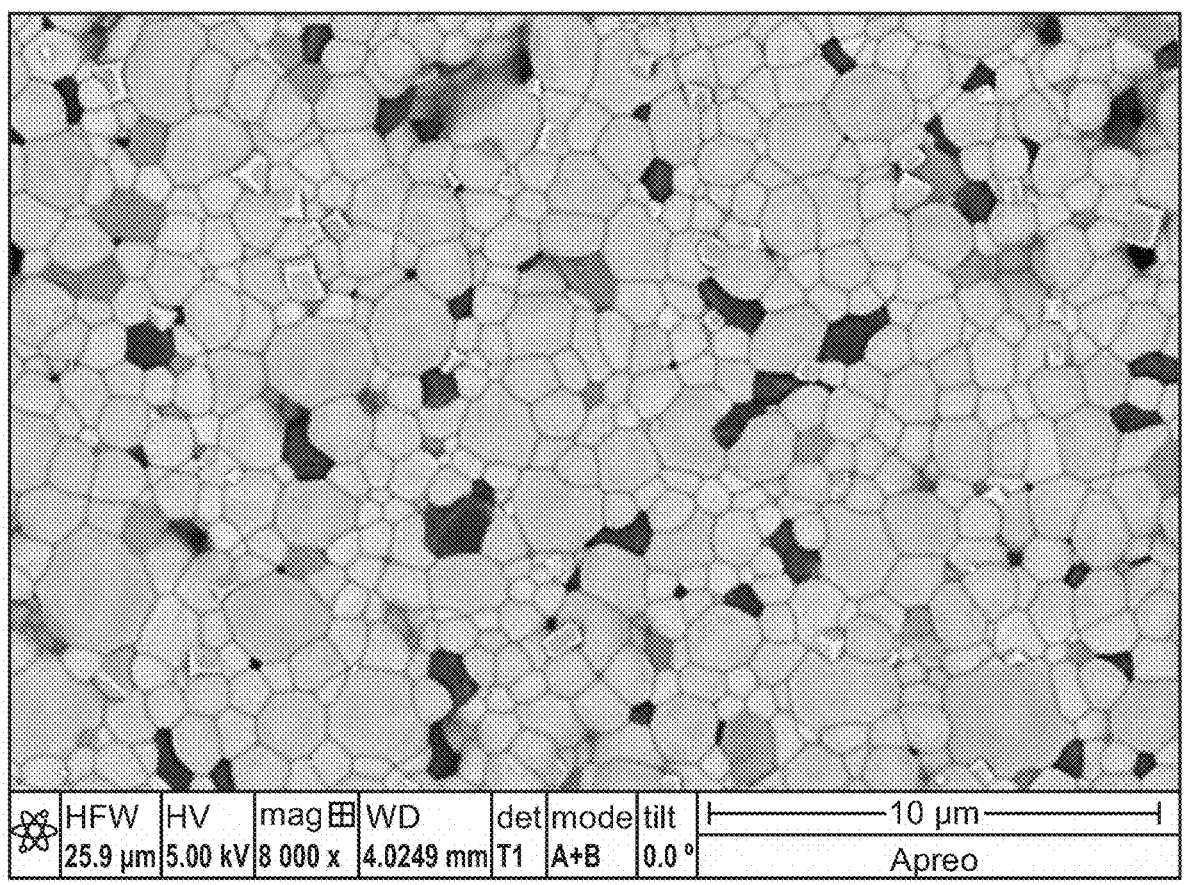
FIG. 11 shows a top-down SEM image of a sintered film of lithium-stuffed garnet. The scale bar is 10 μm.
Figure 12:
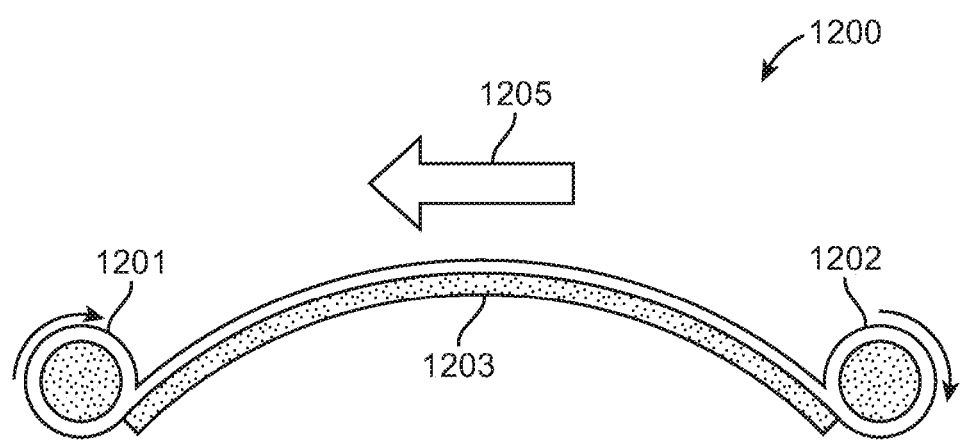
FIG. 12 shows a curved ramp component of a continuous manufacturing line.

The sintered film made from this process is shown, in a top-down scanning electron microscopy image, in FIG. 11. The sintered lithium-stuffed garnet is shown as dense and lacking surface defects.

Example 4—Testing a Sintered Roll

Sintered films were made as in Example 2. Area-specific resistance (ASR) was measured by electrical impedance spectroscopy.

On average, the ΔASR was 39 Ωcm².

Battery cells were made and then charged and discharged at 30° C. at the intermittent current pulse with constant current density of 0.33 mA/cm² and within the operation voltage of 3 V to 4.2 V. The current pulse was applied for 30 minutes, the current was stopped, and the system was relaxed for 3 minutes. This intermittent pulse was repeated until the cell voltage reached to 4.2V during charging and 3V during discharging. The area-specific resistance (ASR) of the battery cells was obtained by reading voltage drop during relaxation steps during charging.

Example 5—Making and Testing a Sintered Bilayer

Sintered bilayer films were made as in Example 2. Specifically, lithium-stuffed garnet was mixed with an acrylic binder and benzyl butyl phthalate in an aprotic solvent to form the slurry. The slurry was cast onto a Ni foil to form the bilayer.

The bilayer (referred to as a web) was formed, and the web moved at 5 cm/min through the CML with a hold at the sintering section for about 10 minutes at around 1100° C.

Figure 21:
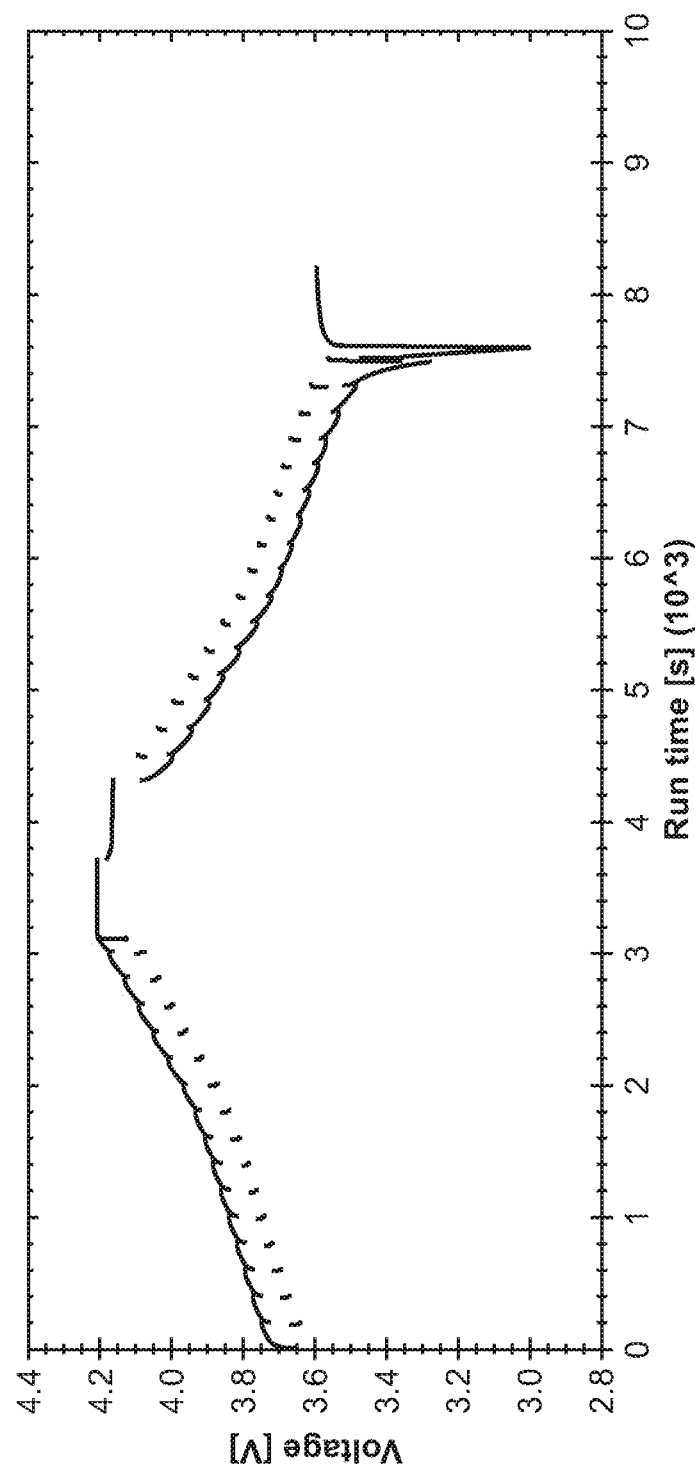
FIG. 21 shows a plot of voltage versus run time.

The cell was cycled at a rate of IC charge, IC discharge rate, at 30° C., 50 pounds-per-square-inch (PSI) (~3.4 atm). The results are shown in FIG. 21.

The embodiments and examples described above are intended to be merely illustrative and non-limiting. Those skilled in the art will recognize or will be able to ascertain using no more than routine experimentation, numerous equivalents of specific compounds, materials and procedures. All such equivalents are considered to be within the scope and are encompassed by the appended claims.

What is claimed is:

1. A process for sintering a bilayer, the process comprising:
   unwinding a bilayer roll to provide a bilayer;
   heating the bilayer comprising a green body layer disposed on a metal layer in a furnace at about 1100° C. to about 1300° C. for about 5 seconds to about 3 minutes at a heating rate of higher than 300° C./min; thereby providing a sintered bilayer comprising a lithium-stuffed garnet layer on the metal layer;
   wherein the bilayer has a thickness, after sintering, of between about 10 μm and about 50 μm;
   wherein the bilayer moves through the furnace at a rate between about 2 centimeters/minute and 100 centimeters/min; and
   wherein the furnace comprises an atmospheric controller that maintains an atmosphere in the furnace that comprises argon (Ar) gas; nitrogen ($N_2$) gas; hydrogen gas; or a mixture thereof.

2. The process of claim 1, further comprising a binder burn-out step prior to heating the bilayer at about 1100° C. to about 1300° C. for about 5 seconds to about 3 minutes.

3. The process of claim 2, wherein the binder burn-out step occurs in a binder burn-out furnace.

4. The process of claim 2, wherein the bilayer, prior to the binder burn-out step, comprises at least one member selected from a solvent, a binder, a dispersant, a plasticizer, a surfactant, or a combination thereof.

5. The process of claim 1, wherein the lithium-stuffed garnet layer comprises compounds having the formula $Li_ALa_BZr_CO_F$, $Li_ALa_BM'_CM''_DTa_EO_F$, or $Li_ALa_BM'_CM''_DNb_EO_F$, wherein $4<A<8.5$, $1.5<B<4$, $0<C\leq 2$, $0<D<2$; $0<E<2.5$, $10<F<13$, and M' and M" are each, independently in each instance selected from Al, Mo, W, Nb, Ga, Sb, Ca, Ba, Sr, Ce, Hf, Rb, and Ta; or $Li_aLa_bZr_cAl_dMe''_eO_f$, wherein $5<a<7.7$; $2<b<4$; $0<c\leq 2.5$; $0<d<2$; $0<e<2$, $10<f<13$ and Me" is a metal selected from Nb, V, W, Mo, Ta, Ga, and Sb.

6. The process of claim 1, wherein the metal layer comprises a metal selected from the group consisting of nickel, copper, iron, alloys thereof, and combinations thereof.

7. The process of claim 1, wherein the bilayer has a thickness, after sintering, of between about 20 μm and about 40 μm.

8. The process of claim 1, wherein the metal layer has a thickness of about 1 μm to about 20 μm.

9. The process of claim 1, wherein the bilayer has a width, after sintering, of between about 0.8 mm to about 5 m.

10. The process of claim 1, wherein the atmospheric controller maintains an atmosphere in the furnace comprising less than 500 ppm $O_2$.

11. The process of claim 1, further comprising rolling up the sintered bilayer.

12. The process of claim 1, wherein the sintered lithium-stuffed garnet layer has a porosity of less than 5%.

13. The process of claim 1, wherein the lithium stuffed garnet layer comprises 70-99% cubic garnet.

* * * * *